United States Patent
Lee

(10) Patent No.: US 12,481,408 B2
(45) Date of Patent: Nov. 25, 2025

(54) CAPACITIVE DETECTION DEVICE UTILIZING TRAPEZOIDAL SUBSHAPE

(71) Applicant: Sung Ho Lee, Seogwipo-si (KR)

(72) Inventor: Sung Ho Lee, Seogwipo-si (KR)

(73) Assignee: Sung Ho Lee, Jeju-do (KR)

( * ) Notice: Subject to any disclaimer, the term of this patent is extended or adjusted under 35 U.S.C. 154(b) by 0 days.

(21) Appl. No.: 19/019,528

(22) Filed: Jan. 14, 2025

(65) Prior Publication Data

US 2025/0231653 A1    Jul. 17, 2025

(30) Foreign Application Priority Data

Jan. 16, 2024  (KR) ........................ 10-2024-0007005

(51) Int. Cl.
*G06F 3/044*    (2006.01)
*G06F 3/041*    (2006.01)

(52) U.S. Cl.
CPC ........ *G06F 3/0448* (2019.05); *G06F 3/04164* (2019.05); *G06F 3/0441* (2019.05); *G06F 2203/04107* (2013.01)

(58) Field of Classification Search
CPC .. G06F 3/0448; G06F 3/0441; G06F 3/04164; G06F 2203/04107
See application file for complete search history.

(56) References Cited

FOREIGN PATENT DOCUMENTS

| KR | 10-2350234 B1 | | 1/2022 |
|---|---|---|---|
| KR | 10-2365145 B1 | | 2/2022 |
| KR | 102381169 B1 | * | 3/2022 |
| KR | 102397356 B1 | | 5/2022 |
| KR | 10-2022-0116094 A | | 8/2022 |

OTHER PUBLICATIONS

KIPO, Notice of Refusal to Grant a Patent for Application No. 10-2024-0007005, Apr. 29, 2024.
KIPO, Decision to Grant a Patent for Korean Patent Application No. 10-2024-0007005, Aug. 20, 2024.

* cited by examiner

*Primary Examiner* — Lisa S Landis
(74) *Attorney, Agent, or Firm* — Nicholas Park

(57) ABSTRACT

The present invention relates to a capacitive touch input device utilizing the capacitive sensing method for detecting touch inputs from a finger or a similar conductive object. More specifically, it pertains to a capacitance detection device designed to facilitate the detection of touch coordinates based on the vertical movement of a pen by employing a capacitive detection sensor composed of a composite trapezoidal shape.

12 Claims, 39 Drawing Sheets

FIG. 6

| Data | l(mm) | εr | w(um) | d(um) | ccpl(pF) | Remark |
|---|---|---|---|---|---|---|
| Data1 | 180 | 5 | 100 | 100 | 12.45 | Reference |
| Data2 | 180 | 5 | 200 | 100 | 15.14 | 21.6% |
| Data3 | 180 | 5 | 400 | 100 | 18.15 | 19.9% |
| Data4 | 180 | 5 | 800 | 100 | 21.39 | 17.9% |
| Data5 | 180 | 5 | 100 | 50 | 15.14 | 21.6% |
| Data6 | 180 | 5 | 100 | 25 | 18.15 | 19.9% |
| Data7 | 180 | 5 | 100 | 12.5 | 21.39 | 17.9% |

FIG. 19

| Data | Vd1(V) | Vd2(V) | l(mm) | er | w(um) | d(um) | t(Å) | cpr (pF) | ccpl (pF) | dine (fF) | cline/ccpl (%) | ①Vp2-Vp1(V) without cline | ②Vp2-Vp1(V) with cline | (②-①)/① (%) |
|---|---|---|---|---|---|---|---|---|---|---|---|---|---|---|
| Data1 | 0 | 5 | 180 | 5 | 100 | 100 | 5000 | 4 | 12.45 | 39.84 | 0.32% | 3.784 | 3.787 | 0.08% |
| Data2 | 0 | 5 | 180 | 5 | 200 | 100 | 5000 | 4 | 15.14 | 39.84 | 0.26% | 3.955 | 3.957 | 0.05% |
| Data3 | 0 | 5 | 180 | 5 | 400 | 100 | 5000 | 4 | 18.15 | 39.84 | 0.22% | 4.097 | 4.099 | 0.04% |
| Data4 | 0 | 5 | 180 | 5 | 800 | 100 | 5000 | 4 | 21.39 | 39.84 | 0.19% | 4.212 | 4.214 | 0.03% |
| Data5 | 0 | 5 | 180 | 5 | 100 | 50 | 5000 | 4 | 15.14 | 79.69 | 0.53% | 3.955 | 3.959 | 0.11% |
| Data6 | 0 | 5 | 180 | 5 | 100 | 25 | 5000 | 4 | 18.15 | 159.4 | 0.88% | 4.097 | 4.104 | 0.16% |
| Data7 | 0 | 5 | 180 | 5 | 100 | 12.5 | 5000 | 4 | 21.39 | 318.7 | 1.49% | 4.212 | 4.222 | 0.23% |

FIG. 23A

Capacitance unit : pF

| CDA num | Vd2 | cpr | cc | cpl | cobj | Vp_nt(V) | Vp_tch(V) | Δv(V) |
|---|---|---|---|---|---|---|---|---|
| CDA1 | 5 | 4 | 7 | 15 | 0.7 | 2.885 | 2.809 | 0.076 |
| CDA2 | 5 | 4 | 6.5 | 14 | 0.7 | 2.857 | 2.778 | 0.079 |
| CDA3 | 5 | 4 | 6 | 13 | 0.7 | 2.826 | 2.743 | 0.083 |
| CDA4 | 5 | 4 | 5.5 | 12 | 0.7 | 2.791 | 2.703 | 0.088 |
| CDA5 | 5 | 4 | 5 | 11 | 0.7 | 2.750 | 2.657 | 0.093 |
| CDA6 | 5 | 4 | 4.5 | 10 | 0.7 | 2.703 | 2.604 | 0.099 |
| CDA7 | 5 | 4 | 4 | 9 | 0.7 | 2.647 | 2.542 | 0.105 |
| CDA8 | 5 | 4 | 3.5 | 8 | 0.7 | 2.581 | 2.469 | 0.112 |
| CDA9 | 5 | 4 | 3 | 7 | 0.7 | 2.500 | 2.381 | 0.119 |
| CDA10 | 5 | 4 | 2.5 | 6 | 0.7 | 2.400 | 2.273 | 0.127 |
| CDA11 | 5 | 4 | 2 | 5 | 0.7 | 2.273 | 2.137 | 0.136 |
| CDA12 | 5 | 4 | 1.5 | 4 | 0.7 | 2.105 | 1.961 | 0.144 |
| CDA13 | 5 | 4 | 1 | 3 | 0.7 | 1.875 | 1.724 | 0.151 |
| CDA14 | 5 | 4 | 0.5 | 2 | 0.7 | 1.538 | 1.389 | 0.150 |

FIG. 29

| CDA num | ADC | ADC_org |
|---|---|---|
| CDAm | 700 | 700 |
| CDA(m+1) | 680 | 650 |
| CDA(m+2) | 600 | 600 |
| CDA(m+3) | 580 | 550 |
| CDA(m+4) | 500 | 500 |
| CDA(m+5) | 480 | 450 |

CAPACITIVE DETECTION DEVICE UTILIZING TRAPEZOIDAL SUBSHAPE

CROSS-REFERENCE TO RELATED APPLICATION

This application claims priority to and the benefit of Korean Patent Application No. 10-2024-0007005, filed on Jan. 16, 2024, the disclosure of which is incorporated herein by reference in its entirety.

BACKGROUND

Technical Field

The present invention relates to a capacitance detection device for detecting the touch of an object such as a finger or a pen. More specifically, it addresses an issue in capacitance detection sensors with rhombus-shaped elements, where detecting narrow pen touches requires increasing the number of rhombus-shaped elements to reduce the short diagonal length. This leads to an increase in coplanar capacitance and a consequent reduction in Signal-to-Noise Ratio (SNR). To solve this problem, the invention employs a capacitance detection sensor composed of a composite trapezoid. This configuration enables the detection of coordinates for narrow pen touch movements in the vertical direction without increasing the number of detection sensors.

Background Art

In the past, mechanical buttons were used for entering phone numbers on mobile phones. Recently, however, input devices have evolved from mechanical to electronic. For example, input is now possible simply by lightly touching the display device of a mobile phone, such as when entering a phone number. One such electronic input device is the capacitive touch input device, which is commonly used.

A capacitive touch input device detects changes in capacitance that occur when an object (e.g., a finger or pen) approaches (e.g., hovers) or touches the surface of a capacitive detection area (hereinafter referred to as CDA) installed on the top surface of the display device. By detecting these capacitance changes, the device determines the input position as valid, similar to pressing a mechanical button. A touch input device that detects such capacitance changes is referred to as a capacitive type touch input device (or capacitive touch input device).

FIG. 1 illustrates one embodiment of the present invention, modeled as a capacitive touch input device. Referring to FIG. 1, one side of three capacitors (Cd, Cpr, Cc) is commonly connected to point P. Alternating voltages Vd1 and Vd2 are applied to the other side of capacitor Cd, where Vd2 can be greater or smaller than Vd1. Additionally, a voltage with a magnitude of Vpr is applied to the other side of capacitor Cpr, and a voltage with a magnitude of Vc is applied to the other side of capacitor Cc. The voltages Vc and Vpr are DC voltages with different magnitudes.

After applying the voltage Vd1 to the other side of Cd and allowing a predetermined time to elapse or stabilizing the voltage at point P, the voltage at point P is defined as Vp1. When the voltage applied to Cd is changed to Vd2 and a predetermined time elapse, or the voltage at point P stabilizes, the charge stored in Cd is expressed as $\Delta Q = cd \times (Vd2 - Vd1)$ (C). This charge is supplied to Cpr and Cc. Once the movement of the charge reaches equilibrium, a new voltage Vp2 is formed at point P.

At this stage, the charge supplied by Cd is shared between Cpr and Cc, a phenomenon known as charge sharing. The sum of the charges stored across Cd, Cpr, and Cc remains constant due to the law of charge conservation.

This process can be expressed quantitatively as follows: When the voltage of Cd changes from Vd1 to Vd2, the current flowing through Cd due to the charge flow is defined as id. At point P, due to charge sharing, the charge flowing into Cpr is defined as ipr, and the charge flowing into Cc is defined as ic. Assuming that Vpr and Vc are constant DC voltages, the following equations hold true. (Note: Capital letters are used for capacitors, while lowercase letters denote capacitance. For example, Cd is the capacitor, and cd is the capacitance of capacitor Cd.)

According to Kirchhoff's Current Law, id=ipr+ic.

$$id = cd*(Vd - Vp),\ ip = cpr*(Vp - Vpr),\ ic = cc*(Vp - Vc)$$

$$\text{Therefore, } cd*(Vd - Vp) = cpr*(Vp - Vpr) + cc*(Vp - Vc)$$

Rearranging this equation for Vp, we have:

$$Vp = \frac{cd*Vd + cpr*Vpr + cc*Vc}{cd + cpr + cc} (V)$$

In the mathematical equation related to the aforementioned Vp, if the voltage Vd supplied to the capacitor Cd is replaced with Vd1, the voltage Vp1 at point P when Vd1 is applied is as follows:

$$Vp1 = \frac{cd*Vd1 + cpr*Vpr + cc*Vc}{cd + cpr + cc} (V)$$

When a voltage Vd2, which is larger or smaller than Vd1, is supplied to capacitor Cd, the voltage Vp2 at point P is:

$$Vp2 = \frac{cd*Vd2 + cpr*Vpr + cc*Vc}{cd + cpr + cc} (V)$$

Thus, when alternating voltages Vd1 and Vd2 of different magnitudes are applied to Cd, the difference Vp2−Vp1 at the common connection point P is expressed by the following Equation 1.

$$|Vp2 - Vp1| = \left|\frac{(Vd2 - Vd1)*cd}{cd + cpr + cc}\right| (V) \quad \text{[Equation 1]}$$

Equation 1 represents the magnitude of the voltage variation at point P, caused by charge sharing between Cd and all the capacitors (Cd, Cpr, Cc) commonly connected at point P through Cd.

FIG. 2 illustrates an embodiment of the present invention, which models a capacitive touch input device to which an object capacitor (Cobj). In this embodiment, Cobj, representing the object capacitor, is added to the configuration in FIG. 1. The object capacitor is formed between a capacitive touch sensor and an object, such as a finger, pen, or handheld conductive element.

If one side of the touch detection sensor is connected to point P, one side of the object capacitor formed between the touch detection sensor and the object is connected to point P, and the other side is modeled as being connected to the potential applied to the object. In this embodiment, the object is modeled as a finger, and the body is generally modeled as connected to ground potential. Thus, the voltage Vobj connected to the other side of the object capacitor is a DC voltage of zero potential (Zero Voltage).

When an alternating voltage, Vd1 and Vd2, is applied to Cd in the same manner as in the embodiment of FIG. 1, under the condition where Cobj is added, charge is supplied via the capacitor Cd, and a charge-sharing phenomenon occurs across all capacitors with one side connected to point P. Using the same method as employed in the embodiment of FIG. 1, the following Equation 2 is derived.

$$|Vp2 - Vp1| = \left|\frac{(Vd2 - Vd1)*cd}{cd + cpr + cc + cobj}\right| (V) \quad \text{[Equation 2]}$$

The difference between Equation 1 and Equation 2 is the presence of the object capacitance cobj. Thus, the result of [Equation 1]-[Equation 2] demonstrates that the object capacitance cobj can be detected in the form of a voltage.

By designating the result of Equation 1 under no-touch conditions as the reference value and storing it in memory, the magnitude of the voltage detected at point P can be continuously compared with the reference value to determine the occurrence of touch or detect the touch area.

The absolute values in Equations 1 and 2 are used because Vp2 can be greater or smaller than Vp1, and consequently, Vp2-Vp1 can be positive or negative. The absolute values represent only the magnitude of Vp2-Vp1.

FIG. 3 illustrates an embodiment of the present invention concerning an object capacitance detection sensor comprising a capacitive detection area (CDA, 100) and sensing signal lines 200 connected to the CDA. The CDA and sensing signal lines of the object capacitance detection sensor can be made from a transparent conductive film such as ITO (Indium Tin Oxide) or ATO (Antimony Tin Oxide) or materials such as metal mesh or carbon nanotubes. The CDA 100 is a geometric structure with a predefined area designed to form capacitance with the object in a vertically opposing configuration. For instance, the CDA can be configured in various shapes, such as a rectangle, triangle, a series of connected triangles, or a series of connected trapezoids.

Generally, a protective material such as glass or plastic is present on the upper surface of the CDA to protect it, which determines the magnitude of the absolute permittivity 81 (absolute permittivity in a vacuum multiplied by relative permittivity). When a touch occurs between the object and the CDA 100 with a vertical opposing distance d1 and vertical opposing area S1, the object capacitance cobj is determined as follows:

$$cobj = \varepsilon 1 \frac{S1}{d1} (F).$$

If a touch occurs between the CDA and a finger, and one side of the CDA signal line 200 connected to the CDA is linked to point P in FIGS. 1 and 2, it is possible to model the equivalent state where one side of the object capacitor is connected to point P and the other side is connected to the body potential Vobj.

The sensing signal line 200 is connected to a voltage meter (hereinafter referred to as "Vol Meter"). The Vol Meter is a device that measures the magnitude of the voltage formed on the sensing signal line 200, and in one embodiment, it is an ADC (Analog-to-Digital Converter). The Vol Meter measures the voltage based on [Equation 1] or [Equation 2], either directly at point P or at the output terminal of an operational amplifier that takes the sensing signal line as an input.

When the detection sensor in FIG. 3 is installed on the upper surface of a display device, a common electrode capacitor (Cc) is formed by the common electrode of the display device vertically opposing the detection sensor. The common electrode capacitance (cc) is determined by the area S2 of the detection sensor and the vertical opposing distance d2 between the detection sensor and the common electrode, expressed as:

$$cc = \varepsilon 2 \frac{S2}{d2} (F).$$

A substrate, such as glass, plastic, or film, may be positioned between the detection sensor and the common electrode of the display device. ε2 represents the absolute permittivity of this substrate, which is calculated as the product of the absolute permittivity in a vacuum (ε0) and the relative permittivity (εr) of the substrate. Consequently, the common electrode capacitor can be equivalently modeled as having one side connected to point P and the other side connected to the common electrode voltage Vc.

The voltage Vc connected to the other side of the common electrode capacitor corresponds to:
1. The common voltage of VA-series LCDs,
2. The common voltage formed on the TFT substrate of IPS-series LCDs, or
3. The common voltage formed on the cathode of OLEDs.

The common electrode voltage of LCDs or OLEDs serves as the common voltage for forming pixels. Since any change in this voltage can alter image quality characteristics, the common voltage is a DC voltage with no allowable fluctuation and cannot supply charge.

The CDA signal line 200 is connected to a Touch Drive IC (hereinafter referred to as "TDI"). The TDI is a semiconductor IC that controls all processes related to touch detection, including generating necessary voltages, performing calculations, generating clocks, and controlling scan sequences.

When the CDA signal line is laid out within the TDI, parasitic capacitance is formed. Parasitic capacitance mainly arises between the sensing signal line and:
1. Coupling with semiconductor elements such as CMOS or FET,
2. Vertical opposition with signal lines or power lines at a specific potential, or
3. Vertical opposition with the bulk substrate.

The potential of the bulk substrate or power lines among the components listed in 1) to 3), including elements, power lines, or the bulk substrate, is DC. However, the potential of signal lines or semiconductor elements alternates at a specific frequency as an AC voltage. Thus, Vpr, modeled as being connected to the other side of the parasitic capacitance, may not be a DC voltage. However, since coupling of the sensing signal line with AC voltage is undesirable, the TDI layout can use shielding layers to block coupling with AC potential. Consequently, Vpr can be interpreted as a DC voltage, allowing the parasitic capacitor Cpr to be equivalently modeled as having one side connected to point P and the other side connected to the DC voltage Vpr.

FIG. 4 illustrates an embodiment of the invention in which an external capacitor (Cext) is added to the detection sensor and used as a medium for charge supply. Referring to FIG. 4, the external capacitor Cext is connected to the CDA signal line 200, with one side of Cext connected to the CDA signal line and the other side supplied with alternating voltages Vd1 and Vd2.

This configuration is equivalent to the modeling in FIGS. 1 and 2. Based on alternating voltages Vd1 and Vd2, the charge supplied by the external capacitor Cext can be used to determine touch occurrence through the calculation results of [Equation 1]–[Equation 2] at point P.

FIG. 25B illustrates an embodiment in which multiple rhombus-shaped CDAs are vertically stacked to detect touch coordinates based on the vertical movement of an object. In FIG. 25B, circles labeled a to c represent the tip of a pen, which may have a diameter of approximately 1 mm to 2 mm.

In the embodiment shown in FIG. 25B, the short diagonal of the rhombus may be wider than the pen tip's diameter. In this case, even if the pen moves a certain distance in the vertical direction (from region a to region c), no change in the touch area occurs in the vertically aligned, heterogeneous rhombus shapes. Consequently, it may not be possible to detect the touch coordinates based on the pen's vertical movement.

One solution to this issue is to increase the number of rhombus-shaped CDAs. If the number of rhombus-shaped elements in FIG. 25B is increased to two or more, while ensuring that the maximum width at the central point becomes narrower than the pen tip's diameter, the issue of touch coordinate detection errors caused by the vertical movement of the pen tip can be resolved.

However, increasing the number of rhombus-shaped sub-CDAs presents another challenge. The length of the boundary lines between neighboring CDAs increases proportionally, as the rhombus shape consists of four boundary lines. This leads to an increase in the capacitance formed between boundary lines, which in turn results in reduced detection sensitivity and a lowered SNR (Signal-to-Noise Ratio).

SUMMARY

Technical Problem

The present invention has been proposed to solve the problems of the prior technique as described above, in which a geometric shape different from a rhombus is used to provide a method for detecting vertical touch movements caused by a pen that could not be detected with rhombus shapes, without increasing the number of sub-CDAs.

Technical Solution

To achieve the objectives mentioned above, an embodiment of the present invention comprises the following:

A Primary Shape Capacitive Detection Area (CDA), installed on the upper side of a display device, forms object capacitance in vertical alignment with an object. This CDA connects to CDA signal lines and constitutes a detection sensor.

A Touch Drive IC (TDI) detects object capacitance formed on the Primary Shape CDA.

In a coplanar arrangement, multiple detection sensors are stacked vertically, and the number of CDA signal lines increases proportionally from the far end to the near end relative to the TDI position, while the area of the detection sensors gradually decreases, forming a CDA column.

The Secondary Shape CDA consists of a composite trapezoidal shape formed by combining two trapezoids.

The Primary Shape CDA is formed by interconnecting multiple Secondary Shape CDAs. Different types of Secondary Shape CDAs are vertically arranged at a predetermined interval in the CDA column.

When an object moves vertically across the boundary lines between two vertically separated, different types of Secondary Shape CDAs, the vertical touch coordinates are detected based on the difference in area occupancy ratios of the top and bottom Secondary Shape CDAs.

In addition, a bundle of signal lines formed by a plurality of CDA signal lines constituting a CDA column; when an arbitrary n-the CDA signal line in the signal line bundle is a Sensing Signal Line (SSL), the SSL is adjacent to either (n−1) the, where a first Voltage Forcing Line (VFL) is located and an alternating voltage is applied, or adjacent to the (n+1) the, where a second VFL is located and an alternating voltage is applied. Each VFL adjacent to the SSL is configured with either identical or different line widths, spacing, and facing lengths to form a Parallel-Plate Coplanar structure. Between the SSL and either the first VFL or the second VFL, a Coplanar Capacitor is formed. The SSL is connected on one side to multiple capacitors, and due to the charge supplied by the Coplanar Capacitor, a charge-sharing phenomenon occurs between the Coplanar Capacitor and the multiple capacitors connected to one side of the SSL. Based on this charge-sharing phenomenon, the object capacitance is detected in the form of a voltage on the SSL.

Furthermore, the coplanar capacitance (ccpl(a)) formed between the SSL and either the first VFL or the second VFL is determined as shown in the following [Equation 1].

$$ccpl(a) = \frac{\epsilon r * l(a)}{377 \pi v0} * \ln\left[\frac{-2(k+1)}{k-1}\right] (F) \qquad \text{[Equation 1]}$$

Where:

(a) $ccpl(a) = \frac{\epsilon r * l(a)}{377 \pi v0} * \ln\left[\frac{-2(k+1)}{k-1}\right]$ (b) w(a) is the line width of the SSL and either the first VFL or the second VFL.

(c) d(a) is the separation distance between the SSL and either the first VFL or the second VFL.

(d) l(a) is the facing length between the SSL and either the first VFL or the second VFL at the separation distance d(a).

(e) ϵr is the relative permittivity of the material present between the SSL and either the first VFL or the second VFL.

(f) v0 is the speed of light in a vacuum, approximately 3×108 m/s.

(g) [Equation 1] is valid under the condition that d(a) ≤4.67w(a).

Furthermore, when the detection sensor is made of a conductive transparent material with a predetermined thickness (t1), a rectangular parallel-plate capacitance (cline1) is formed between one side of the SSL and the side of the first VFL, based on [Equation 2]. Similarly, another rectangular parallel-plate capacitance (cline2) is formed between the opposite side of the SSL and the side of the second VFL, as described by [Equation 3].

$$cline1 = \varepsilon 11 \frac{S11}{d11}(F) \quad \text{[Equation 2]}$$

$$cline2 = \varepsilon 11 \frac{S12}{d12}(F) \quad \text{[Equation 3]}$$

Where:
(a) $\varepsilon 11$ is the absolute permittivity of the material between the SSL and the VFL, determined as the product of the vacuum permittivity and the relative permittivity.
(b) d11 is the separation distance between the SSL and the first VFL.
(c) l1 is the facing length between the SSL and the first VFL at the separation distance d11.
(d) S11=t1×l1 (m²).
(e) d12 is the separation distance between the SSL and the second VFL.
(f) l2 is the facing length between the SSL and the second VFL at the separation distance d12.
(g) S12=t1×l2 (m²).

Furthermore, in a state of non-touch, the voltage detected at the SSL is expressed by [Equation 4] and when a touch occurs due to an object, the voltage detected at the SSL is expressed by [Equation 5]. By performing the operation [Equation 4]-[Equation 5], the object capacitance (cobj) is detected in the form of a voltage.

$$\Delta Vp1 = \frac{(Vd2 - Vd1)*(ccpl+cline)}{ccpl + cpr + cc + cline}(V) \quad \text{[Equation 4]}$$

$$\Delta Vp2 = \frac{(Vd2 - Vd1)*(ccpl+cline)}{ccpl + cpr + cc + cline + cobj}(V) \quad \text{[Equation 5]}$$

Where:
(a) Vd1 is the alternating voltage applied prior to Vd2.
(b) $\Delta$Vp1 is the difference between the voltage formed on the SSL when Vd1 is applied and when Vd2 is applied, as defined in [Equation 4].
(c) $\Delta$Vp2 is the difference between the voltage formed on the SSL when Vd1 is applied and when Vd2 is applied, as defined in [Equation 5].
(d) ccpl is the coplanar capacitance formed between the SSL and the first VFL or the SSL and the second VFL.
(e) cpr is the parasitic capacitance formed within the TDI on the SSL, which is one of the multiple capacitors connected to one side of the SSL. A DC voltage of a specific magnitude is connected to the other side of the parasitic capacitor.
(f) cc is the common electrode capacitance formed by the detection sensor and the display device's common electrode layer, which are vertically opposed to each other. It is one of the multiple capacitors connected to one side of the SSL, with a DC voltage (common electrode voltage) connected to the other side.
(g) cline is the rectangular parallel-plate capacitance formed between one side of the SSL and the side of the first VFL, or between the other side of the SSL and the side of the second VFL.
(h) cobj is the object capacitance formed between the sensing CDA connected to the SSL and the object.

Furthermore, in a CDA column, the vertically adjacent secondary shape CDAs form shared areas in the regions between their respective centers. Each secondary shape CDA has one shared area in a primary direction and another shared area in the opposite direction relative to its center.

Furthermore, in shared areas, the area of homogeneous secondary shape CDAs is determined in identical proportions based on their external shapes. The total area of heterogeneous secondary shape CDAs in a shared area is equal.

Furthermore, the total area of heterogeneous secondary shape CDAs within a shared area is identical.

Furthermore, one of the secondary shape CDAs arranged vertically adjacent to each other is configured as a half-shape located on the outer side of the CDA column and faces a heterogeneous CDA signal line with a predetermined spacing.

Additionally, chevron shapes that are regularly arranged in the longitudinal and transverse directions within and outside the secondary shape CDA and peeled off to a predetermined area; and, the outer shape of the secondary shape CDA is formed by the continuous connection of peeled-off chevron shapes in compliance with the arrangement rules of the peeled-off chevron shapes.

Additionally, when the outer shape of the peeled-off secondary shape CDA forms a boundary with an adjacent heterogeneous secondary shape CDA and is separated by a predetermined gap, the gap remains uniform across the entire length of the boundary composed of a single side.

Additionally, no voltage is applied to the SSL.

Advantageous Effects

According to one embodiment of the present invention, it is possible to extract vertical coordinates from pen touch without increasing the number of sub-CDAs configured as rhombus shapes. This suppresses the increase in capacitance resulting from an increase in the number of sub-CDAs, thereby enhancing touch sensitivity and improving the SNR.

The effects of the present invention are not limited to the effects described above but should be understood to include all effects that can be inferred from the structure of the invention described in the detailed description or the claims.

BRIEF DESCRIPTION OF THE FIGURES

FIG. 6 is a graph illustrating the change in coplanar capacitance (ccpl) based on the plate width (w) and plate spacing (d), derived from [Equation 3].

FIG. 19 is a graph illustrating the ratio between inter-line capacitance (cline) and coplanar capacitance (ccpl).

FIG. 23A is an embodiment of the present invention illustrating the calculated values of detected voltages based on CDA positions for the same object capacitance input.

FIG. 29 is an embodiment of the present invention illustrating ADC values calculated based on the arrangement of CDAs in FIG. 28 using [Equation 7].

DETAILED DESCRIPTION

Figure 1:
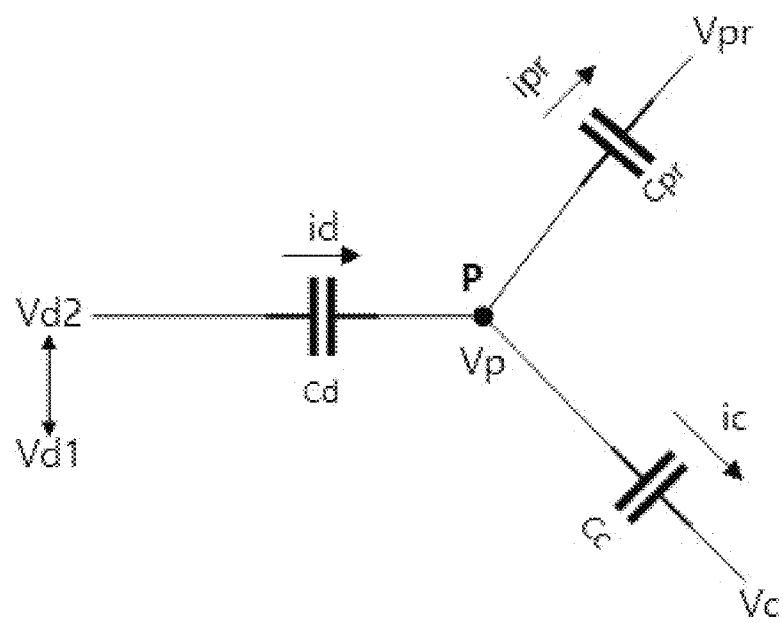
FIG. 1 is an embodiment of the present invention illustrating a model of a capacitive touch input device.

The terminology used in the present invention has been selected with consideration of its functionality and current widespread use. However, it may vary depending on the intent of skilled person in the field, precedents, or the emergence of new technologies. In certain cases, terms have been arbitrarily selected by the applicant, and their meanings are described in detail in the relevant parts of the invention's description. Accordingly, the terms used in the present invention should be defined not simply by their names but by their meanings as determined from the entirety of the invention.

The sizes and thicknesses of components illustrated in the drawings are arbitrarily shown for convenience and are not intended to limit the invention to the depicted configurations. To clearly represent the layers and areas in the drawings, their thicknesses or widths have been relatively exaggerated or reduced. The terms "on," "above," "upper," or "top" used to describe the position of layers, areas, etc., include not only cases where the layer or area is directly above another but also cases where an intermediate layer or part is present. Similarly, "below," "under," or "lower" have corresponding meanings.

Throughout the specification, when a part "includes" a component, it implies that other components may be included unless explicitly stated otherwise. Additionally, terms such as " . . . unit" or "module" refer to units that process at least one function or operation and may be implemented as hardware (H/W), software (S/W), or a combination of both.

Definitions of Terms

In this specification, capacitors are denoted using uppercase letters, while capacitance is denoted using lowercase letters. For example, Cc represents the common electrode capacitor, and cc represents its capacitance. Thus, cc can be interpreted as the capacitance value of the common electrode capacitor.

The capacitive detection device of the present invention may also be referred to as a "system" that outputs voltage for touch input. The equations representing voltage detection at point P are expressed as transfer functions of the system.

The CDA and its connected CDA signal lines are referred to as object detection sensor or detection sensor.

Among the multiple CDA signal lines, the signal line that detects voltage based on the equations provided in the present invention is referred to as the Sensing Signal Line (SSL). The CDA connected to the SSL is termed the Sensing CDA. Since the SSL and Sensing CDA are interconnected, "detecting voltage on the SSL" is equivalent to detecting the object capacitance formed on the Sensing CDA. For example, detecting voltage on an SSL in Areas 2 to 3 or a connection material implies detecting voltage to measure the capacitance added to the connected Sensing CDA.

And a group of multiple CDAs is referred to as a CDA Column, and multiple CDA Columns collectively form a CDA Column Group (or simply Column Group).

When an arbitrary n-the CDA is selected as the Sensing CDA in a CDA column based on a predefined rule, the (n−1)-the CDA is located above the n-tph Sensing CDA, and the (n+1)-to CDA is located below it. And the (n−1)-th CDA signal line is positioned to the right of the SSL connected to the n-th Sensing CDA, while the (n+1)-th CDA signal line is positioned to its left.

When alternating voltage is applied to generate charge for forming coplanar capacitance between the SSL and the adjacent (n−1)-th or (n+1)-th CDA signal line, these signal lines are referred to as Voltage Forcing Lines (VFL). The directional references (above, below, left, right) are determined relative to the TDI but may vary depending on the arrangement of the CDA and CDA signal lines.

In this specification, SSL refers to a single sensing signal line selected from a CDA column according to a predefined method. For instance, when sensing CDAs in a CDA column are sequentially selected from the far end to the near end, the CDA signal lines connected to the farthest CDA are sequentially designated as SSLs. Alternatively, SSLs may be chosen sequentially from odd-numbered CDA signal lines, even-numbered CDA signal lines, or CDA signal lines at arbitrary positions. Thus, in this specification, the nth sensing signal line refers to a sensing signal line selected at any position according to a predefined method, without location restriction. For example, if n=10 represents a sensing CDA, it indicates that the 10th CDA out of 25 CDAs in the CDA column is selected as the sensing CDA. In this case, the (n−1)th VFL corresponds to the CDA signal line connected to the 9th CDA in the same CDA column, and the (n+1)th VFL corresponds to the CDA signal line connected to the 11th CDA in the same CDA column.

In this specification, the CDA located at the farthest position in a CDA column is designated as the first CDA, and the sequence number of the CDA increases as it progresses toward the near end of the CDA column. This sequence is not absolute and can also be defined in reverse order.

Additionally, when CDA signal lines in a CDA column composed of multiple CDAs are sequentially designated as SSLs based on a predefined order, the process of sequentially measuring the voltages formed in the SSLs based on equations provided by the present invention is referred to as "scanning to detect voltages" and abbreviated as "scanning." Accordingly, by scanning all CDAs installed on the surface of the display device, it is possible to determine which CDA within the display device has detected a touch event. The term "processing" may also be used with the same meaning.

Furthermore, in this specification, a "signal line bundle or signal bundle" is defined as a group of multiple CDA signal lines originating from individual CDAs within a CDA column and directed toward the TDI (or vice versa). Due to the fundamental coplanar arrangement of the present invention, the order of CDA signal lines within the signal bundle remains unchanged in Areas 1 through 3 and in the interconnection material, maintaining the integrity of the signal bundle across these regions.

Distances such as far end and near end are defined relative to the TDI 400. The far end refers to a location distant from the TDI, while the near end refers to a location closer to the TDI.

In this specification, a column is defined as the direction in which the number of CDA signal lines increases or decreases relative to the position of the TDI, while the direction orthogonal to the column direction is defined as the row.

The term "forcing or applying a voltage or signal" means that the level of an existing voltage or signal changes. For example, applying a signal to the control terminal of a switching element means that the low-level voltage at the gate terminal of the switching element changes to a high-level voltage.

Applying alternating voltage in this specification refers to applying multiple voltages of different potentials alternately. For instance, if Vd1 and Vd2 are voltages of different magnitudes, alternately applying Vd1 and Vd2 constitutes applying an alternating voltage.

The term "heterogeneous" refers to a Secondary Shape CDA constituting a Primary Shape CDA that is distinct from Secondary Shape CDAs forming another Primary Shape CDA or CDA signal lines connected to other CDAs. Thus, "heterogeneous" refers to electrically separated CDAs or conductors.

All detection sensors described in this specification are arranged in a coplanar arrangement on the same plane. Therefore, the term "opposition" among detection sensors refers to alignment vertically or horizontally in the same layer. For capacitors such as common electrode capacitance, object capacitance, or parasitic capacitance formed across different layers, the term "opposition" refers to vertical alignment across layers. In this specification, "opposition" can be used in two contexts: the first refers to parallel alignment (facing each other in parallel alignment), where two signal lines are separated by a predetermined gap, corresponding to the length L in FIG. 5. The second context refers to vertical alignment (facing each other vertically) across layers, and this case is explicitly noted as such.

Additionally, a CDA in a CDA column is defined as "external" if it faces and is separated from CDA signal lines of a different type extracted from the column at a predetermined gap, with a defined opposing length (or facing length). Even if a Secondary Shape CDA is geometrically located outside the CDA column, the term "external" cannot be used if it does not face a CDA signal line. Conversely, "internal" in a CDA column refers to the installation position of a Secondary Shape CDA that does not face CDA signal lines of a different type in the same column. Secondary Shape CDAs located internally may have CDA signal lines extracted from their longitudinal centers, requiring a narrow spacing where these signal lines face others. However, these conditions are not considered in defining internal and external positions.

Figure 25A:
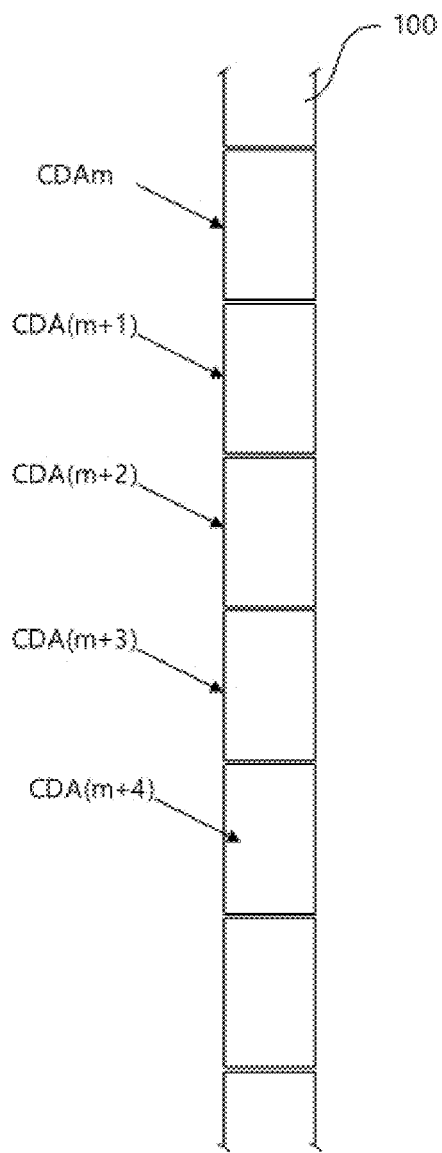
FIG. 25A is an embodiment of the present invention illustrating a rectangular Primary Shape CDA used to indicate the area and position of a CDA.

Referring to FIG. 25A, the Primary Shape CDA is divided at the center of a predetermined separation space formed along its vertical boundaries. The longitudinal length of the Primary Shape CDA refers to the distance between the centers of the vertical sides of two vertically adjacent Primary Shape CDAs, including the separation space.

In this specification, the term "center of the vertical side" refers to the midpoint of the connection between the upper and lower edges of a Secondary Shape CDA.

Lastly, for clarity in explaining the present invention, unrelated portions have been omitted from the drawings, and similar reference numerals have been used for similar parts throughout the specification.

In the following, the embodiments of the present invention will be described in detail with reference to the attached drawings, so that those skilled in the art can easily implement the invention. However, the present invention can be implemented in various forms and is not limited to the embodiments described herein.

Figure 5:
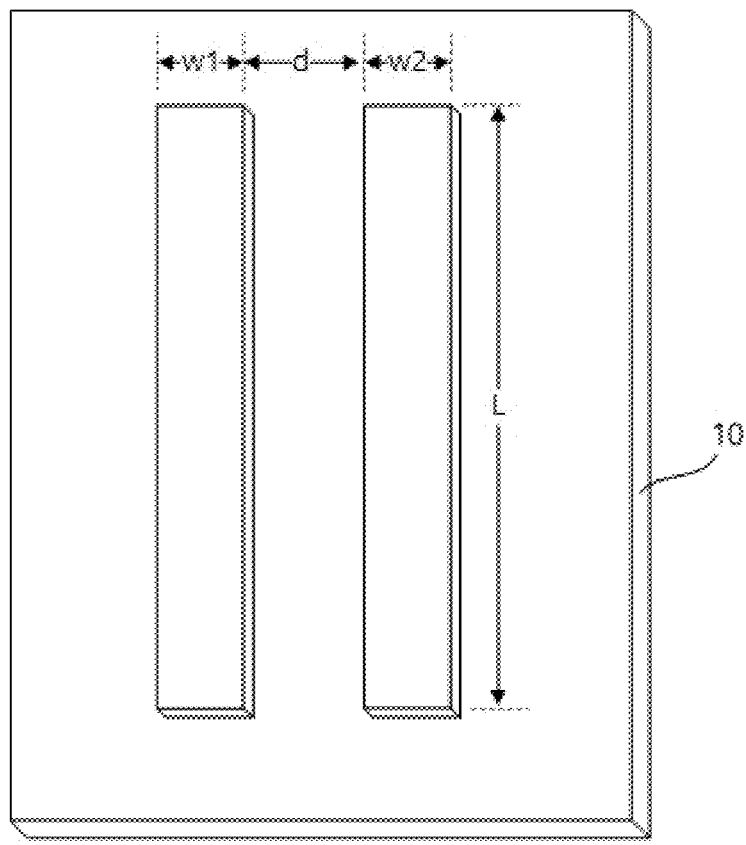
FIG. 5 is an embodiment of the present invention illustrating two conductive plates positioned on the upper surface of a substrate.

FIG. 5 illustrates one embodiment of the present invention, in which two conductive plates are positioned on the upper surface of a lower substrate 10. The lower substrate 10 is made of a non-conductive material with a predefined relative permittivity ($\varepsilon r$) and possesses homogeneous characteristics, meaning that the material is uniform throughout. The homogeneity of the substrate implies that its physical, chemical, and electrical properties are consistent across all parts, exhibiting identical characteristics at any given point. Specifically, this uniformity indicates that the substrate has the same permittivity throughout, no variation in material density, consistent thermal conductivity, and uniform mechanical strength across its entirety.

The lower substrate 10 may be composed of plastic, film, or glass. For film, polyimide (PI) series films can be used. For plastic, high-performance PI, polyethylene terephthalate (PET), or polyethylene naphthalate (PEN) may be utilized.

One embodiment of the lower substrate 10 involves its use as a display device made from glass, plastic, or film. Typically, an LCD display device is manufactured by combining a glass TFT substrate with a color filter glass. An OLED display device, on the other hand, may use glass as a substrate and can also be manufactured using flexible or rollable plastic or film substrates to achieve flexibility.

Another embodiment of the lower substrate 10 involves its fabrication as a flexible printed circuit (FPC) or chip on film (COF) made of PI-based materials.

The conductive plates positioned on the upper side of the lower substrate 10 are made of conductive materials, such as gold, silver, copper, aluminum, metal, lead, tin, or transparent conductive materials like indium tin oxide (ITO), indium zinc oxide (IZO), antimony tin oxide (ATO), or carbon nanotubes (CNT).

The two conductive plates located in parallel on the same layer of the upper surface of the lower substrate 10 form a parallel-plate coplanar arrangement. When a voltage is applied to one of the plates, it generates a polarity corresponding to the applied voltage (positive or negative). If no external power is supplied to the adjacent plate, it acquires an opposite polarity through induced charges created by the electric field. The unpowered plate develops positive or negative charges, resulting in the formation of an electric field between the two plates.

The electrically insulated area between the two plates acts as the dielectric of a capacitor, separating the charges accumulated on each plate and defining the capacitor's electrical properties. The intensity of the electric field between the plates determines the capacitance. In this invention, the capacitance formed between the plates is referred to as coplanar capacitance. The coplanar capacitance depends on the width (w1, w2) and length (l) of the plates, the spacing distance (d) between the plates, and the relative permittivity ($\varepsilon r$) of the dielectric material between the plates. A wider plate width (w1, w2), longer plate length (l), and narrower spacing (d) result in a stronger electric field and increased coplanar capacitance.

According to "Analysis of Multiconductor Transmission Lines, 2nd Ed., Clayton R. Paul (2008)," when w1=w2=w and the plates are separated by distance d, the basic coplanar capacitance (ccpl_basic) is expressed as follows:

$$\text{cpl\_basic} = \frac{\varepsilon r * l}{377 \pi v0} * \ln\left[\frac{-2(k+1)}{k-1}\right] \quad \text{[Equation 3]}$$

Where:

h) $k = \left[1 - \left(\frac{d}{d+2w}\right)^2\right]^{0.25}$ i) w is the width of each plate
j) d is the spacing distance between the two opposing plates
k) $\varepsilon r$ is the relative permittivity of the material between the plates
l) v0 is the speed of light in a vacuum ($\approx 3\times 108$ m/s)
m) l is the length of the plates opposing each other at a spacing distance of d
n) [Equation 3] is valid under the condition d≤4.67w FIG. 6 illustrates a graph depicting the variations in coplanar capacitance (ccpl) based on Plate width w) and Plate spacing (d) as variables, derived from [Equation 3]. Referring to FIG. 6, "Data1" serves as the baseline data. Compared to Data1, "Data2" through "Data4" represent cases where the plate width (w) is doubled sequentially, and "Data5" through "Data7" represent cases where the plate spacing (d) is reduced by 50% sequentially.

The "Remarks" section of FIG. 6 shows the incremental changes in coplanar capacitance (ccpl). The increment is calculated relative to the previous data point.

For instance:
The increase in ccpl for Data2 is 21.6% compared to Data1.
The increment in ccpl for Data3 is based on Data2, and the increment for Data4 is based on Data3.
Similarly, the increase in ccpl for Data5 is calculated relative to Data1, while the increments for Data6 and Data7 are calculated relative to Data5 and Data6, respectively.

From [Equation 3], it is evident that the coplanar capacitance (ccpl_basic) is directly proportional to the length (l) of the two Plates opposing each other at spacing d. Referring to the variations in ccpl shown in FIG. 6, doubling the Plate width (w) or halving the Plate spacing (d) results in a uniform 21.6% increase in ccpl.

However, when Plate width (w) or Plate spacing (d) is continuously doubled or halved, the rate of increase or decrease in ccpl is not linear.

The results of FIG. 6 demonstrate that while ccpl is highly sensitive to Plate length (l), it is less responsive to changes in Plate width (w) or Plate spacing (d). Consequently, when hardware (H/W) methods are used to compensate for ADC non-linearity based on the position of CDAs within a CDA column, the theoretical background provided here can guide adjustments to Plate width (w) or Plate spacing (d).

Figure 7:
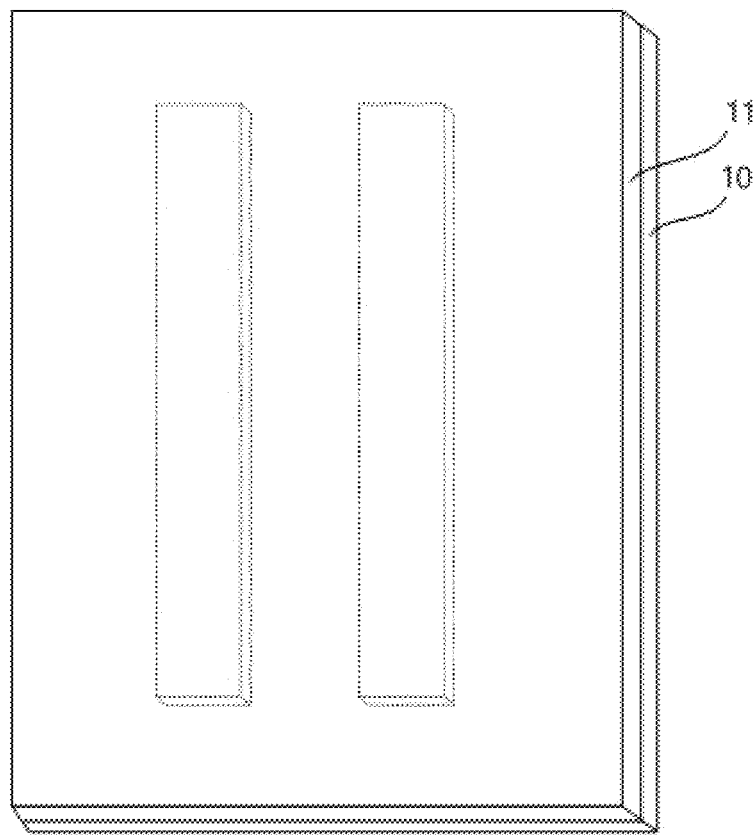
FIG. 7 is an embodiment of the present invention illustrating two conductive plates on the upper surface of the lower substrate with an upper substrate added.

FIG. 7 illustrates an embodiment of the present invention in which an upper substrate 11 is added above the two conductive plates located on the upper surface of the lower substrate 10 in FIG. 5. Although the thickness of the conductive plates is depicted as exaggerated for clarity, in practice, they are extremely thin, measuring only a few thousand angstroms (Å), making it feasible to position them between the two substrates.

When conductive Plates are used as sensors or signal lines, they may be damaged by contact with objects such as fingers or pens. To prevent this, a protective layer like the upper substrate 11 may be added.

Installing a material with a higher absolute permittivity than air on the surface of the conductive plate increases coplanar capacitance. This is because the material added above the Plate enhances the electric field intensity between the Plates, allowing more charge to accumulate on the Plates. The relative permittivity of the upper substrate 11 affects the relative permittivity ($\varepsilon r$) in [Equation 3], and as the relative permittivity of the upper substrate 11 increases, the coplanar capacitance also increases.

Based on this principle, the present invention utilizes the upper substrate 11 on the surface of the conductive parallel Plates. If the Parallel Plate configuration of the present invention is applied to a display device, one of the display device components, such as a polarizer or protective glass, may serve as the upper substrate 11.

Figure 8:
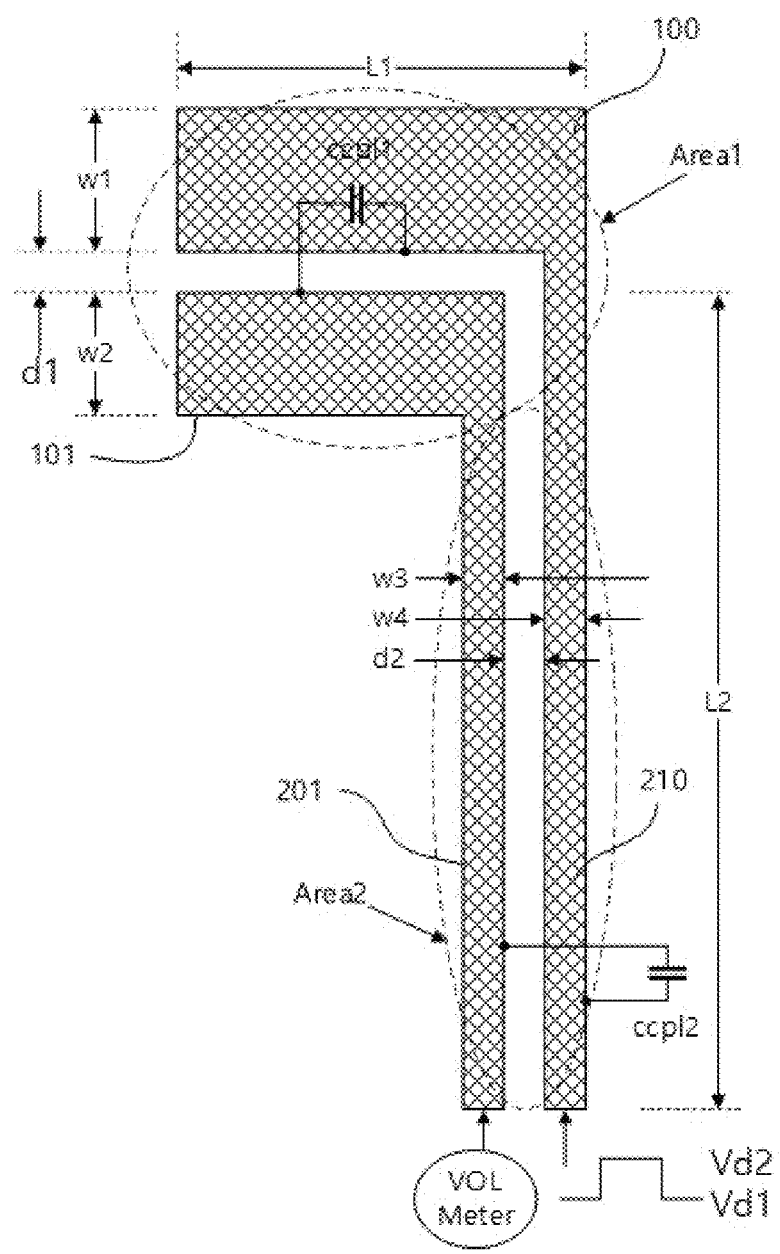
FIG. 8 is an embodiment of the present invention illustrating the formation of coplanar capacitance between two detection sensors.

FIG. 8 illustrates an embodiment of the present invention where two detection sensors form coplanar capacitance. For simplicity, the upper and lower substrates are not shown.

Referring to FIG. 8, the two detection sensors are configured with different geometric shapes in Area1, where the CDA 100 is located, and Area2, where the CDA signal lines 200 are positioned.

Referring to Area 1, the width of the CDA 100 consists of w1 and w2 (assumed w1=w2), and the two CDAs are arranged with a spacing of d1 and a facing length of L1. As described with reference to FIG. 5, the two CDAs arranged in parallel in Area 1 form a coplanar capacitance. Due to the alternating voltage applied to the upper CDA 100, the sensing CDA 101 forms a coplanar capacitance ccpl1 based on [Equation 3]. (Although the lengths of the upper CDA 100 and the lower sensing CDA 101 constituting the length L1 are shown as different, in practice, the difference is minimal, ranging from 100 to 200 μm. For the sake of interpretative convenience, the lengths of the two CDAs are assumed to be the same.)

The width of the CDAs forming Area 1 is tens of times greater than the width of the CDA signal lines forming Area 2, and the spacing between the CDAs in Area 1 may be the same as or different from the spacing between the CDA signal lines in Area 2. As a result, the coplanar capacitance formed per unit length in Area 1 can be larger than that in Area 2.

In Area 2, which consists of CDA signal lines, two CDA signal lines face each other at a predetermined spacing d2, with line widths w3 and w4 (assumed w3=w4), and a length L2 as in the embodiment of FIG. 5. A coplanar capacitance ccpl2 is formed due to the alternating voltage applied to the outer VFL 210. (In Area 2, while the lengths of the left SSL and the right VFL differ, for the sake of interpretative convenience, both are assumed to have the same length L2.)

Since ccpl1 and ccpl2 are coplanar capacitances formed in the sensing CDA 101 and the SSL 201, which are connected as a single unit, it is possible to consider them equivalently as a single coplanar capacitance ccpl12=ccpl1+ccpl2 formed in the SSL 201.

Referring to FIG. 8, when two detection sensors are arranged at a predetermined spacing, and an alternating voltage is applied to one detection sensor (VFL 210) while the other detection sensor (SSL 201) remains in a floating state, a coplanar capacitance ccpl12 is formed between the SSL 201 and the VFL 210.

Applying an alternating voltage to the VFL 210 is equivalent to applying an alternating voltage to one side of the coplanar capacitance ccpl12. Thus, the coplanar capacitance serves the same function as the external capacitor Cext introduced in FIG. 4.

Accordingly, the present invention allows for the formation of a coplanar capacitance between two detection sensors arranged at a predetermined spacing by applying an alternating voltage to one detection sensor (VFL), while the other detection sensor (SSL) remains without an applied voltage. Consequently, there is no need for an external capacitor (Cext) as in the embodiment of FIG. 4, thereby minimizing the area required for the TDI.

Figure 9:
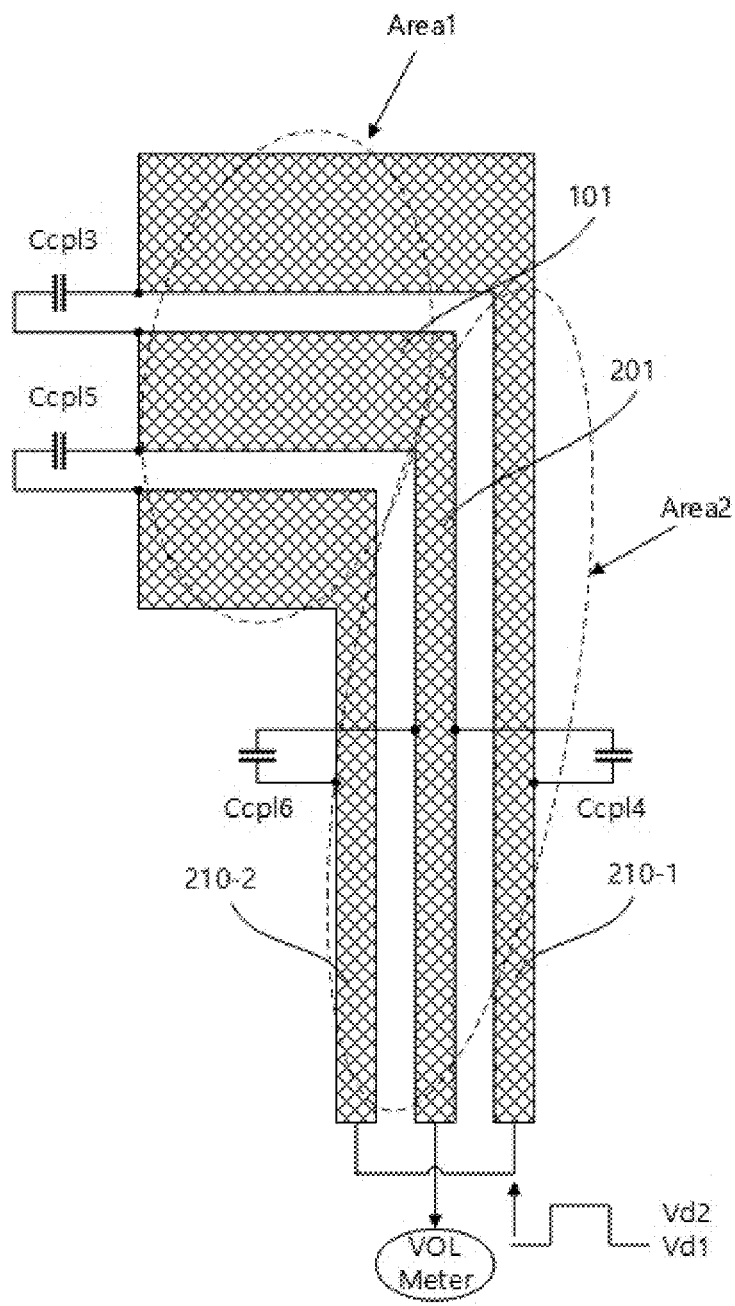
FIG. 9 is an embodiment of the present invention illustrating a capacitive detection device composed of three detection sensors.

FIG. 9 illustrates an embodiment of the present invention involving an object capacitance detection device with three detection sensors installed in the active area of the display device 5, where images are displayed.

Referring to FIG. 9, among the three detection sensors, the sensing CDA 101 is located at the center, while the upper side is occupied by a CDA connected to the first Voltage Forcing Line (VFL) 210-1, and the lower side is occupied by a CDA connected to the second VFL 210-2. The same alternating voltage (Vd1, Vd2) is applied to the first VFL 210-1 and the second VFL 210-2, which are adjacent to the Sensing Signal Line (SSL) 201. As explained in the embodiment of FIG. 8, this configuration forms a coplanar capacitance with a magnitude of ccpl34=ccpl3+ccpl4 between the central SSL 201 and the first VFL 210-1, and a coplanar capacitance with a magnitude of ccpl56=ccpl5+ccpl6 between the SSL 201 and the second VFL 210-2.

When the same alternating voltage with a common ground is applied to both the first VFL 210-1 and the second VFL 210-2, the coplanar capacitances ccpl34 and ccpl56, which are connected in parallel to the SSL 201, can be equivalently combined into a single coplanar capacitance ccpl36, expressed as ccpl36=ccpl34+ccpl56.

Therefore, ccpl36=ccpl3+ccpl4+ccpl5+ccpl6.

Figure 10:
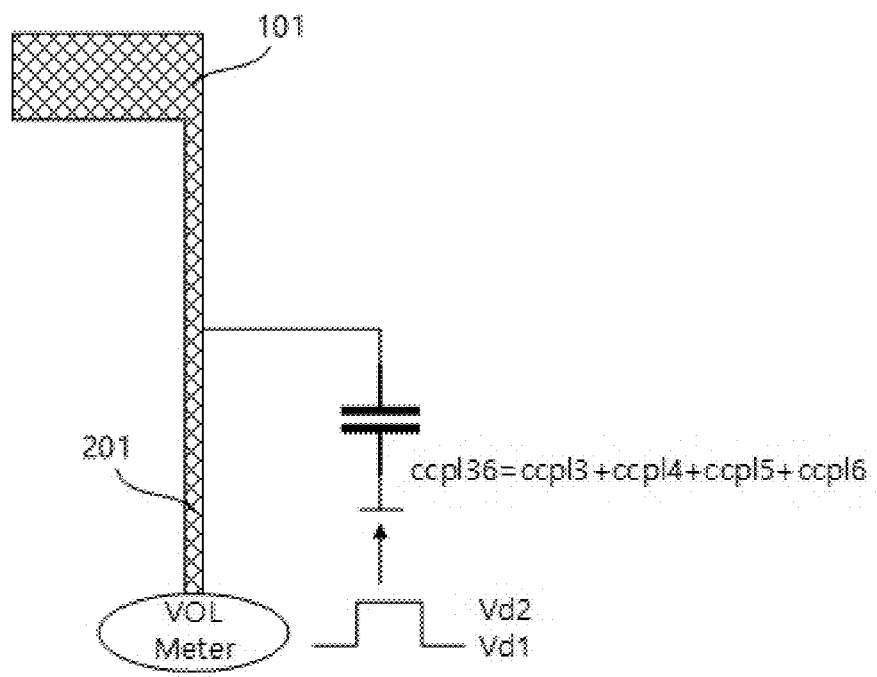
FIG. 10 is an embodiment of the present invention illustrating an equivalent circuit of the capacitive detection device in FIG. 9.

FIG. 10 illustrates an equivalent circuit of FIG. 9. As shown in FIG. 10, one side of the coplanar capacitance ccpl36 is connected to the SSL 201, while the other side of ccpl36 is connected to the alternating voltage (Vd1, Vd2). The structure of FIG. 10 is identical to that of FIG. 4. Therefore, by arranging three detection sensors at predetermined intervals and applying alternating voltages to the two VFLs 210 adjacent to the central SSL 201, it is possible to detect a voltage based on the equations of the present invention, such as [Equation 1] and [Equation 2], or the subsequent equations [Equation 7] and [Equation 8]. The detected signals can then be analyzed to detect the touch of an object, all without requiring an external capacitor (Cext), thereby optimizing the TDI area and improving cost efficiency.

A single CDA column consists of tens of CDAs, and only one CDA in each CDA column should function as an SSL

201. This is because selecting multiple SSLs in the same CDA column to detect the voltage formed on the SSLs could result in crosstalk between SSLs in the narrow CDA signal bundle on one side of the CDA column, causing abnormalities in the detected signal and leading to detection errors.

Meanwhile, the embodiment of FIG. 8 can be considered as modeling the two detection sensors located at the topmost and bottommost positions of the CDA column. For instance, at the topmost position of the CDA column, if the upper detection sensor operates as an SSL 201, alternating voltage is applied only to one VFL 210 adjacent to the upper CDA and located below it. Similarly, at the bottommost position of the CDA column, if the lower detection sensor operates as an SSL 201, alternating driving voltage is applied only to one VFL 210 adjacent to the lower CDA and located above it.

While the embodiments of FIG. 8 and FIG. 9 describe applying alternating voltage to one or a pair of VFLs adjacent to the SSL on both sides, the VFLs can also be composed of multiple pairs or several individual lines. A larger number of VFLs may be employed not only to increase the coplanar capacitance but also to differentiate large-area touches such as pseudo touches caused by water or palm touches.

Figure 11:
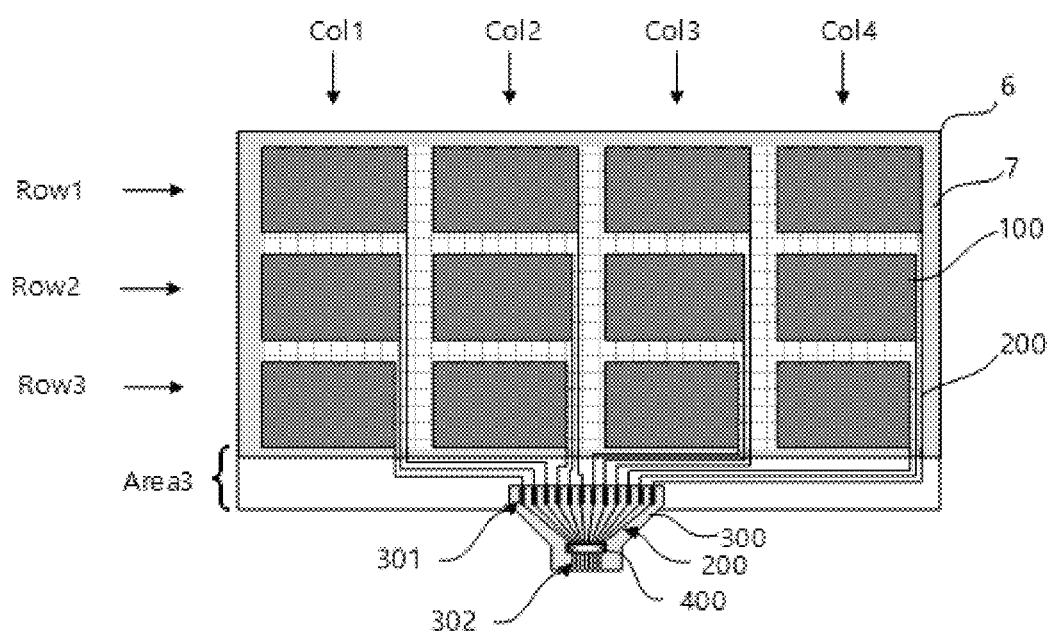
FIG. 11 is an embodiment of the present invention illustrating a display module where a capacitive detection device is installed.

FIG. 11 illustrates an embodiment of the present invention concerning a display device module in which a capacitive detection device is installed. Referring to FIG. 11, the detection sensor 100, 200 can be installed on the upper surface of the Color Filter Glass 6 or on the upper or lower surface of the polarizer 7 constituting the display device. Alternatively, a separately made capacitive detection device may be integrated with the display device. The separate capacitive detection device may consist of detection sensors patterned on glass or film. When the detection sensors are patterned on separate glass, the glass is installed on the upper side of the display device, serving both as a protective layer and a detection device. If the separate capacitive detection device is integrated with the display device via a specific gap or an Optically Clear Adhesive (OCR), the separate glass will act as the lower substrate 10, while the polarizer or the Color Filter Glass 6 below the polarizer will act as the upper substrate 11. When the detection sensors are patterned on separate film, the film may be installed above the polarizer of the display device, with additional protective layers, such as tempered glass or plastic, applied above the film.

In FIG. 11, the active area is represented as a fine rectangular grid. A polarizer 7 is installed on the upper surface of the active area. The detection sensors, composed of CDAs with a specific area and signal lines of a predefined width, form a Parallel-Plate Coplanar arrangement with other detection sensors in virtual Area1 and Area2, spaced apart by a certain distance. As a result, coplanar capacitance is formed between SSL and VFL due to the application of alternating voltage.

Touch Drive IC (TDI, 400) can be installed in the non-visible area on one side of the display device (or Color Filter Glass) or externally in an interconnection material 300.

The interconnection material 300 can be manufactured as a Flexible Printed Circuit (FPC), Chip On Film (COF), or Tape Carrier Package (TCP). The bonding section 301 of the interconnection material 300 can be connected to the display device through a bonding process using heat compression or via a connector. CDA signal lines 200, originating from TDI 400, are connected to the CDAs installed on the display device via the bonding section 301. The CDAs are installed in the active area of the display device where images are displayed and may also be installed in some areas of the non-active region.

The connection section 302 on the opposite side of the interconnection material 300 is connected to a PCB or similar component (not shown). Through the connection section 302, the TDI 400 receives control signals and power supplies or outputs information such as the coordinates of an object or data received from a pen, which is then transmitted to an external Host CPU.

The positions of the detection sensors within the display device are as follows:

1) In the case of an LCD, the detection sensors are formed on the upper surface of the Color Filter Glass, specifically at the attached part where the Color Filter Glass and the polarizer are joined, or on the lower or upper side of the polarizer.
2) In the case of OLED, the detection sensors can be formed on the upper surface of the cathode after passivation is applied, specifically on the upper surface of the passivation layer.
3) In the case of OLED, the detection sensors can be formed on the upper surface of a PI (Polyimide)-based thin film or on the upper or lower surface of an encapsulation glass, which serves as the OLED encapsulation substrate.
4) In the case of OLED, the detection sensors can be formed on the upper or lower surface of the OLED phase difference film.
5) The detection sensors can be formed on an independent glass or film, which is then combined with the display device from the top.

When the LCD is of the VA (Vertical Alignment) type, a common electrode is installed on the inner side of the Color Filter Glass 6. In this case, as in case 1 for LCDs, if detection sensors are installed, a common electrode capacitor (Cc) is formed between the detection sensor and the common electrode, with the common electrode capacitance "cc" as its magnitude.

For an LCD of the VA (Vertical Alignment) type, a common electrode is installed inside the Color Filter Glass 6. When detection sensors are installed as in the LCD example above, a common electrode capacitor (Cc) with a capacitance cc is formed between the detection sensors and the common electrode.

For an LCD of the IPS (In-Plane Switching) type, the CDA installed above the Color Filter Glass 6 may function as both a background and a CDA, forming a common electrode capacitor (Cc) between the CDA and the TFT substrate located below the Color Filter Glass.

In the cases of embodiments 2) to 4), where the detection sensor is installed on the upper surface of the OLED cathode, a common electrode capacitor (Cc) is formed between the detection sensor and the OLED cathode.

In the embodiment 5), where the detection sensor is installed on a separate glass or film located on the upper side of the display device, the detection sensor is positioned to face the visible area of the display device vertically and may also be installed on part of the non-visible area. If the display device is a VA-type LCD, a common electrode capacitor (Cc) is formed between the detection sensor and the common electrode layer 3 located on the lower Color Filter Glass 6. In the case of an IPS-type LCD, a common electrode capacitor (Cc) is formed between the detection sensor and the common electrode of the background formed on the upper or lower side of the Color Filter Glass 6 or the TFT substrate. Additionally, if the display device is an OLED, a common electrode capacitor (Cc) is formed between the detection sensor and the cathode of the OLED.

When the capacitive detection device of the present invention is used outside a display device, such as in elevator buttons or control buttons for machinery, and no common electrode or cathode exists beneath the CDA, a common electrode capacitor is not formed. Consequently, the common electrode capacitance (cc) term in the denominator of [Equation 1] and [Equation 2] is removed, resulting in a greater detection sensitivity for the same object capacitance (cobj).

Figure 12:
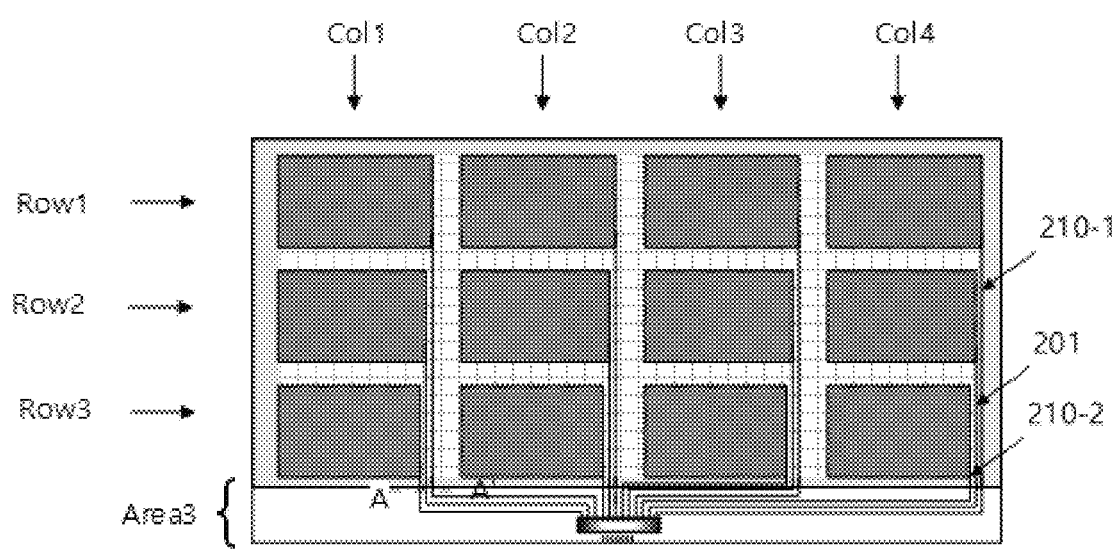
FIG. 12 is an embodiment of the present invention illustrating the placement of a Touch Drive IC (TDI) on one side of a display device.

In this specification, columns are defined as the direction in which the number of CDA signal lines 200 increases or decreases based on the position of TDI 400. In FIG. 12, the number of signal lines decreases from three to one in the upward direction from the lower side where TDI 400 is located, thus defining the vertical direction as a column. The horizontal direction, perpendicular to the column, is defined as a row. In FIG. 11, columns are denoted as Col1 to Col4, and rows are denoted as Row1 to Row3. CDA coordinates are expressed as combinations of columns and rows. For example, the coordinates of the CDA located at the intersection of Col1 and Row2 are denoted as C1R2.

In the present invention, a "CDA column" is defined as a configuration of multiple CDAs aligned vertically within the same column, where the number of CDAs increases proportionally to the distance from the far side to the near side, based on the position of the Touch Drive IC (TDI, 400). The CDA column in the present invention exhibits the following characteristics:

Within a CDA column, one end of each CDA signal line 200 is connected to one side of a CDA 100, while the other end of the CDA signal line 200 is not connected to any signal components other than the input terminal of the TDI 400. Along its path, the signal line may be connected to the input terminals of circuit elements such as a multiplexer, operational amplifier, or comparator. However, such connections do not involve connections to any other signal(s).

Each CDA is only connected to one side of the CDA signal line on one side of the CDA and is not connected to any other signal line(s) or signal components.

Multiple CDA signal lines originating from CDAs within a CDA column form a CDA signal line bundle while maintaining a specific spacing. Within a single signal line bundle, the spacing between CDA signal lines may be uniform or varied. The CDA signal line bundle is arranged on one side of the CDA column and connected to the TDI installed in Area3 or the connection member, as described later. The arrangement of signal lines in the CDA signal line bundle, whether positioned on one side of the CDA column or within Area3 or the connection member, does not change.

As the number of CDAs increases from the far side to the near side, the number of CDA signal lines constituting the CDA signal line bundle also increases.

A bundle of CDI signal lines forming a single CDA column is arranged in only one direction toward the TDI. For example, a CDA group with separate signal line bundles oriented toward both the upper and lower sides of the display device is considered as two distinct CDA columns.

As the number of CDAs increases from the far side to the near side, the area of the CDAs positioned closer to the near side gradually decreases. This is because the number of CDA signal lines 200 increases proportionally with the growing number of CDAs in the near direction.

The signal line bundle can be laid out on either the left or right side of the CDA column or on both sides simultaneously.

Only one CDA column exists along the vertical axis of the display device.

According to the definition of a CDA column that constitutes the capacitance detection device of the present invention, FIG. 11 shows four CDA columns (Col1 to Col4), with each CDA column including three CDAs.

Figure 13:
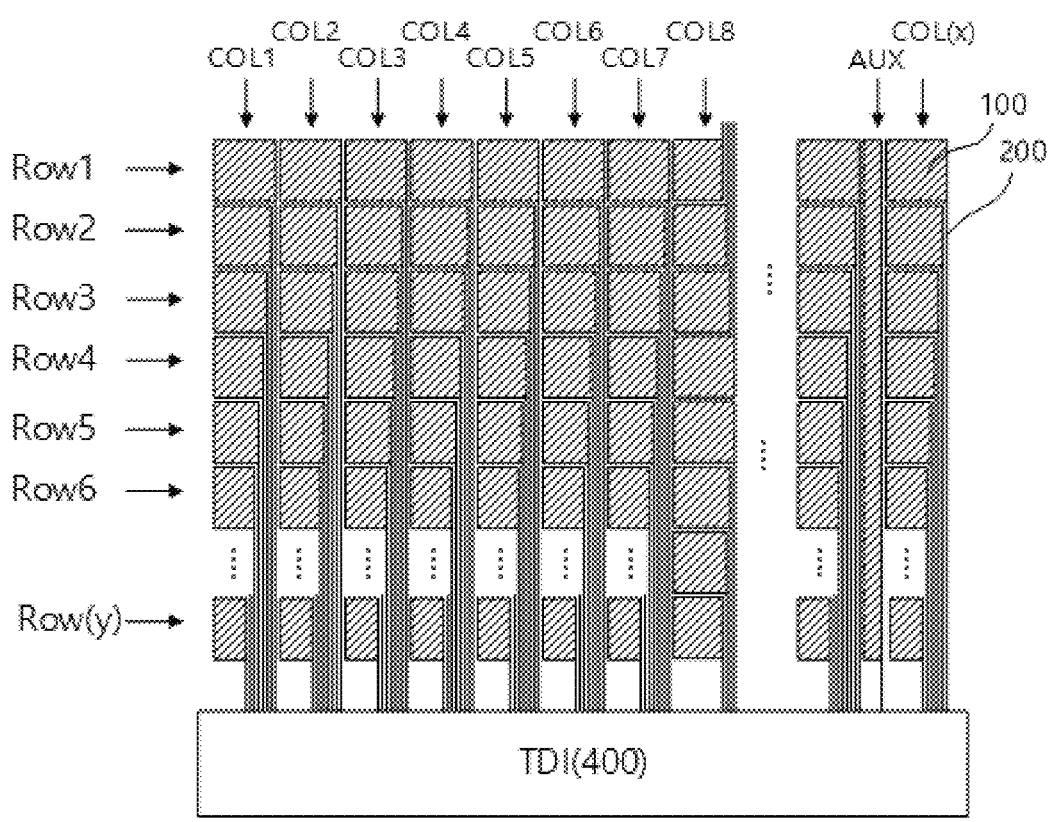
FIG. 13 is an embodiment of the present invention providing a detailed description of the characteristics of a CDA column.

FIG. 13 illustrates an embodiment providing a detailed explanation of CDA column characteristics. Assuming that each CDA measures 5 mm×8 mm (width×height), a 16-inch landscape type display in a laptop could accommodate approximately 70 CDA columns, each consisting of 25 individual CDAs, totaling about 1.75 k CDAs.

To avoid excessive bezel width in Area 3 due to the large number of pin connections required for a single TDI 400, the typical design limits each TDI to about 500-800 signal connection pins. Therefore, 1.75 k CDA signal lines would require two or three TDIs. Accordingly, the TDI 400 in FIG. 13 could consist of one or multiple TDIs.

In the example of Col8 in FIG. 13, the upper four CDA signal lines 200 are arranged in the direction opposite the TDI 400. Thus, Col8 is considered two separate CDA columns. If these signal lines are connected to a different, non-illustrated upper TDI or routed via the display's left or right bezel to the lower TDI 400, it could result in increased bezel width and reduced commercial viability. Alternatively, signal line routing through the left or right bezel to the lower TDI 400 would increase line resistance, coplanar capacitance, or common electrode capacitance, leading to longer detection times due to increased time constants.

The embodiments of Col1 to Col7 in FIG. 13 satisfy all eight CDA column characteristics defined above and can thus be classified as CDA columns.

Referring back to FIG. 11, the display device consists of an Active Area (or visible area) where images are displayed and a non-Active Area (or non-visible area), including the bezel. Recent trends in smartphones, laptops, and monitors have increased demand for narrow bezels, as narrower bezels enhance screen immersion. In response to this market demand, display manufacturers are striving to minimize bezel widths.

When the display device is an LCD, it consists of a lower TFT substrate (not shown) and an upper Color Filter Glass 6, hereinafter referred to as C/F). The TFT substrate and C/F substrate are bonded together and integrated using UV-curable adhesives, thermosetting adhesives, or OCA (Optically Clear Adhesive).

In FIG. 11, the surface of the C/F 6 is covered by a polarizer 7 indicated in gray, which overlays both the active area and part or all of the four-side bezel. Although not shown, the surface of the polarizer may also be supplemented with protective materials such as protective glass or plastic.

As shown in the embodiment of FIG. 11, when the CDA 100 and CDA signal lines 200 are placed on the upper surface of the C/F 6, and the polarizer 7 is positioned on the upper surface of the CDA 100 and CDA signal lines 200, the C/F acts as the lower substrate 10, while the polarizer and protective glass or plastic function as the upper substrate 11. Therefore, to enhance the coplanar capacitance in the present invention, a polarizer 7 or protective material with a high relative permittivity is used, and to reduce the coplanar capacitance, materials with low relative permittivity are preferred.

In this invention, the area within the active region where the coplanar capacitance is formed between CDAs 100 is defined as "Area1," and the area where the coplanar capacitance is formed between CDA signal lines 200 in the active region is defined as "Area2." Both Area1 and Area2 are virtual spaces.

To implement narrow bezel designs, the lower bezel of the C/F 6, where the interconnection material 300 is located, is designed and manufactured with minimal surface area. The lower bezel of the C/F 6 is a non-active area used for extending hundreds of CDA signal lines, supplied through the interconnection material 300, to connect with the CDA signal lines 200 in the active area. This region is commonly referred to as the "Fanout area," and in this invention, it is defined as a virtual "Area3."

In OLEDs, Area3 can be formed on the TFT substrate in areas without encapsulation or phase difference film or installed on the encapsulation substrate retardation film.

As described above, when over 500 CDA signal lines are drawn out from the TDI 400, in Area3 of FIG. 11, more than 250 CDA signal lines on each side of the interconnection material 300 must be fanned out. Assuming a pitch of 20 μm for each fan-out CDA signal line, the width of Area3 could exceed 5 mm for 250 fan-out signal lines, and considering the installation of the interconnection section 301 of the interconnection material 300, it should be at least 6 mm.

If the fan-out of CDA signal lines in the capacitive detection device of this invention causes an increase in bezel width, it reduces the marketability of the display device. Hence, efforts to minimize bezel width are necessary. To this end, in some cases, the pitch of CDA signal lines in Area3 is limited to within 15 μm, or metal mesh is used to fabricate CDA signal lines with pitches within several micrometers. Consequently, in Area3, the width (w) of signal lines and the spacing (d) between signal lines must adhere to stricter design rules compared to Area1 or Area2.

In Area3, based on the combination of signal line width (w), spacing (d), and facing length (l) of CDA signal lines 200, the SSL and VFL form a Parallel-Plate Coplanar arrangement, and between the SSL 201 and VFL 210 in Area3, a coplanar capacitance is formed based on [Equation 3].

The coplanar capacitance formed between the SSL 201 and the first VFL 210-1 in Area3 is referred to as ccpl_A31, while the coplanar capacitance formed between the SSL 201 and the second VFL 210-2 is referred to as ccpl_A32. Since ccpl_A31 and ccpl_A32 are connected in parallel between the SSL 201 and the VFL, they can be added in the form of a sum to the total capacitance (Ccpl) derived in FIG. 10.

Meanwhile, Area3 in FIG. 11 can be divided into a section with an upper substrate 11, such as a polarizer or protective material, and a larger section without it. In the section of Area3 without an upper substrate, the relative permittivity (εr) used in [Equation 3] may be smaller than that of the display regions where Area1 and Area2 are located. To adjust the coplanar capacitance in the area of Area3 without an upper substrate, a protective material such as silicone or UV-curable adhesives, which serves as an alternative to the upper substrate 11, can be applied. By adjusting the relative permittivity and thickness of the applied protective material, the coplanar capacitance can be controlled. For uniform coplanar capacitance formation, it is desirable to maintain a consistent application thickness, with a step height preferably within 500 μm.

Thus, this invention calculates the coplanar capacitance formed by the interaction of the SSL 201 and VFL 210 in the active regions of Area1 and Area2, and the coplanar capacitance formed by their interaction in the non-visible fan-out region of Area3. By summing the coplanar capacitances calculated in Area1, Area2, and Area3, the total coplanar capacitance formed on the SSL is determined. (The above interactions involve applying alternating voltages to the CDA signal lines adjacent to the SSL.)

Additionally, in Area1, Area2, and Area3, the sensing signal line's width (w), and/or spacing between lines (d), and/or facing length (l) may differ, resulting in variations in the calculated coplanar capacitance for each area.

Furthermore, while Areas 1 and 2 within a single display device share the same upper substrate 11, Area3 may lack an upper substrate 11 or use a different upper substrate 11 than Areas 1 and 2. Consequently, the relative permittivity (εr) in Area3, based on [Equation 3], may differ from the relative permittivity in Areas 1 and 2.

Referring back to FIG. 11, the TDI 400 is located on one side of the interconnection material 300, and the CDA signal lines 200 originating from the TDI 400 are connected one-to-one with the CDA signal lines positioned in the fanout area of Area 3 through the bonding section 301. The CDA signal lines 200 originating from the TDI 400 located in the interconnection material 300 are arranged in parallel on the same layer of the interconnection material 300 with a predetermined line width and spacing (d) between neighboring signal lines. This arrangement forms a parallel-plate coplanar structure, and coplanar capacitance is also formed on the sensing signal lines located in the interconnection material. The signal lines originating from the CDA in the interconnection material can gradually widen their spacing as they approach the bonding section 301. In such cases, the spacing between the two signal lines can be determined using the average spacing.

Thus, in this invention, coplanar capacitors are formed between the SSL and its neighboring VFL located in the interconnection material 300. Moreover, the total coplanar capacitance formed on the SSL's path, originating from the TDI 400 in the interconnection material and passing through Area 3 and Area 2 to Area 1 of the display device, is obtained by summing the coplanar capacitances from the interconnection material and Areas 1 through 3.

In FPCs or COFs used as interconnection materials 300, the CDA signal lines are manufactured with fine line widths through a patterning process. The minimum pitch of CDA signal lines is approximately 22 μm for COF and around 110 μm for FPC. Based on the explanation derived from FIG. 6, when the line width doubles, the coplanar capacitance increases by approximately 20%, and when the spacing between signal lines doubles, the coplanar capacitance decreases by about 20%. Therefore, by adjusting the line width and spacing of the interconnection material's signal lines, it is possible to fine-tune the coplanar capacitance, and this technique can be used as a hardware improvement method to correct non-linearity in detection signals based on CDA position.

The interconnection material 300 has the following distinctive characteristics compared to the virtual Areas 1 through 3 of the display device:

1) The interconnection material 300 is used as the lower substrate 10, and no upper substrate is used in the interconnection material. However, materials such as silicon or UV-curing agents may be coated or applied to protect the signal lines formed on the interconnection material.
2) The relative permittivity (εr) of the interconnection material may differ from that of objects composing the display device.
3) The line width (w), spacing between adjacent signal lines (d), or facing length (l) of the signal lines in the interconnection material may differ from the corresponding w, d, and l values in the virtual spaces designated as Areas 1 through 3 within the display device.

Figure 22A:
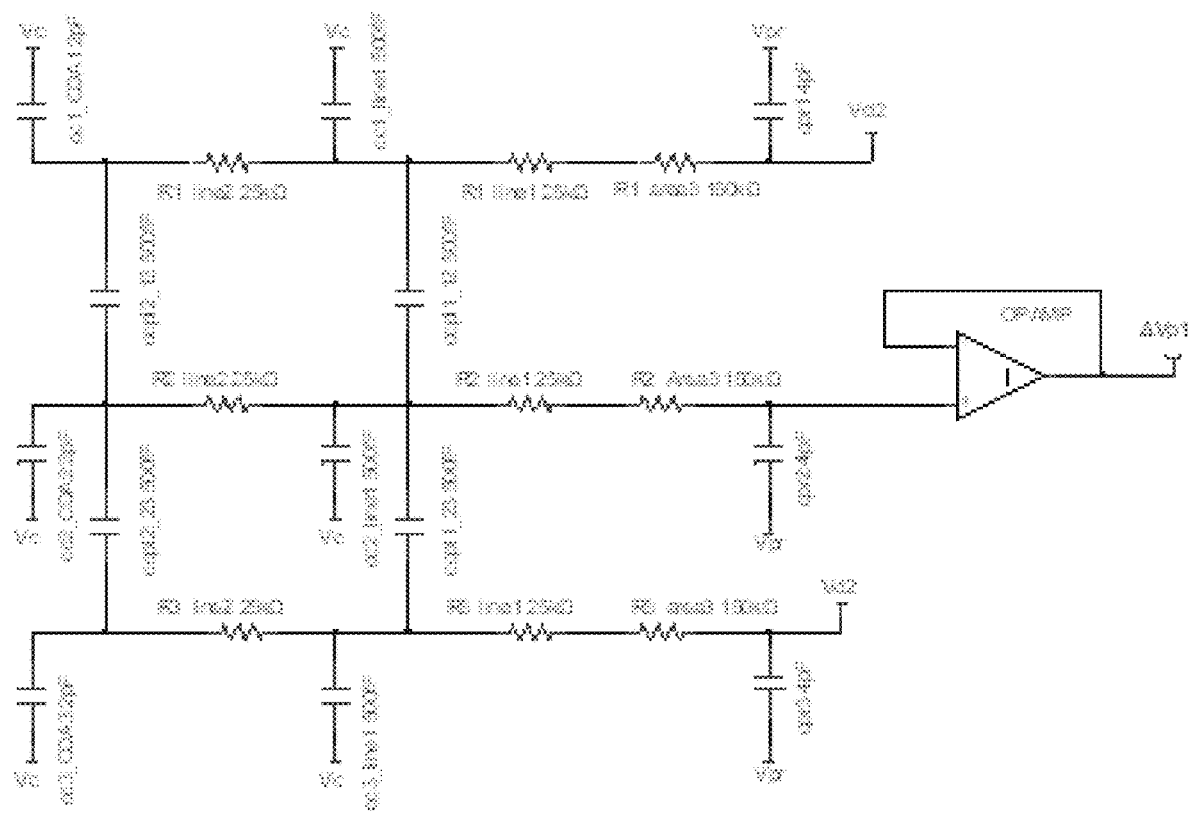
FIG. 22A is an embodiment of the present invention illustrating a model of a sensing CDA and SSL located second from the bottom in an arbitrary CDA column.

Referring to FIG. 22A, the voltage change detected on the SSL due to the same object capacitance becomes larger as the coplanar capacitance decreases. In other words, detection sensitivity increases as coplanar capacitance decreases. Therefore, it is desirable to minimize coplanar capacitance in Areas 1 through 3 and the interconnection material by adjusting the design parameters that form the coplanar capacitance.

Among the design parameters, the facing length (l) is fixed in Areas 1 and 2 depending on the position of the CDA, so it cannot be changed. However, in Area 3 and the interconnection material, it is desirable to minimize the opposing length between two signal lines by laying out the CDA signal lines in a slanted, short-distance path rather than a horizontal and vertical dualized path.

In Area 3, the CDA signal lines are arranged in horizontal and vertical dualized paths, as shown in FIG. 11, which has the disadvantage of longer lengths compared to diagonal paths like the hypotenuse of a triangle. Therefore, in the fanout area of FIG. 11, it is preferable to arrange the CDA signal lines at a predetermined angle along diagonal paths.

In the fanout area of Area 3, where hundreds of signal lines must be arranged in a narrow region, it is preferable for the signal line width (w) to be less than 10 µm and the spacing between signal lines also to be less than 10 µm. When the interconnection material is COF, the signal line width (w) is preferably within 20 µm, and the spacing between signal lines is also designed and manufactured within 20 µm. When the interconnection material is FPC, the signal line width (w) is preferably within 100 µm, and the spacing between signal lines (d) is also designed and manufactured within 100 µm. Such design rules are determined to minimize coplanar capacitance and optimize layout in narrow regions.

In the example of FIG. 12, the TDI 400 is installed in a non-visible area on one side of the display device. Preferably, it is installed in the lower bezel area (Area 3) of the C/F 6, which serves as the lower substrate for CDA in LCDs. In OLED displays, the TDI 400 can be installed in non-visible areas on the upper side of the passivation layer on the cathode, or the upper or lower side of the encapsulation substrate or retardation film.

As referenced in FIG. 22A, for improving detection sensitivity, reducing the coplanar capacitance is advantageous. Therefore, to eliminate the coplanar capacitance formed on the interconnection material 300 and reduce costs by removing the interconnection material, the TDI 400 can be installed on one side of the display device, specifically in Area 3.

The operational range of the ADC, one of the volt meters used to detect the voltage of the sensing signal line, is determined by the top bias voltage and bottom bias voltage. If the voltage range detected at point P is set considering only Areas 1 and 2 of the display device and the ADC's operational range is determined accordingly, the exclusion of the coplanar capacitance in Area 3 and the interconnection material will result in an operational range narrower than the actual detection range. Consequently, defining the ADC's operational range without an accurate theoretical basis may lead to an error of excessively setting the ADC's operational range to ensure safe operation. To address this issue, considering the coplanar capacitance in Area 3 and the interconnection material (non-active areas) when determining the ADC's operational range allows the derivation of an optimized ADC operational range, thereby enhancing the resolution of the ADC.

The following describes one embodiment of the present invention regarding the common electrode capacitance formed on the CDA signal line. A detection sensor installed on the surface of a conductive material with a predetermined potential, such as the common electrode layer of an LCD (Vcom layer) or the cathode layer or conductive layer of an OLED, is positioned vertically opposing the sensor at a predetermined distance and area. As a result, a capacitor with a magnitude of $$cc = \varepsilon 2 \frac{s2}{d2} (F)$$

is formed (d2 is the vertical distance between the detection sensor and the common electrode layer; S2 is the area of the detection sensor vertically opposing the common electrode layer, which is the sum of the areas of the CDA and CDA signal line; $\varepsilon 2$ is the absolute permittivity of the material between the detection sensor and the common electrode).

Figure 14:
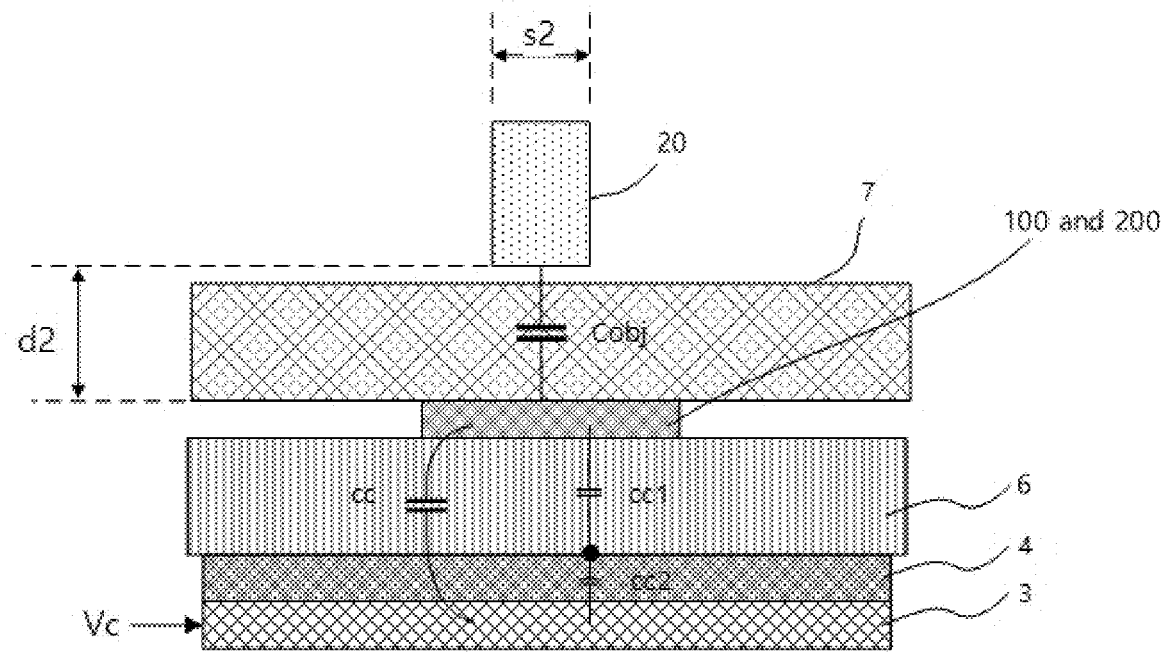
FIG. 14 is an embodiment of the present invention illustrating the formation of common electrode capacitance (cc).

FIG. 14 illustrates an embodiment of the present invention concerning the formation of the common electrode capacitance (cc) using an LCD display. As shown in FIG. 14, detection sensors (CDA 100 and CDA signal line 200) are positioned on the upper surface of the Color Filter Glass 6, which acts as the lower substrate. Below the Color Filter Glass 6 are the Red/Green/Blue Color Layers 4, and beneath the Color Layers 4 is the conductive common electrode layer 3. In Vertical Alignment (VA)-type displays, the common electrode layer 3 is located within the Color Filter Glass 6, while in In-Plane Switching (IPS)-type displays, it is positioned on the TFT substrate. The embodiment described pertains to VA-type LCDs, though the same theory applies to IPS-type LCDs.

Between the detection sensor and the Color Layer 4, a capacitance cc1 based on the permittivity of the Color Filter Glass 6 and a capacitance cc2 based on the permittivity of the Color Layer 4 are formed in series. Consequently, the common electrode capacitance (cc) formed between the detection sensor and the common electrode layer 3 can be determined as the series connection of cc1 and cc2. Since the absolute permittivities of the Color Filter Glass 6 and the Color Layer 4 differ, different absolute permittivity values must be used in the calculations for cc1 and cc2.

If the display device in FIG. 14 is assumed to be an OLED rather than an LCD, reference numeral 6 corresponds to the encapsulation substrate, numeral 3 represents the cathode, and numeral 4 is replaced by the passivation layer on the upper surface of the cathode. Capacitors cc1 and cc2 are formed in the same manner as in the LCD embodiment.

Referring to Equations 1 and 2, the alternating voltages (Vd1, Vd2) and charge-supplying capacitance are situated in the numerator of the equations. The common electrode voltage (Vc), connected to the common electrode capacitance (cc), is a DC voltage and does not alternate. Therefore, the common electrode capacitor cannot act as a charge supplier and is not included in the numerator of Equations 1 and 2, but only in the denominator.

Figure 2:
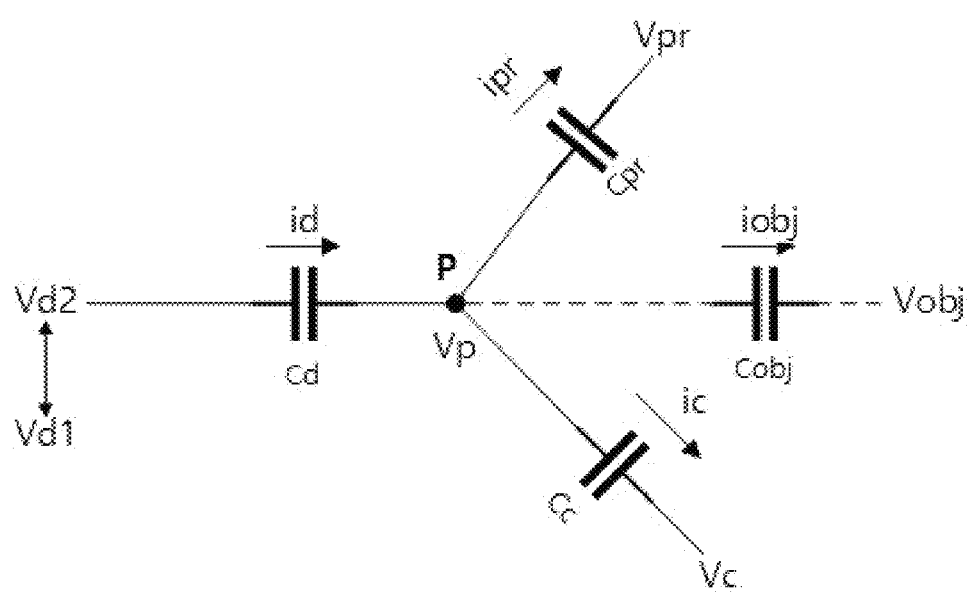
FIG. 2 is an embodiment of the present invention illustrating a model of a capacitive touch input device incorporating an object capacitor (Cobj).

The common electrode capacitor (Cc) explained in FIG. 14 is applied to Cc in FIGS. 1 and 2. In FIGS. 1 and 2, one side of the common electrode capacitor is connected to point P, representing the SSL, while the other side is connected to the common electrode voltage (Vc). Additionally, when charge is supplied from the coplanar capacitor (Cd) via alternating voltages (Vd1, Vd2), a charge-sharing phenomenon occurs at point P, resulting in a voltage change detected at point P, i.e., the SSL 201.

Figure 15:
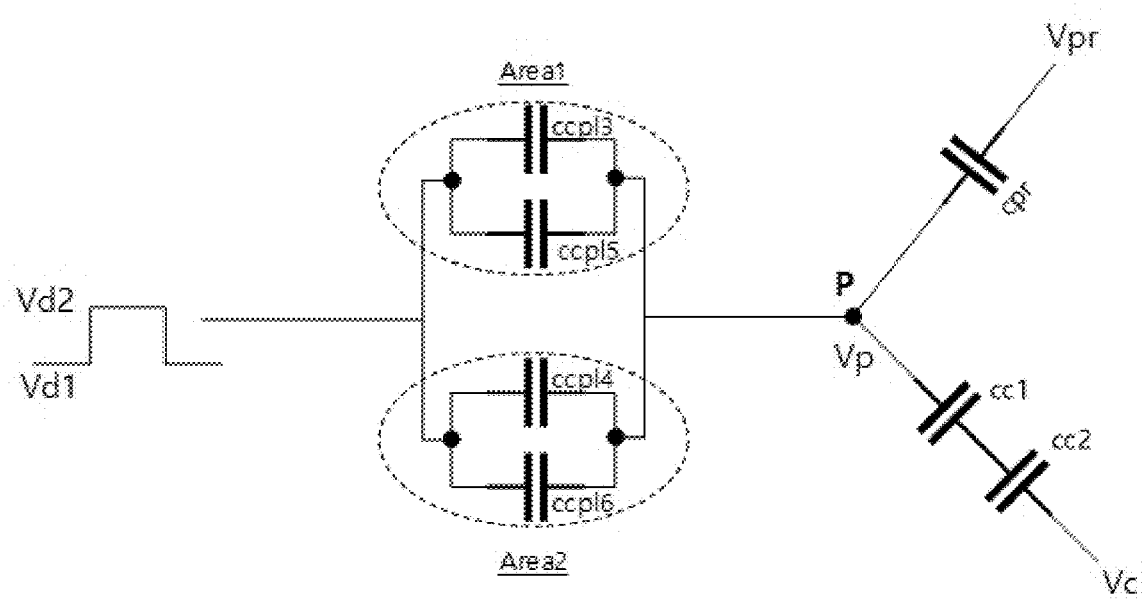
FIG. 15 is an embodiment of the present invention illustrating the coplanar capacitance formed in Area 1 and Area 2 in detail.

FIG. 15 illustrates an embodiment of the present invention that details the coplanar capacitance formed in Areas 1 and 2. In Area 1, ccpl3 and ccpl5 are formed, while in Area 2, ccpl4 and ccpl6 are formed. Between the sensing CDA and SSL, and the lower common electrode layer 3 opposing them vertically in Areas 1 and 2, cc1 and cc2 are formed in series. Therefore, in FIG. 15, cc1 and cc2 are represented as a series-connected circuit.

Figure 16:
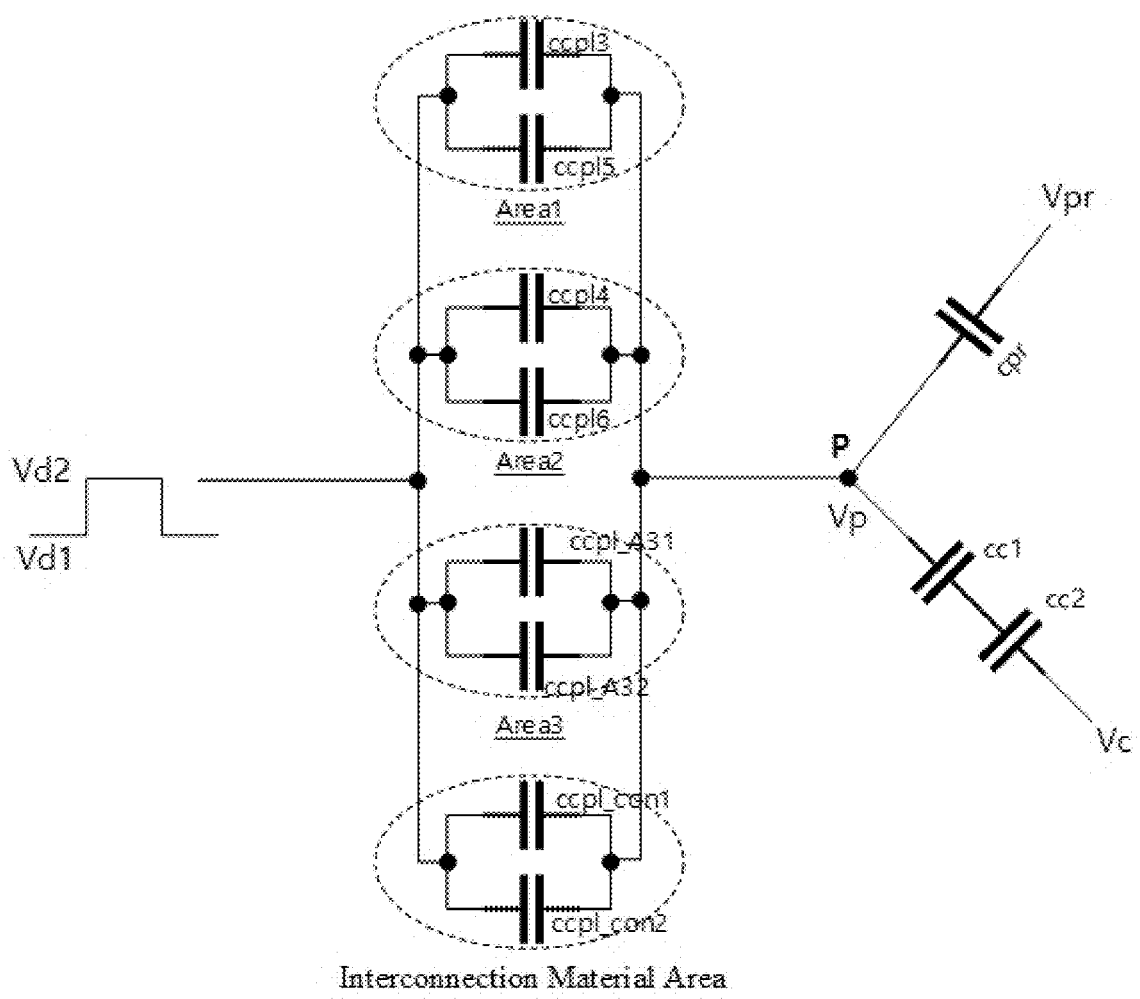
FIG. 16 is an embodiment of the present invention illustrating coplanar capacitance, common electrode capacitance, and parasitic capacitance formed in a sensing CDA and the SSL connected to it.

FIG. 16 illustrates an embodiment of the present invention showing the coplanar capacitance, common electrode capacitance, and parasitic capacitance formed in a sensing CDA and the SSL connected to it. A detection sensor operating as an SSL forms coplanar capacitance in Areas 1 through 3 and/or in the interconnection material. Areas 1 and 2 are regions where common electrode capacitors are formed by the detection sensor operating as an SSL, while in Area 3 and the interconnection material, no common electrode capacitors are formed. (However, in the interconnection material, a conductor may be attached to the upper or lower side and connected to ground potential to shield noise introduced through the CDA signal lines.)

In Area3, the coplanar capacitance generated between SSL 201 and the first VFL 210-1 (in FIG. 9) is denoted as ccpl_A31. Additionally, the coplanar capacitance formed between SSL 201 and the second VFL 210-2 in Area3 is represented as ccpl_A32. According to basic circuit theory, these two coplanar capacitances are equivalent to circuits connected in parallel with SSL 201, as depicted by the dashed lines in Area3 of FIG. 16.

Similarly, in the connecting member, a coplanar capacitance, ccpl_con1, is formed between SSL 201 and the first VFL 210-1, and another coplanar capacitance, ccpl_con2, is formed between SSL 201 and the second VFL 210-2. ccpl_con1 and ccpl_con2 can be equivalently represented as two parallel circuits, where one side is connected to the SSL and the other side is connected to the VFL. This is illustrated in the "Interconnection Material Area" of FIG. 16.

In the embodiment shown in FIG. 16, assuming the absence of Area3 and the connecting member, the voltage detected at point P in a non-touch state due to the alternating voltages Vd1 and Vd2 applied to the hypothetical Area1 and Area2 is expressed by the following [Equation 4]:

$$Vp2 - Vp1 = \frac{(Vd2 - Vd1) * ccpl\_36}{ccpl\_36 + cpr + cc}(V) \quad \text{[Equation 4]}$$

In [Equation 4], ccpl_36 is defined as follows:

$$ccpl\_36 = ccpl3 + ccpl4 + ccpl5 + ccpl6$$

Here, cc is calculated as the series connection of cc1 and cc2.

On the other hand, assuming the absence of Area1 and Area2, the voltage detected at point P in a non-touch state due to the alternating voltages Vd1 and Vd2 applied to Area3, and the connecting member 300 is expressed by the following [Equation 5]:

$$Vp2 - Vp1 = \frac{(Vd2 - Vd1) * ccpl\_conA}{ccpl\_conA + cpr}(V) \quad \text{[Equation 5]}$$

In [Equation 5], ccpl_conA represents the sum of the coplanar capacitances formed in Area3 (ccpl_A31 and ccpl_A32) and the coplanar capacitances formed in the connecting member region 300 (ccpl_con1 and ccpl_con2). More specifically:

$$ccpl\_conA = ccpl\_A31 + ccpl\_A32 + ccpl\_con1 + ccpl\_con2$$

One of the key differences between [Equation 4] and [Equation 5] lies in the presence of the common electrode capacitance cc in the denominator. In the transfer function for Area1 and Area2 ([Equation 4]), the common electrode capacitance cc is included in the denominator, whereas it is absent in the transfer function for Area3 and the connecting member ([Equation 5]), where no common electrode capacitance exists.

Referring to FIG. 16, when alternating voltages Vd1 and Vd2 are applied to a single SSL and its neighboring VFLs on either side in a non-touch state, the voltage detected at the SSL is expressed by the following [Equation 6]:

$$Vp2 - Vp1 = \frac{(Vd2 - Vd1) * ccpl}{ccpl + cpr + cc}(V) \quad \text{[Equation 6]}$$

Where:
1) ccpl is the total coplanar capacitance formed in Area1, Area2, Area3, and the connecting member for the sensing CDA and SSL. Specifically: ccpl=ccpl3+ccpl4+ccpl5+ccpl6+ccpl_A31+ccpl_A32+ccpl_con1+ccpl_con2
2) cc is the common electrode capacitance formed by the sensing CDA and the sensing signal line facing the common electrode vertically, present in the active regions Area1 and Area2.
3) cpr is the parasitic capacitance formed within the TDI 400 on SSL 201.
4) Vp1 is the voltage detected on the SSL after applying Vd1, and Vp2 is the voltage detected on the SSL after applying Vd2.

The following provides an explanation regarding the "parasitic capacitor (Cpr)" formed on the SSL within the TDI 400.

The TDI 400 is manufactured by stacking multiple insulating layers and conductive layers with specific patterns on a substrate. It includes numerous components and wiring with electrical characteristics. For example, the conductive layers (Signal Layers) may include a Source Metal Layer, Gate Metal Layer, power layers (including ground), clock lines, or analog/digital signal layers. These conductive layers are patterned with conductive metals and are separated by Insulation Layers to prevent short circuits with adjacent conductive layers.

Figure 17:
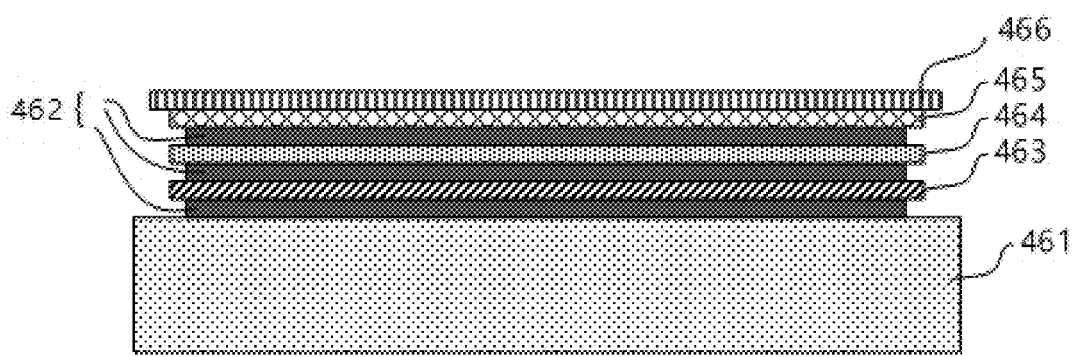
FIG. 17 is an embodiment of the present invention illustrating the layer structure of the TDI.

FIG. 17 illustrates an embodiment of the layer structure of the TDI 400. As shown, the surface of the silicon substrate 461 is layered with an insulation layer 462, followed by three signal layers 463, 464, 465. Each signal layer is patterned with high-conductivity metal materials and is used for transmitting signals, supplying power, or serving as a ground. While this example includes three signal layers, more than three layers can be implemented.

Within TDI 400, the SSL 201, VFL 210, and all other components constituting TDI 400, such as the signal processing unit and driving unit, are laid out and arranged on any of the first signal layer 463 to third signal layer 465. At this time, the SSL 201 forms two capacitances (cpr1 and cpr2) depending on the vertical spacing (d3) and overlapping area (s3) with the lower semiconductor substrate 461, power lines, or signal lines at different potentials, and the vertical spacing (d4) and overlapping area (s4) with other signal lines or signal layers above. These are represented as $$cpr1 = \varepsilon3\frac{S3}{d3} \ (F)$$

and $$cpr2 = \varepsilon4\frac{S4}{d4} \ (F),$$

where ε3 and ε4 denote the absolute permittivities of materials between the SSL and lower or upper signal lines, respectively.

Since parasitic capacitances are mostly formed within TDI 400, they are referred to as Internal Parasitic Capacitance or simply Parasitic Capacitance. The two parasitic capacitors (Cpr1 and Cpr2) are connected in parallel on one side to the SSL 201 and on the other side to the power lines or signal lines within TDI 400. The voltage on the opposite side of the parasitic capacitance can be equivalently modeled as a DC voltage Vpr, as explained earlier. Therefore, the internal parasitic capacitor Cpr can be depicted as having one side connected to point P (the equivalent circuit of the SSL) and the other side connected to the specified voltage Vpr. Furthermore, the two parasitic capacitances cpr1 and cpr2 connected in parallel within TDI 400 can be equivalently represented as a single capacitance cpr, where cpr=cpr1+cpr2.

In this invention, the voltage Vpr connected to the opposite side of the parasitic capacitor does not change and is a DC voltage. Hence, the parasitic capacitance (cpr) appears only in the denominator of [Equation 6], acting as a factor that reduces detection sensitivity by receiving and sharing charge supplied from the coplanar capacitance, which serves as a charge mediator.

The parasitic capacitances, cpr1 and cpr2, are formed in various configurations within the semiconductor device TDI 400 due to layout considerations, making it challenging to design them to a desired size. Since parasitic capacitances act as factors in the denominator of [Equation 6], reducing the sensitivity of the detection voltage, it is preferable to minimize their size as much as possible.

Even within the TDI, if the SSL and VFL are located on the same layer of one of the signal layers (first to third signal layers) and form a Parallel-Plate Coplanar structure, a coplanar capacitance is created. However, since the exact size of this capacitance depends on the layout and cannot be precisely predicted, it is not considered in this specification. For precise analysis, extracting and using the coplanar capacitance within the TDI is preferable.

The following explanation pertains to the capacitance formed between two conductors facing each other, specifically focusing on the interline capacitance between the SSL and the VFL.

Figure 18:
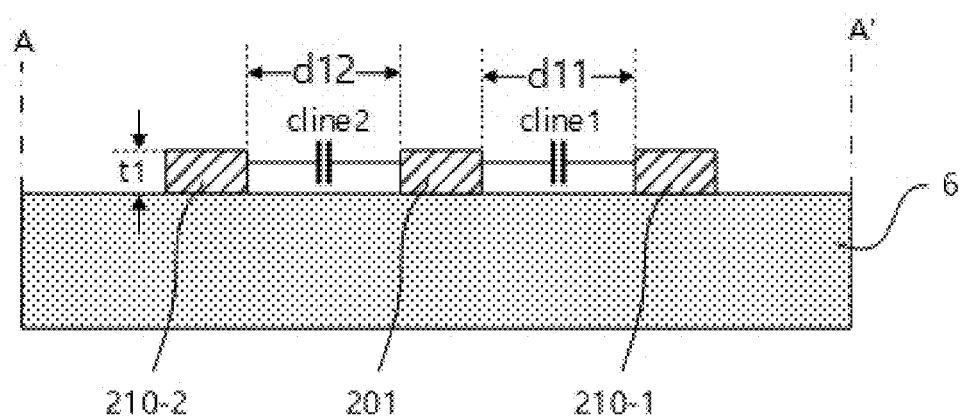
FIG. 18 is an embodiment of the present invention illustrating a cross-sectional area of Col1 CDA signal lines at section A-A' of Area 3 in FIG. 12.

FIG. 18 illustrates a cross-sectional area of the CDA signal line Col1 of FIG. 12, cut along A-A' in Area3, as per one embodiment of the invention. The cross-sectional plane A-A' in FIG. 12 is located in Area3, above the Color Filter Glass 6, where there may be no polarizer or protective material.

In FIG. 18, CDA signal lines composed of materials such as ITO, IZO, metal mesh, or CNT are manufactured with a predetermined thickness (t1) through patterning processes. Generally, the thickness of transparent conductive materials used in display devices for common electrodes or touch sensors is known to be about 400~2500 Å ($10^{-10}$), with sheet resistance values of about 10~200 Ω/□.

In this embodiment, the central SSL 201 and adjacent VFLs 210-1, 210-2 are positioned to face each other at specified distances (d11, d12) on the left and right. Between the SSL 201 and first VFL 210-1, a vertical parallel-plate capacitor is formed, based on the overlapping area (S11, not shown) and separation distance (d11). This is according to the principle of capacitance formed between two vertically aligned conductors. The capacitance formed between the side surfaces of these signal lines is expressed as cline1=ε11 S11/d11 (F), where ε11 is the absolute permittivity of the material between the SSL 201 and VFL 210-1, and S11 is the overlapping area, defined as S11=t1·1 ($m^2$), with l being the facing length of the signal lines. For example, "l" refers to the facing length of SSL and VFL in Area3 or the facing length of SSL and VFL in Area2, which may correspond to the same "l" used in [Equation 3] for deriving coplanar capacitance.

When an alternating voltage is applied to the first Voltage Forcing Line (VFL, 210-1) that constitutes a Rectangular Parallel-plate Capacitor, and the Sensing Signal Line (SSL, 201) remains in a floating state without any applied voltage, an electric field is formed from the side of the first VFL 210-1 to the side of the SSL 201. This results in the formation of induced charges with opposite polarity on the side of the SSL 201, creating a capacitor between the sides of the first VFL 210-1 and the SSL 201. In this invention, the capacitor generated by the SSL side and the first VFL side operating as a Rectangular Parallel-plate Capacitor is defined as an Interline Capacitor between Lines, denoted by the symbol Cline1.

By the same principle, an Interline Capacitor, Cline2, is also formed between the SSL 201 and the second Voltage Forcing Line (VFL, 210-2). Since the same voltage is applied to both the first VFL 210-1 and the second VFL 210-2, they can be equivalently represented as being connected. Consequently, the Interline Capacitance between the SSL 201 and the VFLs 210-1, 210-2 can be equivalently represented as cline=cline1+cline2.

Area1 to Area3 are virtual spaces that are uniformly manufactured during the production process. Hence, the thickness (t1) of detection sensors in Area1 to Area3 is identical. To minimize the magnitude of the aforementioned interline capacitance, it is preferable to fabricate detection sensors with the smallest possible thickness (t1). The thickness (t1) of detection sensors installed in Area1 to Area3 is preferably kept below 2500 Å ($10^{-10}$ m).

The CDA signal lines in the interconnection material 300 are typically made of metal materials such as copper, lead, tin, iron, aluminum, or molybdenum. In the interconnection material, the thickness of signal lines (t2) can be thicker than the detection sensor thickness (t1) installed on the display device.

The interline capacitance formed on the SSL is equivalent to the sum of the interline capacitances generated in Area1 to Area3 and the interconnection material, and the total value is defined as Cline.

Coplanar capacitance is a capacitance derived from a parallel-plate coplanar arrangement, where signal lines are configured with a specific line width, separation distance (d), and facing length (l) at the same distance. It is formed on both the upper surface and the side surfaces of the signal lines. In contrast, interline capacitance generated by the principle of vertical parallel plate conductors is only formed on the side surfaces of two signal lines.

Interline capacitance (Cline) is a physical quantity inherently formed during the derivation of coplanar capacitance (Ccpl), and no additional process is required for its derivation. The interline capacitor can also be equivalently modeled as being connected in parallel with the coplanar capacitor, where one side is connected to SSL and the other side to VFL. Since it also acts as a charge mediator driven by alternating voltage, the transfer function in [Equation 6] can be more detailed as shown in [Equation 7]:

$$Vp2 - Vp1 = \frac{(Vd2 - Vd1)*(ccpl+cline)}{ccpl + cpr + cc + cline} \quad \text{[Equation 7]}$$

As will be described later, the total cline accounts for less than 1% of the total ccpl and therefore falls within the system's margin of error, making it a negligible variable. Generally, the transfer function used to determine the voltage at point P is defined by [Equation 6].

An embodiment of the invention utilizes the difference between the voltage detected using [Equation 7] (in a non-touch state) after applying alternating voltage to the neighboring VFL 210 of SSL 201, and the real-time value detected using [Equation 8] (to be described later). Based on the relationship [Equation 7]-[Equation 8], the touch status and touch area are determined. Therefore, the reference value detected in the non-touch state as per [Equation 7] is digitized, stored in memory, and retrieved for comparison with the real-time value detected using [Equation 8]. This process is applied identically to all CDA in the scan. To facilitate this process, the invention incorporates memory within TDI 400 to record the values of [Equation 7].

To detect the voltage formed as a result of the charge-sharing phenomenon at point P, equivalent to the SSL, the invention may employ an operational amplifier (Op-Amp). For each CDA, the result of [Equation 7] stored in memory is converted to analog voltage using a DAC and connected to one input terminal of the operational amplifier. Simultaneously, the voltage formed in real-time on the SSL, based on [Equation 8], is connected to the other input terminal of the operational amplifier. This configuration of the operational amplifier, known as a differential amplifier, outputs the difference between the two analog voltages connected to its input terminals, with the amplification factor determined by the resistance ratio installed at its input and output terminals.

Figure 3:
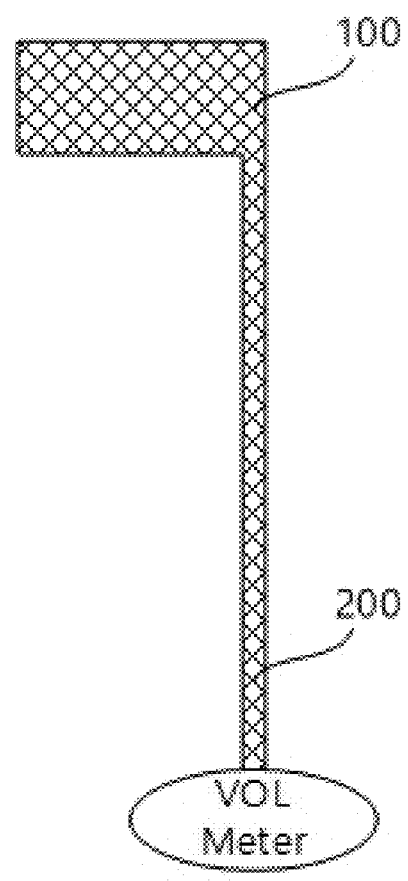
FIG. 3 illustrates an embodiment of the present invention utilizing a detection sensor for object detection.
Figure 4:
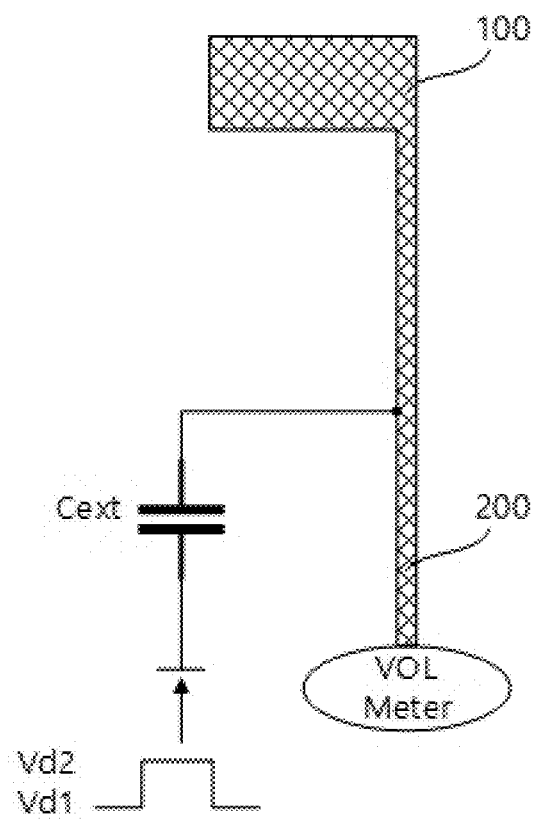
FIG. 4 is an embodiment of the present invention illustrating the addition of a discrete capacitor to a detection sensor as a medium for charge supply.

Alternatively, the invention may directly detect voltage on the SSL using an ADC, a type of voltmeter illustrated in FIG. 3 to FIG. 4. In such cases, an additional operation is required to compare the real-time voltage measured on the SSL with the reference value stored in memory. It is also possible to measure the output terminal of the differential amplifier using the ADC.

As described, the ADC or DAC must have predefined operating ranges, and the resolution is determined within the operating range defined by the Top Bias and Bottom Bias voltages. If noise or ripples are included in these bias voltages, the Signal-to-Noise Ratio (SNR) of the measured values decreases, resulting in reduced reliability of the measured data. Therefore, to enhance the reliability of the measured data, the bias voltage must be extremely precise and free from ripples or noise. The power supply unit within TDI 400 generates such voltages by incorporating a voltage reference generator. However, even with a precise voltage reference, switching noise remains unavoidable when the voltage reference generates power synchronized to specific frequencies, such as in SMPS (Switching Mode Power Supply) or charge pump methods.

The power circuit designer suppresses switching noise or ripple by separating them into high-frequency and low-frequency components and using appropriate capacitors or filters for each frequency band. However, the number of additional circuits increases the area of the TDI or adds external circuits, resulting in increased area and cost for the TDI.

To avoid these issues, a reasonable level of noise and ripple must be allowed. Generally, high-performance voltage references can tolerate noise or ripple up to 1-3%, and mid-level devices may tolerate up to 5%. Assuming this invention applies a high-performance standard of within 3% noise, the voltage measured at point P (SSL) by an ADC with 3% noise characteristics will have a 3% error, and the same applies during conversion by the DAC. Mathematically, when both ADC and DAC have a 3% error, the total error range after signal processing is not a simple product of 9%, but it exceeds 3% significantly.

As mentioned earlier, the operating range of ADCs and DACs is predefined, and their error range is determined by the circuit configuration. Therefore, to accurately calculate the voltage magnitude at SSL (P-point) based on [Equation 7]-[Equation 8], a process to accurately calculate the capacitance values constituting the mathematical equations of this invention must precede.

Since the CDA signal lines constituting the capacitive detection apparatus in this invention have varying lengths depending on their position within the CDA column, the coplanar capacitance of all CDAs in a column spans a wide range. Consequently, if the highest and lowest voltages based on [Equation 7] are not sufficiently predicted, errors may occur in selecting the ADC or DAC bias voltage. This could lead to a suboptimal range and reduced ADC resolution. Similarly, misunderstanding the system may lead to errors in determining the magnitude of alternating voltage or in optimizing the design of line width (w) and lateral separation (d) to achieve the desired coplanar capacitance.

To minimize such issues, this invention divides the total length of sensing CDAs and SSLs into areas and proposes calculating coplanar capacitance based on the line width (w), separation distance (d), and opposing length (l) within each area. Furthermore, the invention improves detection voltage precision by distinguishing whether a common electrode capacitance is present in each area and applying different equations accordingly.

FIG. 19 illustrates an embodiment of the present invention concerning the ratio of interline capacitance (cline) to coplanar capacitance (ccpl). Specifically, it provides a table derived from parameters calculated in FIG. 6, where the interline capacitance is formed under the same conditions that establish the coplanar capacitance.

As previously described, the thickness of the conductive transparent materials, such as ITO or IZO, used in detection sensors typically ranges from 400 to 2500 Å. However, to emphasize the contribution of interline capacitance, the thickness (t) of the sensing signal line was exaggerated to 5000 Å for calculation purposes. The results for the ratio cline/ccpl indicate that, in Area 3 (with a spacing d=12.5 µm), the ratio is approximately 1.49%. In the regions depicting Area 1 and Area 2 (where d=100 µm, representing most of the SSL length 1), the ratio cline/ccpl does not exceed 0.5%.

In FIG. 19, data point ① (Vp2–Vp1) represents simulated voltage values at the SSL based on [Equation 6] without considering interline capacitance. For convenience, the common electrode capacitance Cc was omitted. Data point ② (Vp2-Vp1) represents calculations based on [Equation 7], incorporating interline capacitance cline. Comparing the results of ① and ②, the calculated difference ((②-①)/①) demonstrates that the impact of interline capacitance on the system is less than 0.5%.

If the realistic thickness of 1500 Å or 1000 Å had been used instead of 5000 Å, the value of ((②-①)/①) would not exceed 0.1%.

The present invention specifies an ADC error margin of 3% for precise detection circuits. As demonstrated in this embodiment, interline capacitance cline constitutes less than 1% of coplanar capacitance ccpl and has an impact on the system of less than 0.5%. Thus, interline capacitance does not need to be considered when determining the operating range of ADCs or DACs, as it is already within the ADC error margin.

This provides the advantage of not needing to include interline capacitance as a parameter for system stability management or ADC/DAC range calculations. Consequently, manufacturing costs are reduced by avoiding the need for additional process control measures, such as deploying expensive scanning acoustic microscopy (SAM) equipment to measure the thickness of CDA signal lines in detection sensors. Additionally, it eliminates the need for extensive efforts to minimize process deviations through evaluations, effectively suppressing the increase in process control costs.

Figure 20:
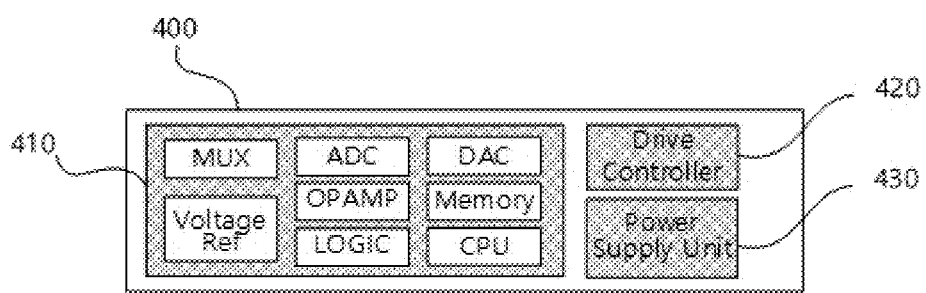
FIG. 20 is an embodiment of the present invention illustrating the internal configuration of the TDI.

FIG. 20 illustrates an embodiment of the internal configuration of the TDI. The TDI 400 may include a Signal Processing Unit 410, a Drive Unit 420, or a Power Supply Unit 430. The Signal Processing Unit 410 of the TDI 400 detects the voltage formed on the SSL based on the mathematical equations of this invention, determines touch presence, and calculates touch coordinates.

In a column group comprising multiple CDA columns, one SSL 201 is selected per CDA column, forming the same row for processing. For the same row, processing begins and completes simultaneously. For instance, in a capacitive detection apparatus comprising 20 CDA columns, if CDA Column Group 1, composed of odd-numbered CDA columns, processes a randomly selected certain nth row, processing of the sensing CDAs in the nth row of CDA Column Group 1 starts and ends simultaneously.

After processing is complete, the voltage detected at the SSL connected to each sensing CDA is individually stored in an analog storage device, such as a Sample & Hold circuit, to prevent loss due to discharge. The voltage stored in the analog storage device is sequentially digitized using an ADC via time-sharing, stored in memory, and then retrieved during processing.

The calculations for [Equation 7]-[Equation 8] can be performed by the operational amplifier (OPAMP) in the Signal Processing Unit 410. Specifically, this operation is performed by a Differential Amplifier configuration, where the amplifier outputs the difference between the voltage applied to the non-inverting input terminal and the voltage applied to the inverting input terminal, with the amplification ratio determined by the feedback resistor and the ratio of resistors connected to the inverting/non-inverting terminals. The SSL 201 is connected to one input terminal of the differential amplifier. The data for [Equation 7], stored digitally in memory, is converted to analog form using a DAC and connected to the other input terminal of the differential amplifier. The calculation result of [Equation 7]-[Equation 8], output by the differential amplifier, is detected by the ADC, digitized, and transmitted to the CPU or logic circuits for determining touch presence or coordinates.

The ADC functions as the Voltage Meter shown in FIG. 3, or 4, a circuit element measuring voltage fluctuations at the SSL 201 caused by charge sharing. The ADC has resolution specifications, such as 8-bit, 10-bit, or 12-bit, and its operating range is determined by the upper and lower bias voltages.

Using multiple ADCs or DACs shortens detection time and increases convenience. However, to minimize the TDI's area and reduce power consumption, it is preferable to use a single DAC and a single ADC. In this case, processing is performed in a time-sharing manner for multiple CDA column groups and CDA columns within those groups.

For example, in a capacitive detection apparatus divided into odd and even column groups, the odd column group is processed first, followed by the even column group, alternating and repeating. Each column group comprises multiple CDA columns, and each CDA column consists of multiple CDAs. The capacitive detection apparatus detects object capacitance by sequentially processing all CDAs in the same row of the same column group. After completing the processing of all rows in the odd column group, the even column group is processed similarly, alternating repetitively. The ADC and DAC participate in processing during each step in a time-sharing manner.

The greater the number of CDA columns being processed simultaneously, the longer the ADC and DAC processing time. This can lead to signal distortion at the SSL of CDA columns processed later due to discharge. To address this issue, the system uses column groups composed of multiple CDA columns.

For instance, if processing begins simultaneously for 20 CDA columns, discharge-related problems may occur. Thus, the 20 CDA columns are divided into two column groups: 10 left CDA columns and 10 right CDA columns, or odd and even CDA column groups. By processing these reduced column groups, ADC and DAC operating times can be shortened, mitigating discharge issues. Depending on the total number of CDA columns in the system, it is also possible to divide them into three, four, or more column groups.

The voltage measured based on [Equation 7] in the absence of object capacitance is stored in the memory of the Signal Processing Unit 410 for calculations involving [Equation 8]. For example, if the capacitive detection apparatus comprises 500 CDAs, storing the voltage based on [Equation 7] for each CDA would require memory sufficient to store 500 data points.

The CPU performs the function of calculating the coordinates of an object based on the voltage detected from the sensing CDA. It also controls the timing of circuit elements included in the Signal Processing Unit 410. If necessary, the CPU may not be included in the TDI 400 and instead be part of an external Host System (not shown), thereby reducing the manufacturing cost of the TDI 400.

The Logic Unit generates the clocks required for TDI operation, controls the CDAs constituting a CDA column to select the SSL and VFL, and controls circuits for applying alternating voltages. It can also control the multiplexer to select one SSL and neighboring VFLs. Some logic functions may be performed by the CPU or in collaboration with the CPU.

A Mux (Multiplexer) is a circuit component used to sequentially select one SSL from a CDA column and to select one or more VFLs adjacent to the selected SSL. The Mux for selecting SSLs and VFLs may be installed on one side of the OLED display's TFT substrate, where the charge mobility is high. CDA columns installed on the passivation layer or encapsulation substrate of an OLED are connected to the TDI 400 by selecting one SSL or a small number of VFLs through the operation of the Mux installed in the non-active area (non-visible area) adjacent to the TDI. The Mux outputs only one signal from multiple inputs, such as the CDA signal lines of a CDA column, to the TDI 400. This significantly reduces the number of connection pins required for CDA signal lines in the TDI 400, thereby reducing the area and cost of the TDI 400. This also facilitates module configuration in compact spaces.

The Voltage Reference Generator creates precise reference voltages required for the bias of ADCs, DACs, or alternating voltages such as Vd1 or Vd2. It typically uses a Band Gap Reference (BGR) to generate the reference voltage.

The Power Supply Unit provides the supply voltages necessary for the operation of circuit elements constituting the TDI 400, such as the CPU or Logic Unit. It also amplifies the current of the reference voltage created by the Voltage Reference Generator. The voltage created by the Power Supply Unit can be transmitted to the display or used in the multiplexers or drive unit 420 installed on the display.

The Drive Unit is responsible for applying voltage to the VFL 210. The Drive Unit 420 applies alternating voltages such as Vd1 or Vd2 or ground voltage to the VFL 210 using voltages amplified by the Power Supply Unit. The CPU or Logic Unit of the TDI 400 can control the power supply switch (e.g., on/off control of the gate terminal of a CMOS switch) and determine the turn-on/turn-off timing of the switch.

Figure 21:
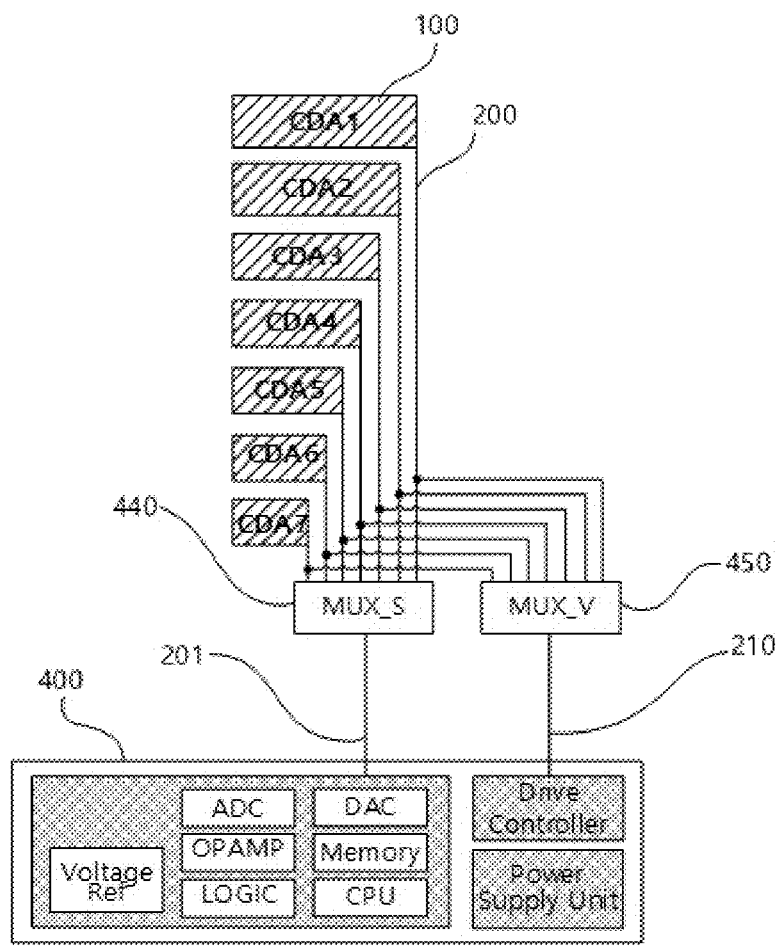
FIG. 21 is an embodiment of the present invention illustrating a method for selecting SSL and VFL in a multiplexer (Mux).

FIG. 21 illustrates an embodiment of the method for selecting SSLs and VFLs using a Mux. In this example, one CDA column comprises seven CDAs. All CDAs in the CDA column are connected to two multiplexers 440, 450. The SSL Selection Multiplexer (MUX_S) 440 is installed for each CDA column and selects one SSL 201 from all CDA signal lines in the CDA column. The SSL 201 selected by the MUX_S 440 is connected to the Signal Processing Unit 410 of the TDI 400.

Meanwhile, all CDA signal lines 200 in the CDA column are also input to the VFL Selection Multiplexer (MUX_V) 450. The MUX_V 450 selects one or multiple neighboring VFLs to the SSL 201. Although only one MUX_V is shown in FIG. 21, the number of MUX_Vs installed may equal the number of VFLs selected. All CDA signal lines of the CDA column are input into each of the multiple installed MUX_Vs, and each Mux outputs one VFL.

If the CDA signal line connected to CDA4 in FIG. 21 is selected as the SSL 201 by the MUX_S 440, the MUX_V 450 may select one of CDA3 or CDA5, neighboring CDA4, as the VFL. Alternatively, it may select a pair of CDA3 and CDA5 as VFLs or a set of two or three pairs of CDAs, such as (CDA3, CDA5) and (CDA2, CDA6), as VFLs. For the CDA1 located at the top edge of the CDA column, only neighboring VFLs in one direction may be selected. For example, if CDA1 is selected as the sensing signal line, CDA2 or multiple CDAs below CDA1, such as CDA2 and CDA3, may be selected as VFLs.

A similar method applies to the CDA7 located at the bottom edge of the CDA column. If CDA7 is selected as the SSL, one or multiple VFLs above CDA7, such as CDA6 or CDA6 and CDA5, may be selected. This is because the CDA located at the edge of the CDA column only has neighboring CDAs in one direction.

When the display device is an OLED, the high charge mobility of the switching elements used in the MUX enables the operation speed of the MUX to meet the system's requirements. As a result, MUX_S and/or MUX_V can be installed in the display device. In this case, the alternating voltage generated by the drive unit of the TDI 400 can be supplied to the VFL selected by MUX_V.

When the MUX is installed in the display device, the number of SSLs input to the TDI 400 is not equal to the number of CDAs but is instead equal to the number of CDA columns. As a result, the number of input pins in the TDI is significantly reduced. Additionally, the power lines of the driving unit in the TDI 400 delivered to the MUX_V, as well as the control signals for the MUX 440, 450 from the logic or CPU, can be fewer than 20. Consequently, when the number of CDA signal lines is around 500, leading to a wider Area3 and reduced product competitiveness due to the Wide BM, the use of a MUX offers the advantage of reducing the number of signal lines passing through Area3 to approximately 50~100. This enables the achievement of a Narrow BM, along with the benefit of cost reduction resulting from the reduced area of the TDI 400.

The following provides an explanation of the process for detecting object capacitance. Referring again to FIG. 13, the capacitive detection device of the present invention consists of x number CDA columns and y number CDA rows, configured by one or more TDIs 400. In the CDA columns, SSL and VFL can be selected according to the following rules.

Figure 27:
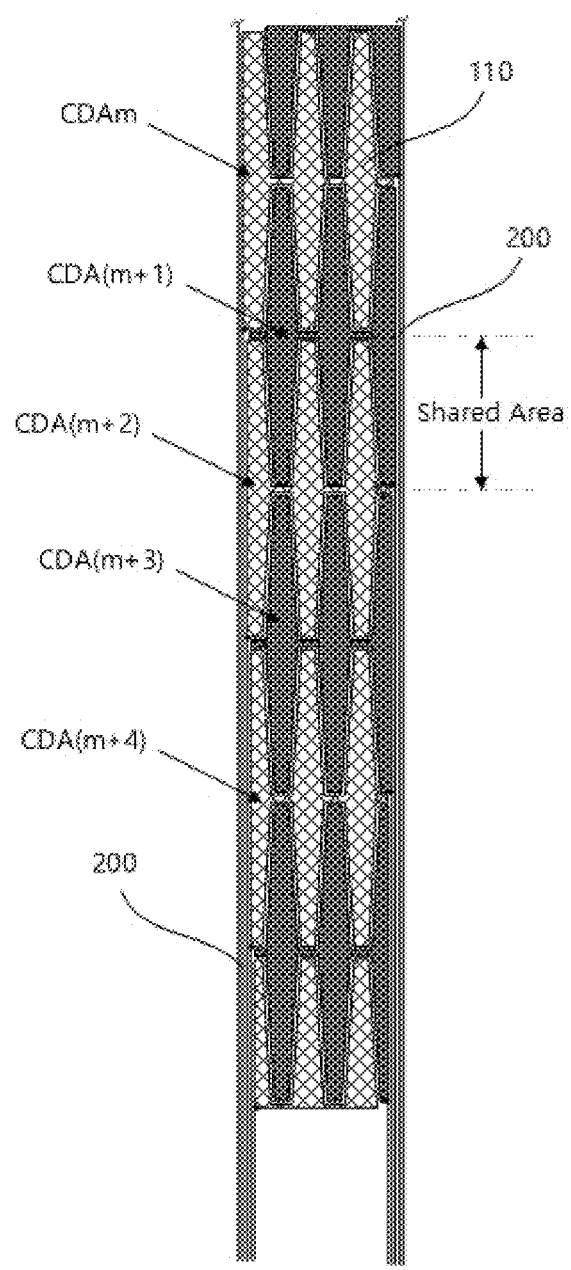
FIG. 27 is an embodiment of the present invention illustrating a CDA column where all Primary Shape CDAs include Secondary Shape CDAs installed on the outer side.

A single sensing CDA can be selected from each CDA column in the column group undergoing processing. If multiple SSLs connected to multiple sensing CDAs are selected from one CDA column, the floating state characteristics of the SSLs may result in signal interference and detection errors due to crosstalk between SSLs within the densely packed signal line bundle. However, as illustrated in the embodiment of FIG. 27, if the signal line bundle is divided between the left and right sides of the CDA column, one SSL may be selected from each of the left and right signal line bundles under the condition that multiple SSLs are not selected from the same signal line bundle When an SSL is selected in a CDA column, one or more neighboring CDA signal lines can be selected as VFLs. For SSLs located at the edge of a CDA column, CDA signal line(s) in one direction are typically selected as VFLs. Even when SSLs are located in the middle of the CDA column, allowing the selection of VFLs on both sides, only one CDA signal line may be selected as a VFL. This is intended to reduce the coplanar capacitance located in both the numerator and denominator of [Equation 1], thereby further improving the detection sensitivity of the object capacitance. CDA signal lines not selected as VFLs are connected to the system ground or to a DC voltage with a predetermined potential.

In a single CDA column, the SSL is sequentially selected according to a predefined rule. One preferred method is to process the CDAs sequentially from Row 1 to Row(y), i.e., from the beginning to the end.

Alternatively, processing may only occur for CDAs located in odd-numbered positions or only for those in even-numbered positions. This method is used when rapid scanning is required to detect touch events.

For multiple CDA columns within the same column group, it is preferable that each selected SSL is located in the same row. This approach simplifies the memory array structure, making it similar to the regular arrangement of the CDAs, thereby enabling faster memory access.

The following provides an explanation of the method for extracting object capacitance in the form of voltage.

When object capacitance (cobj) is formed due to a touch event, the magnitude of the voltage detected at the SSL is derived from [Equation 7] and represented as follows in [Equation 8].

$$Vp2' - Vp1' = \frac{(Vd2 - Vd1)*(ccpl+cline)}{ccpl + cpr + cc+cline + cobj}(V) \quad \text{[Equation 8]}$$

The difference between [Equation 7] and [Equation 8], depending on whether a touch occurs, is determined by the presence or absence of object capacitance (cobj). Thus, the object capacitance (cobj) can be extracted in the form of voltage through the operation [Equation 7]-[Equation 8].

As explained based on the embodiment in FIG. 19, interline capacitance (cline) falls within the margin of error and is not a variable that needs to be considered. Therefore, interline capacitance (cline) can be excluded from [Equation 8].

The resulting [Equation 9] represents the operation of [Equation 7]-[Equation 8].

$$\Delta Vp = \quad \text{[Equation 9]}$$
$$(Vd2 - Vd1)*(ccpl+cline)*\left[\frac{1}{ccpl + cpr + cc+cline} - \frac{1}{ccpl + cpr + cc+cline + cobj}\right](V)$$

Here:
a) When the voltage Vd1 is applied to the VFL and the SSL reaches a stable voltage, the voltage formed on the SSL is referred to as Vp1". Similarly, when the voltage Vd2 is applied to the VFL and the SSL stabilizes, the voltage formed on the SSL is referred to as Vp2". The difference between these voltages is expressed as $\Delta Vp = Vp2" - Vp1"$
b) ccpl: Represents the total coplanar capacitance formed across all areas, including Area1 through Area3 and the interconnection material, for a single SSL.
c) cpr: Refers to the parasitic capacitance formed on the sensing signal line within the TDI 400.
d) cc: Denotes the common electrode capacitance formed when the sensing CDA and its associated SSL are vertically opposed to a conductive layer in a different layer. In a display device, the conductive layer in this context refers to the common electrode or cathode.
e) cline: Represents the interline capacitance formed between the SSL and the VFL. Its removal is permissible and does not impact the system's operation.

The following describes the modeling and simulation of the capacitive detection device according to the present invention.

Figure 22B:
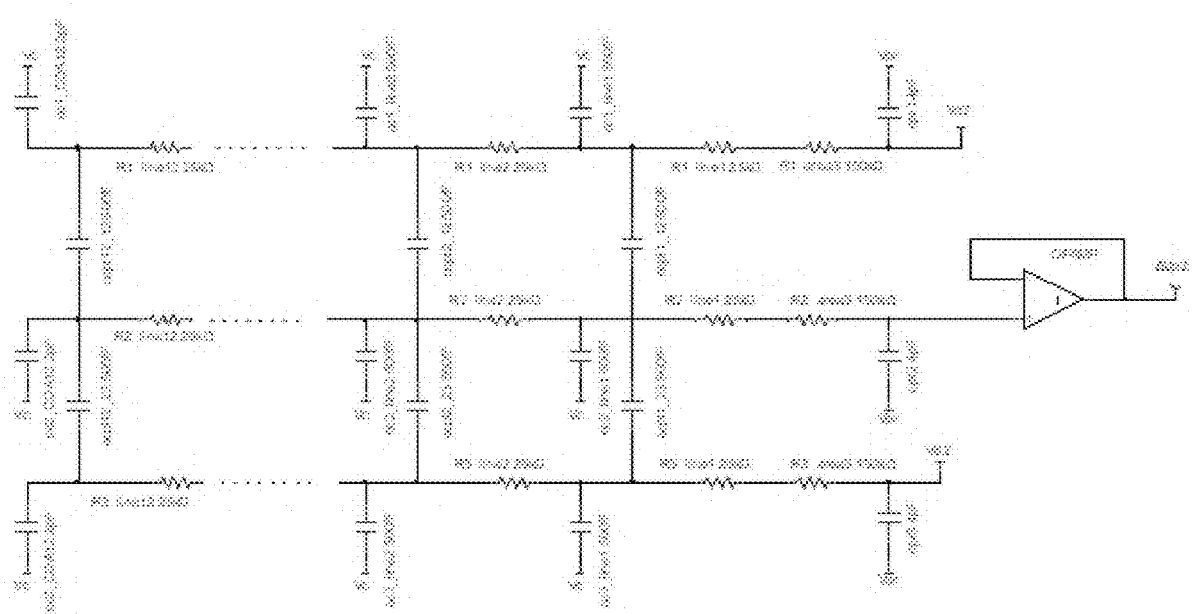
FIG. 22B is an embodiment of the present invention illustrating a model of a sensing CDA and SSL located twelfth from the bottom in an arbitrary CDA column.
Figure 22C:
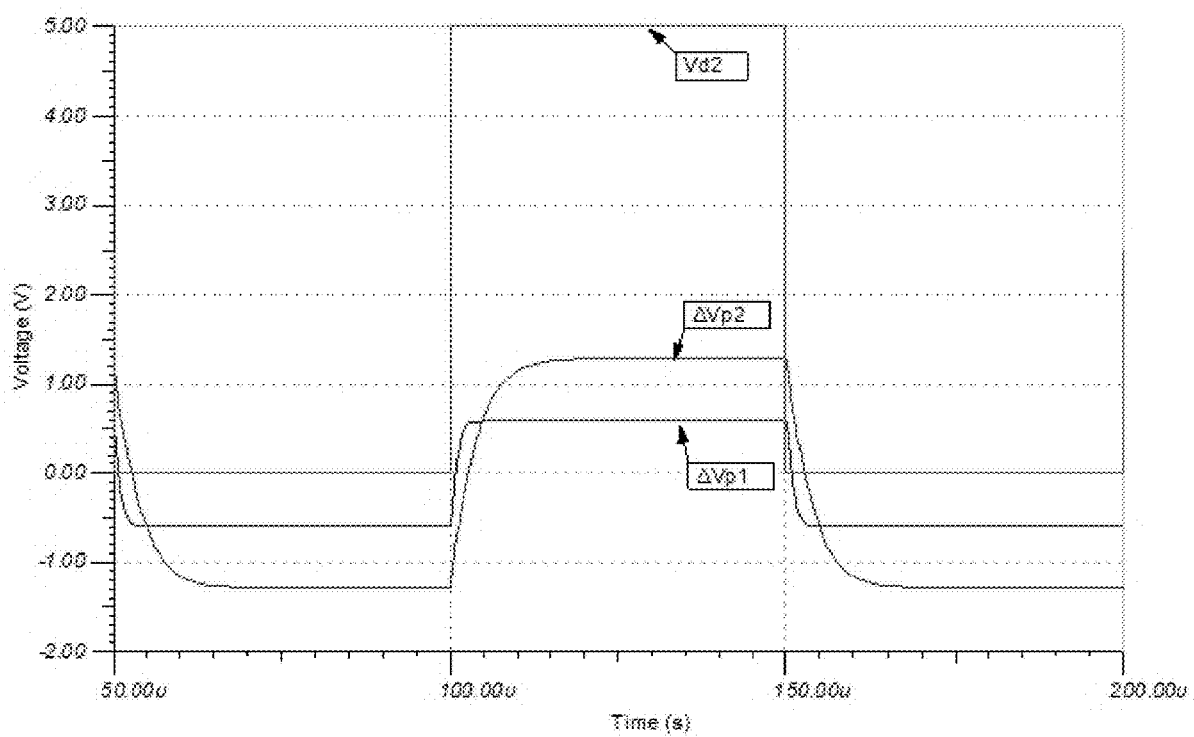
FIG. 22C is an embodiment of the present invention simulating FIG. 22A and FIG. 22B at an alternating frequency of 10 KHz.

FIG. 22A illustrates one embodiment of the invention, modeling the SSL of the sensing CDA located second from the bottom in an arbitrary CDA column. FIG. 22B models the SSL of the sensing CDA located twelfth from the bottom in the same CDA column. FIG. 22C shows the results of a simulation of FIGS. 22A and 22B at an alternating frequency of 10 KHz.

Referring to FIGS. 1 to 2 and 15 to 16, the SSL denoted by P is assumed to be an ideal signal line without resistance. However, when the CDA signal line is made of conductive materials such as ITO, IZO, metal mesh, or CNT, the signal line resistance (referred to as "line resistance") depends on the signal line width w and length l, as expressed by the equation:

$$R = \rho\frac{l}{w}(\Omega)$$

Here, p represents the resistivity of the material constituting the signal line, with a unit of Ω·m. Thus, the CDA signal line has line resistance determined by the resistivity, width, and length.

Since the length of the CDA signal lines varies by the location of the CDA column, the accuracy of the simulation increases as the modeling circuit more precisely reflects the line resistance and capacitance based on the signal line length.

In the modeling circuits shown in FIGS. 22A and 22B, the line resistance in the virtual Area3 and interconnects for a single CDA signal line is assumed to be 150 kΩ. Each additional CDA increases the line resistance by 25 kΩ, and the common electrode capacitance caused by the signal line increases by 0.5 pF. The common electrode capacitance at the end of the CDA signal line due to the CDA itself is assumed to be 1.5 pF (2 pF in total, including the signal line). Additionally, the coplanar capacitance for each unit signal line in Area2 is assumed to be 0.5 pF. Thus, each additional SSL increases the coplanar capacitance by 1 pF on both sides. The parasitic capacitance is assumed to be 4 pF.

The VFL is subjected to an alternating voltage (assumed as Vd1=0V and Vd2=5V), while the central SSL remains floating, as no voltage is applied to it. The SSL is connected to the non-inverting input terminal of an analog buffer, maintaining a floating state. In another embodiment, the SSL may be directly connected to one input terminal of a differential amplifier. The alternating voltage (Vd1=0, Vd2=5V) is represented by a 5V square wave, and the simulation was performed at an alternating frequency of 10 kHz.

On the other hand, since an alternating voltage is applied to the VFL, the potential of the VFL must match the magnitude of the alternating voltage. Due to the time constant (calculated as the product of resistance, R, and capacitance, C) caused by the VFL's line resistance and the common electrode capacitance, delays in the rise or fall of the alternating voltage occur. The longer the VFL, the higher its line resistance and the larger its common electrode capacitance, resulting in slower voltage rise or fall for CDAs located at greater distances. Thus, if the voltage at the SSL of a sensing CDA located at a far distance is measured before the voltage applied to the VFL is fully saturated, there may be an issue of detecting an incompletely saturated voltage.

Referring to FIG. 22A, a unit CDA is modeled with line resistance and common electrode capacitance. As additional CDAs are added, increasing the length of the CDA signal line, an additional RC circuit is introduced, creating an RC cascade circuit equivalence. Such an RC circuit acts as a low-pass filter (LPF), which passes low-frequency signals up to a certain cutoff frequency while attenuating higher frequencies beyond that point.

The SSL voltage output from the analog buffer in FIG. 22A is denoted as ΔVp1 and is illustrated as the lowest waveform among the three shown in FIG. 22C. ΔVp1 reaches the saturation voltage at 107 μs, which is 7 us after the 100 us reference point.

FIG. 22B illustrates a simplified circuit model of the sensing CDA and SSL located at the 12th position in the CDA column. As the length of the CDA signal line increases, the number of RC circuits representing the sensing CDA and SSL in the cascade increases. This indicates an increase in the order of the low-pass filter (LPF). As the order of the LPF increases, it introduces more phase delay for the input signal, meaning that the signal requires more time to pass through the filter.

The waveform ΔV2 in FIG. 22C represents the simulated voltage at the output terminal of the analog buffer (OPAMP) for the SSL located at the 12th position in the same CDA column as the CDA in FIG. 22A. Due to the increased order of the RC cascade circuit resulting in phase delay, the time required to reach the fully saturated voltage is delayed compared to the embodiment of FIG. 22A. The time to reach the fully saturated voltage is approximately 122 us relative to the baseline of 100 μs, requiring about 15 us more compared to the embodiment of FIG. 22A.

Figure 22D:
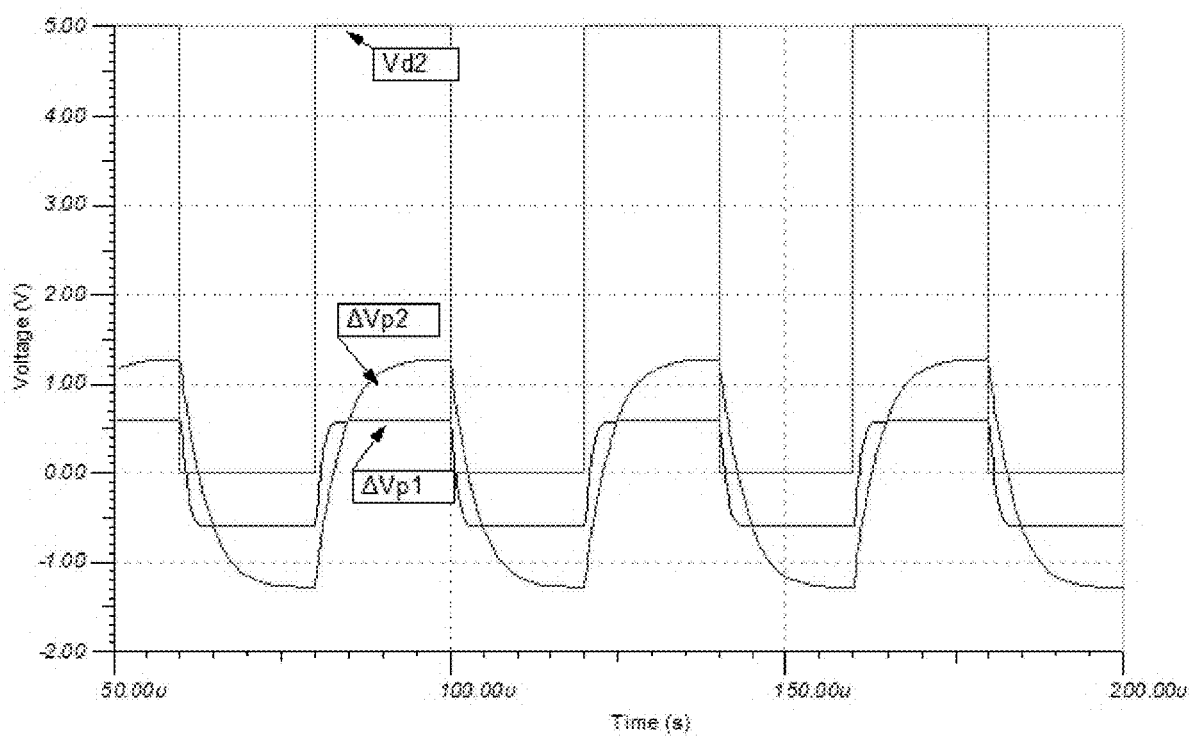
FIG. 22D is an embodiment of the present invention simulating FIG. 22A and FIG. 22B at an alternating frequency of 25 kHz.

In high-performance devices designed for rapid touch coordinate output, alternating frequencies higher than 10 kHz, such as 25 kHz or 50 kHz, may be used. FIG. 22D illustrates an embodiment of the present invention where FIG. 22A and FIG. 22B were simulated at an alternating frequency of 25 kHz. As shown in FIG. 22D, ΔV2 does not reach the fully saturated voltage even after a half cycle (half duty) of 20 μs. Referring to the embodiment of FIG. 22C, it is evident that ΔV2 requires 22 us to reach the fully saturated voltage; however, only 20 us of rising time was provided, preventing it from reaching full saturation.

When touch coordinates are calculated using the voltage of a sensing CDA that has not reached full saturation compared to a sensing CDA that has, errors in the touch coordinates may occur due to the threshold region of the saturated voltage.

If a system designer can predict the capacitance of sensing CDA and SSL for each area, referring to simulation results from precise modeling circuits and adjusting the alternating voltage frequency so that the half-duty cycle exceeds 22 us could enable the detection of fully saturated voltage. Alternatively, even if the SSL voltage is measured within a timeframe shorter than 20 μs (e.g., 16 us or 18 μs), storing correction values (e.g., voltage or ratio) in memory that reflect the difference between the detected unsaturated voltage and the theoretical fully saturated voltage could allow accurate touch coordinate calculation. These stored correction values can then be called and used for each scanned sensing sensor.

Alternatively, the line width of the SSL or the spacing between the SSL and VFL in the Area1 through Area3 regions and the interconnection material area can be partially adjusted to ensure that 22 us is reduced to within 20 μs. Through such hardware design modifications or software-based correction processes, it is possible to prevent errors in the detection of touch coordinates.

Recently, touch technology integrated with display devices has been increasingly adopted in aircraft, automobiles, and industrial equipment due to its intuitive convenience. In such cases, errors in touch coordinate calculations can lead to unintended switch operations, potentially causing accidents. Consequently, the importance of accurately calculating touch coordinates is becoming ever more critical. Therefore, system designers must thoroughly understand the system to apply appropriate compensation values for each CDA, stabilize the entire system through adjustments, or modify factors such as alternating frequency, the magnitude of alternating voltage, or design parameters (e.g., width (w), distance (d), length (l)) in specific areas (Area1 through Area3 or interconnection material areas). These actions ensure a stable system and facilitate precise extraction of touch coordinates.

Thus, the present invention provides a theoretical basis for accurately calculating the sizes of coplanar capacitances, common electrode capacitances, parasitic capacitances, or line resistances formed in each area, including the sensing CDA and SSL. Based on these calculated parameters (R and C), the invention enables precise determination of touch coordinates.

On the other hand, referring again to FIGS. 22A to 22B, the common electrode capacitance formed on the VFL does not affect the magnitude of the voltage detected at the SSL, except in cases where an incomplete saturation voltage is measured due to delays in rising time or falling time. This is because, under the formation conditions of the coplanar capacitance composed of a parallel-plate structure as described in the present invention, only the voltage applied to the VFL acts as a variable, while the common electrode capacitance formed on the VFL does not act as a variable.

The following is an explanation of the linearity of voltage detected at the SSL. In general, a good sensor system should exhibit consistent output characteristics under the same input conditions, even when environmental conditions change. Additionally, when the input of a system changes linearly, the output should also exhibit linearity or be representable as a mathematically predictable or computable function. Indicators of the output characteristics of a sensor under specific input conditions include Linearity, Accuracy, and Hysteresis.

Linearity refers to the property of a system to provide proportional output for linearly increasing or decreasing input, indicating that the relationship between input and output is linear. Accuracy indicates how close the output characteristics representing the measured value are to the actual value, reflecting the precision of the measurement, with smaller errors signifying higher Accuracy. Hysteresis refers to the phenomenon where the output characteristics of a system are influenced by its previous states or inputs, resulting in different outputs for the same input depending on the system's prior condition.

FIG. 22A illustrates an embodiment of the present invention that calculates the detected voltage values at different CDA positions within a CDA column for the same object capacitance input. The Vp_nt in FIG. 22A represents the voltage detected at the SSL based on [Equation 7]. Additionally, Vp_tch represents the voltage formed at the SSL, calculated based on [Equation 8], and ΔV represents the value of [Equation 9], obtained by performing the operation [Equation 7]-[Equation 8].

In the CDA column, CDA1, located at a far distance, has a larger coplanar capacitance and a larger common electrode capacitance compared to CDA14, which is located at a near distance. The alternating voltage applied is Vd1=0V and Vd2=5V, with an internal parasitic capacitance (cpr) of 4 pF applied uniformly to each CDA. The coplanar capacitance is designed to have a value of 1 pF per CDA unit, while the common electrode capacitance is designed to vary by 0.5 pF per CDA unit.

According to the above design rule, CDA2 exhibits a 1 pF reduction in coplanar capacitance and a 0.5 pF reduction in common electrode capacitance compared to CDA1. This trend applies uniformly to all CDAs from CDA1 to CDA14.

Referring to FIG. 13, the length (l) of the CDA signal line increases or decreases proportionally each time a CDA is added to or removed from a CDA column. According to [Equation 3], the coplanar capacitance varies proportionally with the length (l) of the SSL, making it a natural result that the coplanar capacitance (ccpl) changes linearly with the addition or removal of CDAs.

Additionally, the common electrode capacitance (cc) is also proportional to the opposing area. For the same line width (w) of the CDA signal line, the opposing area in the vertical direction is proportional to the length (l) of the CDA signal line. Therefore, as the position of the CDA increases or decreases linearly by one unit, the size of the common electrode capacitance also increases or decreases linearly.

Figure 23B:
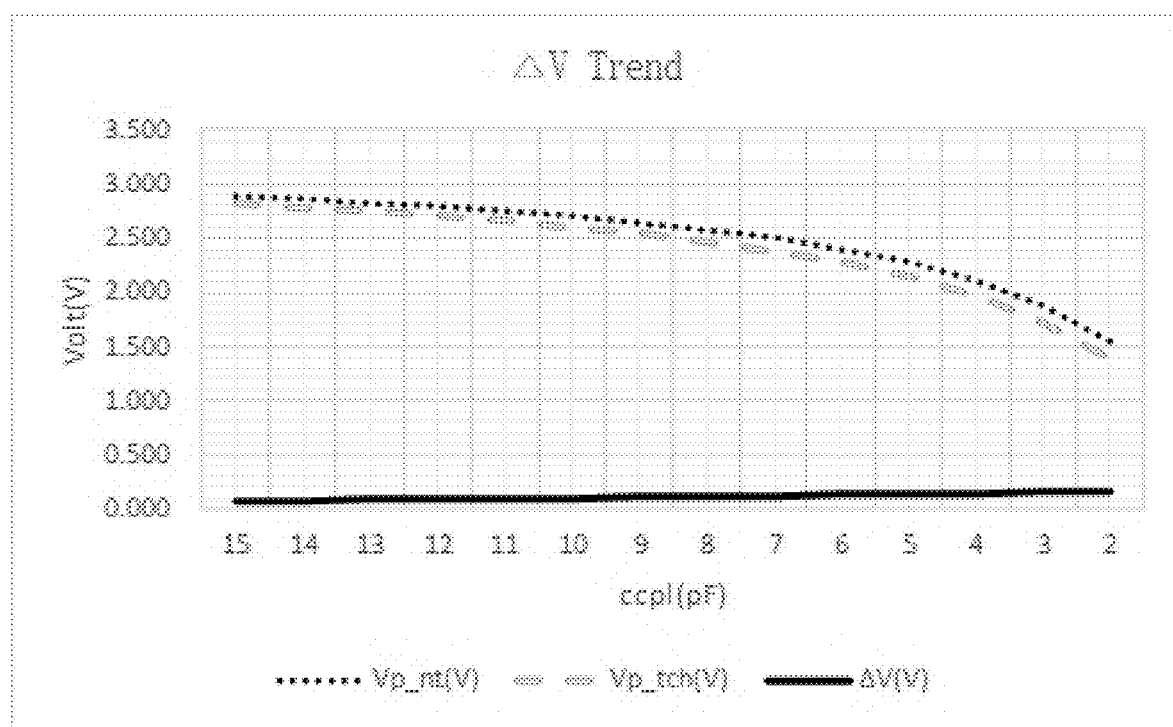
FIG. 23B illustrates an embodiment of the present invention, which visualizes the trend of detection voltage variations at different CDA positions in a graph based on [Equation 7] to [Equation 9] of FIG. 22A.

Referring to FIG. 23B, it can be observed that across the entire range from the far CDA1 (ccpl=15 pF) to the near CDA14 (ccpl=2 pF), Vp_nt, Vp_tch, and ΔV exhibit nonlinear increments despite the input of the same object capacitance and the linear variation of ccpl and cc. An ideal system would detect identical values of Vp_tch regardless of the CDA position for the same object capacitance. As a next-best option, a system in which the variations are linear would enable straightforward calibration. However, as illustrated in FIG. 23B, the object detection device of the present invention demonstrates a nonlinear characteristic, wherein the output voltage increases nonlinearly due to the input of the same object capacitance and the linear variation of ccpl and cc.

The reasons and characteristics for the nonlinear variations in the output voltage are as follows:

1) Mismatch in the linearity between changes in the denominator due to the sum of capacitances and the numerator due to changes in ccpl: The changes in the sum of capacitances (ccpl, cpr, cc, cline, cobj) in the denominator and the changes in ccpl in the numerator, due to variations in ccpl or cc, are nonlinear.
2) Sensitivity to ccpl increments: As ccpl increases, the changes in the total capacitance in the denominator become relatively smaller compared to the changes in ccpl in the numerator. This causes Vp_nt and Vp_tch to increase nonlinearly as ccpl increases.
3) Effect of cobj: In Vp_tch, cobj is added to the denominator, further reducing the sensitivity of the entire denominator term to changes in ccpl or cc. This results in Vp_tch outputting a lower voltage compared to Vp_nt.
4) Nonlinearity of ΔVp: ΔVp is the difference between Vp_nt and Vp_tch, as represented by the difference between [Equation 7] and [Equation 8]. The denominators of [Equation 7] and [Equation 8] differ due to the presence or absence of cobj, causing ΔVp to change nonlinearly in response to the linear variations of ccpl and cc because of the difference in the ratio of cobj in the denominator.

As examined above, the system of the present invention exhibits characteristics wherein the detected voltage at the SSL varies depending on the position of the CDA for the same object capacitance. Additionally, the voltage detected at the SSL changes nonlinearly with the linear variation in the SSL length caused by changes in the CDA position.

The nonlinear characteristics of such a system 1) make it difficult to predict the operation of the system, complicating the design process, and 2) can hinder the reliable calculation of touch coordinates, potentially having a negative impact on the performance of the product.

To address the above-mentioned issues, the present invention proposes a hardware modification method that adjusts design variables such as the line width (w), lateral spacing (for ccpl), or facing length through the simulation process presented herein, enabling the system to achieve linearity. Alternatively, a software correction method can be employed, where the nonlinear voltage ratios output by each CDA position are pre-calculated, stored as correction values in memory, and called upon during scanning of each CDA to apply an algorithm that transforms nonlinearity into linearity.

The proposed hardware and software solutions can be used independently or in combination.

In the process of configuring the capacitive detection device by using coplanar capacitance as a charge-supplying medium, the present invention identified the issue of system nonlinearity. To address this issue, the invention identifies the causes of nonlinearity and proposes solutions through both hardware and software methods. To fully understand these solutions, it is necessary to comprehend the system's transfer function, as well as the principles and methods for calculating the size of factors constituting the transfer function, including 1) coplanar capacitance, 2) common electrode capacitance, and 3) parasitic capacitance. The present invention provides a detailed explanation of these aspects.

Based on the theories and methods described in this specification, system designers can optimize the design of detection sensors and stabilize detection signals through software correction methods, thereby ensuring the reliable calculation of touch coordinates.

The following is an explanation of the method for calculating the touch coordinates of an object.

Figure 24:
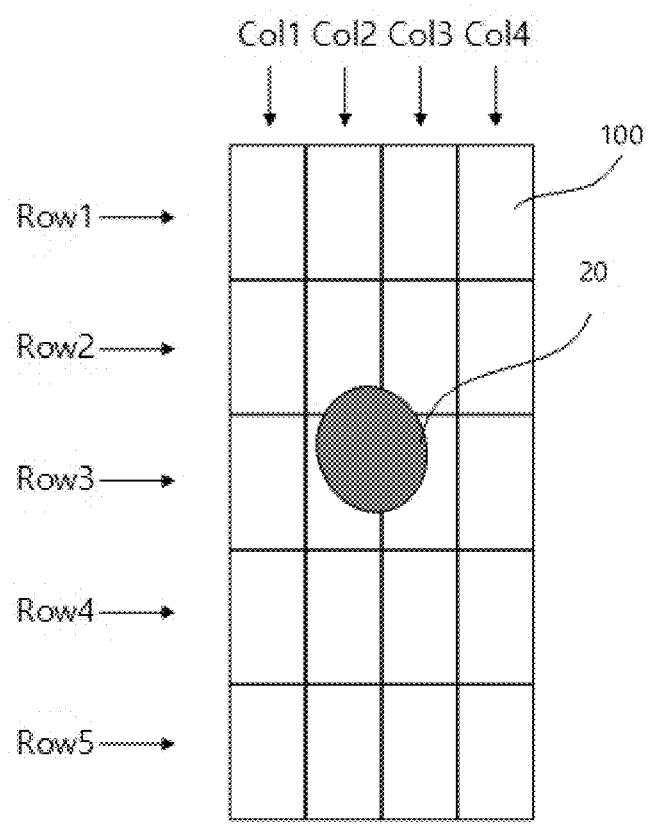
FIG. 24 is an embodiment of the present invention illustrating the spatial relationship between a CDA and an object during a touch event.

Referring to FIG. 24, the embodiment of the present invention illustrates the vertical alignment between a CDA and an object when a touch occurs. FIG. 24 depicts the capacitive detection device of the present invention, consisting of four CDA columns, with each CDA column comprising five CDAs. The circular area represents the touch area caused by a finger (object 20). For simplicity, CDA signal lines 200, upper and lower substrates, protective layers, and other elements are omitted.

The finger touches the region spanning Col2/Col3 and Row2/Row3. It is assumed that the ADC uses 10-bit resolution. For instance, the ADC value detected at C2R2 CDA is assumed to be 100, at C3R2 is 90, at C2R3 is 550, and at C3R3 is 450. One method for determining the touch coordinates of the object is to calculate the center of mass using the four ADC data points.

The more CDAs utilized, the higher the precision of the calculated touch coordinates. However, increasing the number of CDAs leads to a higher number of TDI pins required to connect the CDA signal lines, which in turn increases the size of TDI 400, potentially reducing commercial viability due to reduced cost competitiveness or difficulties in arranging the TDI within a confined module space.

One approach to improving touch coordinate precision is to modify the CDA design. Referring again to FIG. 13, an example short side (horizontal direction) of a CDA shows a range from 4 mm to 7 mm, while the long side (vertical direction) shows a range from 7 mm to 15 mm. Adjacent to the rightmost CDA column in FIG. 13, an auxiliary (AUX) CDA replaces one CDA column. The AUX CDA features a short side of 1 mm to 3 mm and a full vertical length matching the CDA column.

The size of the CDA can be designed assuming a touch area with a circular diameter of 4 mm caused by a finger. Similarly, for a pen—despite variations in specifications across manufacturers—it can be assumed that the tip diameter ranges from 0.7 mm to 2 mm, and the CDA size and shape can be determined accordingly.

If a circular touch area with a 4 mm diameter contacts the surface of the AUX CDA in FIG. 13, touch data (ΔV, as shown in FIG. 22A) will inevitably be extracted from 2 or 3 CDA columns, including the AUX CDA. The center of mass is calculated for both the vertical and horizontal axes. Due to the structural characteristics of the capacitive detection device of the present invention, the horizontal center of mass is determined using the ADC values of the entire CDA column. Therefore, the AUX CDA, which can produce ADC values equivalent to those of an entire CDA column with just one CDA, enables the calculation of the horizontal center of mass.

If multiple AUX CDAs are placed between CDA columns (e.g., one AUX CDA per CDA column), the number of TDI pins required can be reduced while still determining horizontal touch coordinates. Additionally, for the same number of pins, the horizontal touch coordinates can be extracted with greater precision.

Next, the method for determining vertical touch coordinates when an object moves vertically is described. If the vertical dimension (or long side) of a CDA is approximately 7 mm to 15 mm, and a finger with a diameter of 4 mm touches the center of the CDA, a vertical movement of about 1 mm will still result in ADC values being detected from only one CDA. This does not satisfy the condition that requires at least two CDAs to be touched to calculate the center of mass, creating a problem in determining the vertical touch coordinates for the object's movement.

Figure 25B:
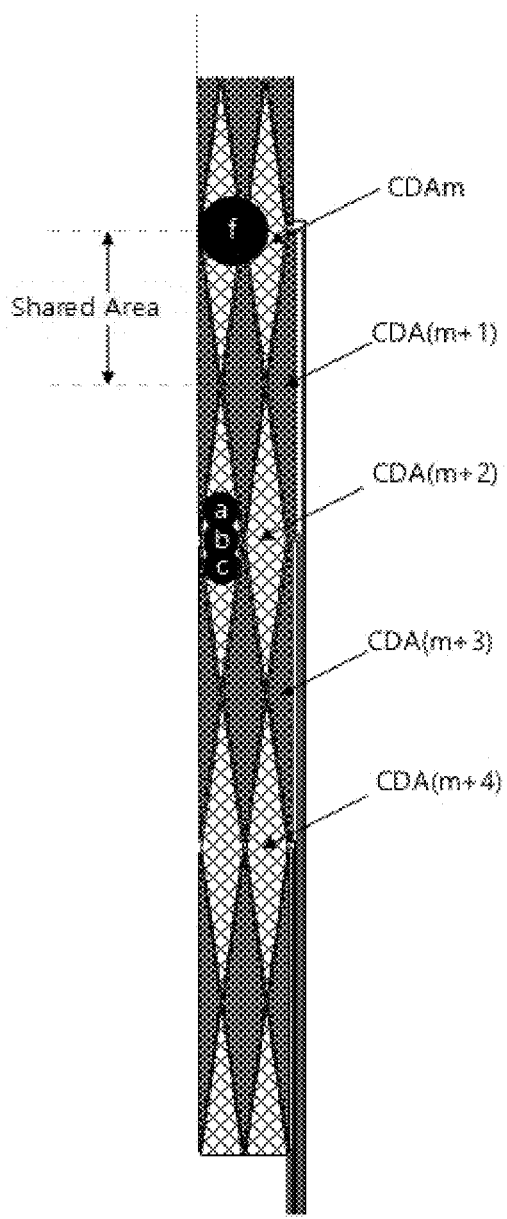
FIG. 25B is an embodiment of the present invention illustrating the configuration of a CDA column for detecting vertical touch coordinates based on the vertical movement of an object.
Figure 25C:
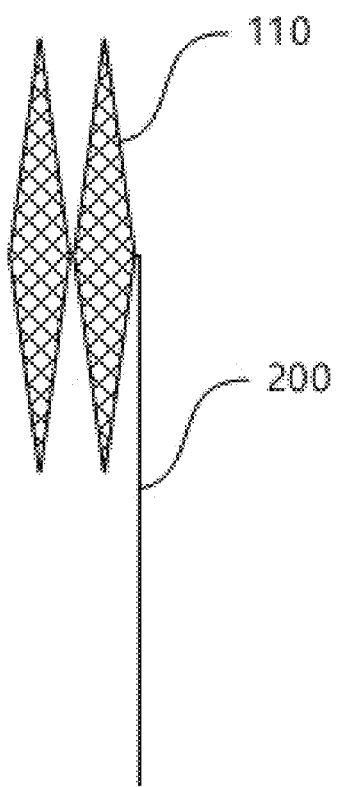
FIG. 25C is an embodiment of the present invention illustrating a separate view of Secondary Shape CDAs that form the Primary Shape CDA in FIG. 25A.

FIG. 25A represents a rectangular Primary Shape CDA used to illustrate the area and position of a CDA. FIG. 25B shows the configuration of a CDA column for determining vertical touch coordinates based on the vertical movement of an object. FIG. 25C isolates only the Secondary Shape CDAs that form the Primary Shape CDA shown in FIG. 25A.

FIG. 25A illustrates a rectangular CDA utilized in the embodiment of FIG. 13, showing the actual area of the CDA and its placement within the capacitive detection device of the present invention.

FIG. 25B represents a CDA column capable of detecting touch coordinates corresponding to the vertical movement of an object during a touch event. The conventional rectangular shape of a CDA forming the CDA column can be modified into one or more rhombus shapes, as shown in FIG. 25C. The center of the rhombus shape aligns with the center of the rectangular CDA.

In this specification, the rectangular CDA shown in FIG. 25A is referred to as a Primary Shape CDA, while the rhombus shapes that form the Primary Shape CDA are referred to as Secondary Shape CDAs.

The Secondary Shape CDA possesses the following characteristics:
1) The Primary Shape CDA is composed of multiple Secondary Shape CDAs.
2) The total area of the Secondary Shape CDAs is smaller than the area of the Primary Shape CDA due to separation spaces formed at the boundaries between neighboring CDAs. The greater the number of boundaries, the smaller the total area of the Secondary Shape CDAs compared to the Primary Shape CDA.
3) The edges of the Secondary Shape CDAs extend near the centerline of the vertical side of the adjacent Primary Shape CDA above or below but maintain a certain distance from this centerline.
4) The edges of the Secondary Shape CDAs that extend near the centerline of vertically neighboring Primary Shape CDAs face each other along an imaginary horizontal line passing through the vertical centerlines. For example, the edges of the Secondary Shape CDA forming the third-row Primary Shape CDA in a CDA column are aligned to face the edges of the first-row and fifth-row Primary Shape CDAs along horizontal lines passing through the centerlines of the second-row and fourth-row Primary Shape CDAs.
5) Vertically neighboring heterogeneous Secondary Shape CDAs within a CDA column are jointly arranged with separation spaces in the region between their vertical centers. This region is referred to as the "shared area."
6) A single Secondary Shape CDA has one shared area above and one below, centered along its major axis. The center of the major axis is defined as the center of a line connecting opposite edges of the Secondary Shape CDA.

In FIG. 25B, the object "f," located at the center of the vertical side of the Primary Shape CDA (CDAm), represents an object with a diameter of 4 mm. A touch occurs across three CDAs, specifically CDA(m−1), CDAm, and CDA(m+1). If the object "f" moves downward by a certain distance, the touch area on CDA(m−1) and CDAm decreases, while the touch area on CDA(m+1) increases.

This change in touch area alters the object capacitance, allowing the detection of ADC changes across the three touch regions based on [Equation 9]. Even when the object "f" moves further downward into the shared area between CDAm and CDA(m+1), it is possible to calculate the vertical touch coordinates based on changes in touch area, as the variations in touch area can be detected via ADC.

Thus, modifying the Secondary Shape CDA into a rhombus shape enables the detection of vertical touch coordinates, even for short vertical movements of an object, compared to the conventional rectangular CDA where such changes might not be detectable.

Using rhombus-shaped Secondary Shape CDAs increases the number of boundaries with vertically neighboring heterogeneous Secondary Shape CDAs. These boundaries and the separation spaces formed between them create coplanar capacitances due to the Parallel-Plate Coplanar arrangement of the Secondary Shape CDAs. The separation spaces correspond to the distance (d) in Equation 3, while the boundary length corresponds to the opposing length (l) in Equation 3. The line width (w) of the signal lines can be approximately set to half the base length of the triangles forming the rhombus.

As the number of boundaries increases, the coplanar capacitance grows, which reduces the detection sensitivity (ΔV in FIG. 23). This reduction in detection sensitivity decreases the Signal-to-Noise Ratio (SNR) of the ADC, potentially reducing the precision of touch coordinate detection. For this reason, there may be limits to increasing the number of Secondary Shape CDAs.

The circles labeled "a" to "c" in FIG. 25B represent the tip of a pen, which can have a diameter of approximately 1 mm to 2 mm. In the example of FIG. 25B, the horizontal length of the Secondary Shape CDA at the center of the Primary Shape CDA's vertical side may be wider than the diameter of the pen tip. In such cases, a short vertical movement of the pen tip (e.g., within the range from "a" to "c") might not cause a change in the touch area of the vertically neighboring heterogeneous Secondary Shape CDAs. Consequently, it may become impossible to detect the coordinates corresponding to the vertical movement of the pen, leading to touch detection errors when using the pen.

A solution to this issue is to increase the number of Secondary Shape CDAs that compose a Primary Shape CDA. For example, by increasing the number of rhombus-shaped Secondary Shape CDAs in FIG. 25B to more than two while ensuring that the maximum width at the center point is narrower than the diameter of the Pen Tip, the problem of detecting touch coordinate errors caused by vertical movement of the Pen Tip can be resolved.

However, increasing the number of Secondary Shape CDAs also increases the length of the boundaries with neighboring CDAs by an amount proportional to the four edges of the rhombus shape. This results in increased coplanar capacitance, which reduces detection sensitivity and signal-to-noise ratio (SNR), presenting a disadvantage.

Figure 25D:
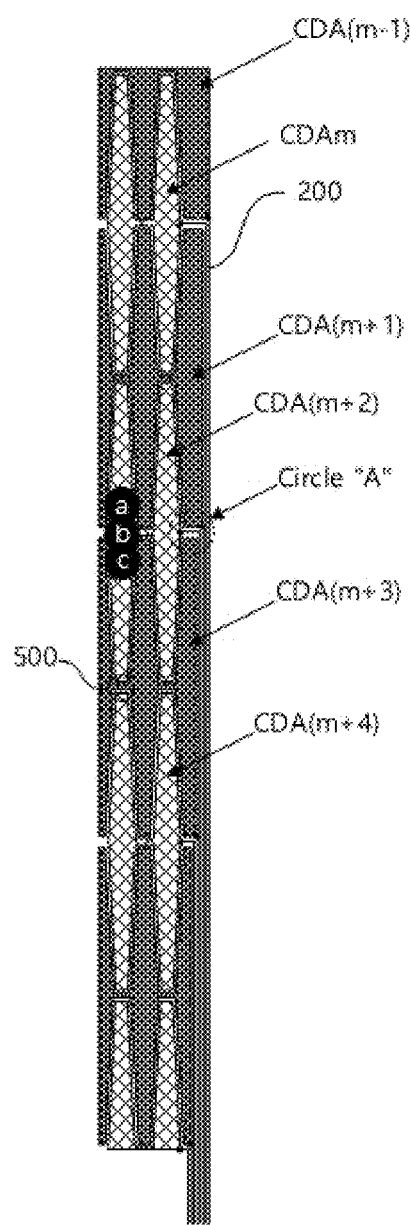
FIG. 25D is an embodiment of the present invention addressing vertical coordinate detection errors caused by Secondary Shape CDAs configured as triangles or rhombuses.

FIG. 25D illustrates an embodiment of the present invention designed to resolve the issue of vertical touch coordinate detection errors caused by rhombus-shaped Secondary Shape CDAs. In FIG. 25D, the Secondary Shape CDA is formed not as a rhombus but as a gear-shaped composite trapezoid composed of two trapezoids joined vertically. The trapezoids are characterized by two oblique sides forming the vertical long edges and two opposing horizontal edges, one longer and one shorter.

The Secondary Shape CDA, constructed as a composite trapezoidal structure, can be combined in two ways.

The first method involves combining the structure vertically along the longitudinal axis center of the Primary Shape CDA, as shown in the embodiment of FIG. 25D. In this method, the combined structure forms a gear-like shape where the transverse edge at the center is wide, and the transverse edges at the outer sides are narrow. The second method, although not illustrated, also involves combining the structure vertically along the longitudinal axis center of the Primary Shape CDA. In this method, the combined structure forms a shape resembling a butterfly, where the transverse edge at the center of the longitudinal axis is narrow, and the transverse edges at the outer sides are wide.

In this specification, a structure where the area of the Secondary Shape CDA decreases as it moves toward its edges is called a "decreasing structure," and a structure where the area increases is called an "increasing structure."

In one embodiment, the Secondary Shape CDA is composed of two trapezoids in either an increasing or decreasing structure. Multiple interconnected Secondary Shape CDAs form a Primary Shape CDA. At the center of the vertical axis of each Secondary Shape CDA, a bridge 500 is located for electrical connection to neighboring identical Secondary Shape CDAs.

Referring to the bridge 500 in FIG. 25D, it electrically connects the Secondary Shape CDAs that make up the Primary Shape CDA (CDA(m+3)). The upper side of the bridge aligns with the edge of the Secondary Shape CDA of CDA(m+2), and the lower side aligns with the edge of the Secondary Shape CDA of CDA(m+4). The separation distance between the bridge and these two Secondary Shape CDAs is preferably the same.

In this invention, the rectangular Primary Shape CDA is not directly used for detecting touches. Instead, it serves as a conceptual area for determining the placement of Secondary Shape CDAs. (In some embodiments, the rectangular Primary Shape CDA can be designed with a narrower width to detect touches directly.)

Referring to the embodiment of FIG. 25D, at any given point on a Secondary Shape CDA, the total horizontal length of itself and its neighboring Secondary Shape CDAs does not exceed the horizontal edge of the Primary Shape CDA. This is because Secondary Shape CDAs are always located within the boundaries of the Primary Shape CDA.

Thus, in the composite trapezoidal Secondary Shape CDA, reducing the width of the horizontal long edge requires increasing the width of the opposing horizontal short edge, and vice versa.

Referring again to FIG. 25D, if the Pen Tip is located at the center "b" of the decreasing structure's Secondary Shape CDA and moves vertically between points "a" and "c," changes in the touch area occur at CDA(m+1), CDA(m+2), and CDA(m+3). This is because the horizontal width of the Secondary Shape CDA (corresponding to point "b") in the embodiment of FIG. 25D is narrower than the horizontal width of the Secondary Shape CDA in the embodiment of FIG. 25B.

The changes in the touch area caused by the Pen Tip are extracted as changes in ADC codes during scanning. Using the ADC values from three consecutive neighboring CDAs, it is possible to detect vertical touch coordinates.

For detecting the voltage output from a pen, there is no need to apply alternating voltage to neighboring VFLs to obtain coplanar capacitance. However, for detecting objects like fingers that do not output alternating voltage, it is necessary to rely on charge-sharing phenomena provided by coplanar capacitance to detect object capacitance.

Even in the embodiment of FIG. 25D, where the Secondary Shape CDA is formed as a gear-shaped composite trapezoid, coplanar capacitance is formed at the boundaries. For two neighboring Secondary Shape CDAs located coplanarly at a certain separation distance, the coplanar capacitance is proportional to the length of the boundary.

The separation space between boundaries corresponds to the distance (d) in Equation 3, while the boundary length corresponds to the facing length (l). The line width (w) is approximately determined as half the sum of the widths of the horizontal edges at the center and at the edges. The total coplanar capacitance formed within the composite trapezoidal Secondary Shape CDA is determined by summing the coplanar capacitances formed along each external side. Such embodiments will be further described in FIGS. 28 and 30.

Thus, unlike previous embodiments where the horizontal edge could only be adjusted by increasing the number of triangles or rhombus shapes, as in the short diagonal of the rhombus, this invention introduces trapezoids with two heterogeneous horizontal edge lengths. This enables horizontal edge length adjustment through the proportional adjustment of the long and short horizontal edges. Consequently, the invention makes it possible to detect touch coordinates for narrower vertical movements of the Pen Tip without increasing the number of Secondary Shape CDAs. Additionally, the invention leverages the diagonal characteristics of the trapezoidal shapes, similar to those of rhombus shapes, to induce area changes during the vertical movement of the pen.

Figure 26A:
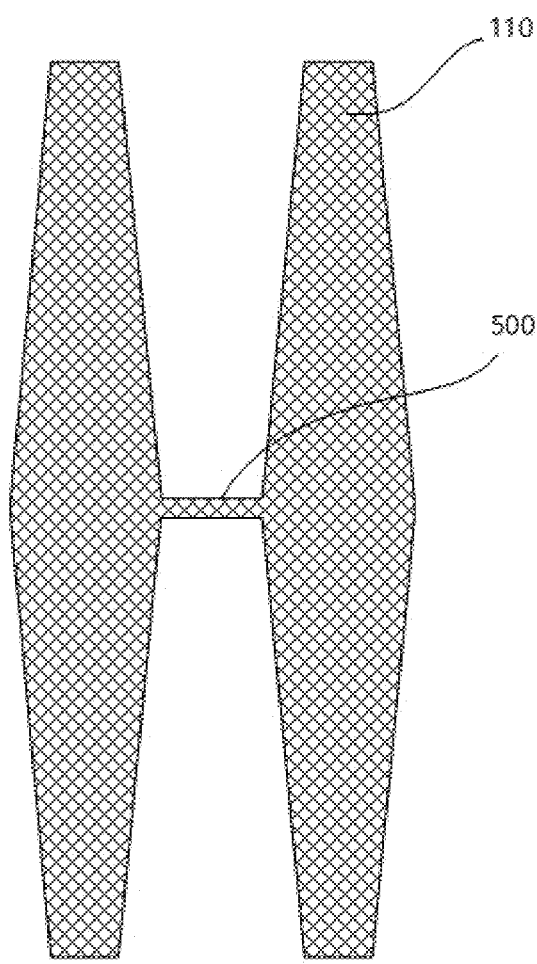
FIG. 26A is an embodiment of the present invention illustrating a Secondary Shape CDA composed of composite trapezoids with straight edges.

Next is a description of the outer shape of the Secondary Shape CDA. FIG. 26A is an embodiment of the present invention where the outer shape of the Secondary Shape CDA composed of composite trapezoids is formed in straight lines. FIG. 26A shows two Secondary Shape CDAs composed of composite trapezoids according to the present invention, which are electrically connected at the center via a bridge 500.

In the embodiment of FIG. 26A, the outer shape of the Secondary Shape CDA consists of two long oblique sides at a certain angle in the vertical direction and two opposing short horizontal sides, and all outer shapes are formed with straight lines without curvature.

When the outer shape of the Secondary Shape CDA is composed of straight lines without curvature as above, moiré patterns can occur between the outer shape of the Secondary Shape CDA and the source signal lines, gate signal lines, or pixels that make up the display device.

Moiré patterns are visual phenomena that occur when two or more regular patterns overlap and can degrade the image display quality of the display device. Moiré patterns occur when the Secondary Shape CDA that makes up the touch detection device of the present invention gradually overlaps or gradually ceases to overlap with the source signal lines, gate signal lines, or pixels that make up the display device, and this pattern repeats regularly, resulting in differences in transmittance, and various forms of moiré patterns occur visually due to the difference in transmittance.

To prevent moiré patterns that occur between the display device and the Secondary Shape CDA that makes up the touch detection device of the present invention, the outer shape of the Secondary Shape CDA should preferably form oblique lines rather than being parallel to the components of the display device, which are mostly composed of straight lines, such as source signal lines, gate signal lines, or pixels.

Figure 26B:
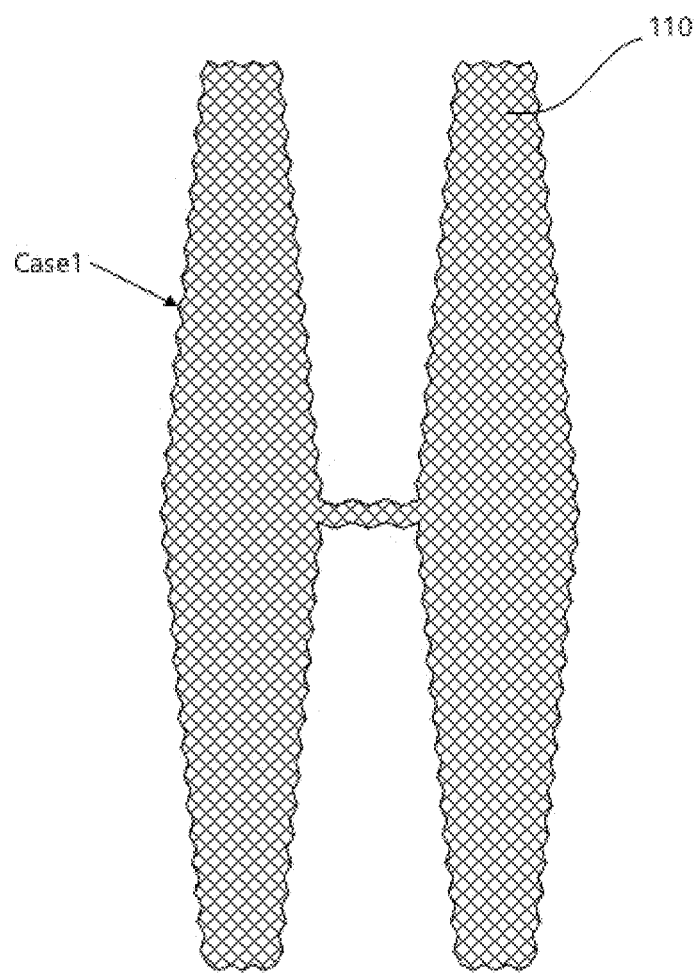
FIG. 26B is an embodiment of the present invention illustrating a Secondary Shape CDA composed of composite trapezoids with zigzag edges.

FIG. 26B is an embodiment of the present invention where the outer shape of the Secondary Shape CDA is formed with zigzag-shaped oblique lines (hereinafter referred to as chevrons). Referring to FIG. 26B, it is the same as FIG. 26A in that it consists of two Secondary Shape CDAs composed of composite trapezoids, and the outer shape consists of many chevrons. The angle, length, or area of the two oblique lines that make up the chevron are determined to minimize moiré patterns depending on the size and shape of the pixels that make up the display device.

When the outer shape of the Secondary Shape CDA is composed of continuous connections of chevrons as in FIG. 26B, it is preferable that the separation distance (width of the separation space) between the mutual boundaries with neighboring heterogeneous Secondary Shape CDAs is configured to be the same over the entire area of the boundary composed of one side (a zigzag-shaped boundary will be formed).

Among the two short oblique lines that make up the chevron of the boundary, one short oblique line forms a Parallel-Plate Coplanar arrangement with one short oblique line of the chevron that makes up the Secondary Shape CDA of the other component that constitutes the boundary, so coplanar capacitance is also formed on the short oblique lines of the chevron. In the two short oblique lines that make up the chevron, two coplanar capacitances are formed, and these can be equivalent to one coplanar capacitance connected in parallel. Therefore, the boundary of the Secondary Shape CDA formed by multiple chevrons has a coplanar capacitance formed by summing all the coplanar capacitances formed in one chevron, and there is a problem that the coplanar capacitance increases as the length of the boundary increases compared to the embodiment of FIG. 26A where the boundary is formed only with one oblique line.

Next is a description of the regularity of the chevrons that make up the outer shape of the Secondary Shape CDA. Referring to FIG. 26A, the outer shape of the Secondary Shape CDA consists of four vertical oblique lines in the vertical direction and two horizontal sides. Suppose that one of the four vertical oblique lines maintains an angle of 12 degrees from the center to the edge of the Secondary Shape CDA. Assume that the oblique line maintaining the angle of 12 degrees formed by the continuous connection of multiple chevrons is the boundary indicated as Case1 in FIG. 26B.

In the embodiment of Case1, which is the boundary that constitutes the Secondary Shape CDA, the chevrons that form the outer shape of the Secondary Shape CDA maintain the same shape and the same following oblique angle of 12 degrees. The regularity of maintaining the same shape and the same following oblique angle for the chevrons may cause moiré patterns in response to the very strict layout regularity of the source signal lines, gate signal lines, or pixels that make up the display device.

Therefore, the size of the chevrons corresponding to the source signal lines, gate signal lines, or pixels, or the angle of the short oblique lines that make up the chevrons, or the angle at which the chevrons follow the outer oblique line of the Secondary Shape CDA, can be determined so as not to have regularity.

In one embodiment, among the continuously connected chevrons that form the outer shape of the Secondary Shape CDA, the angles of the two oblique lines that make up some chevrons may be designed to be 165 degrees, and some chevrons may be designed to be 159 degrees. As such, the angles of the two oblique lines that make up the chevron can be regularly changed or randomly changed.

Additionally, assuming that the pixel size is 20 μm (H)×60 μm (H), the shape of the chevron may be configured to correspond one-to-one with a pixel, with dimensions of 20 μm (H)×60 μm (H). Alternatively, it may be configured to correspond to a dot, with dimensions of 60 μm×60 μm. Moreover, it can also be designed with various dimensions beyond the aforementioned sizes.

Also, as in Case1 of FIG. 26B, when the angle of the outer oblique line that constitutes the Secondary Shape CDA follows 12 degrees, not all chevrons maintain the state of 12 degrees and are connected continuously, but they can be connected continuously while randomly changing at angles from 10 degrees to 15 degrees, reaching the final destination.

Meanwhile, when the Secondary Shape CDA is installed on the upper surface of the display device, the Secondary Shape CDA is formed of a transparent conductive material. The transparent conductive material is not a material that completely transmits light and has a transmittance loss of about 1~2%. When such a Secondary Shape CDA regularly forms CDA columns as in the embodiment of FIG. 25D, there may be a problem of poor visibility where the CDA signal lines become visible due to differences in transmittance caused by empty spaces between the CDA and the CDA signal lines. Also, since there is no transparent conductive material in the separation space between the boundaries of the Secondary Shape CDA, there may be a problem where the separation space becomes visible due to the difference in transmittance between the separation space and the CDA. Alternatively, signal lines may become visible due to differences in transmittance of the separation spaces between signal lines within the signal line bundle.

To avoid such poor visibility due to the transparent conductive material, the chevron shapes inside the Secondary Shape CDA are regularly peeled off, which can mitigate moiré patterns or prevent recognition of the separation spaces.

The pixels comprising the display device are made up of Red, Green, and Blue and may include White as well. The grouping of these three or four pixels is defined as a Dot. To mitigate moiré patterns or alleviate visibility issues for a single pixel or Dot aligned vertically with the Secondary Shape CDA, it is desirable to select optimal conditions for the size of the chevron and the angle of its oblique lines and apply them consistently per pixel or Dot. Thus, the placement of the chevrons should align with the vertical or horizontal arrangement of the pixels or Dots in the display device, and the chevrons should be arranged regularly along these axes.

For example, if the Dot size of a particular laptop screen is 150 µm×150 µm and has Full HD resolution, the screen has a resolution of 1920 (H)×1080 (V). A Dot measuring 150 µm×150 µm can include one or more chevrons, or a single pixel may correspond to one or more chevrons. The chevrons are regularly peeled off within and outside the Secondary Shape CDA in correspondence with the regular arrangement of Dots or pixels in the display device. This regularity implies that the size of the chevrons and the distances between adjacent chevrons are consistent.

The shape of the chevrons peeled off inside the Secondary Shape CDA also influences the external shape of the Secondary Shape CDA. For instance, when chevrons are peeled off within the Secondary Shape CDA in alignment with the Dots or pixels of the display device, the chevrons forming the external boundary of the Secondary Shape CDA should be one of the regularly arranged chevrons. Using a chevron that deviates from the regular pattern may lead to perceptible inconsistencies, causing visibility issues.

If the pixels of the display device follow a Vertical Stripe structure, they are arranged regularly in the vertical direction (aligned with Source Data Lines) and in the horizontal direction (aligned with Gate Driving Lines). When chevrons corresponding to these pixels or Dots are also peeled off regularly in vertical and horizontal directions, the external shape of the Secondary Shape CDA—whether trapezoidal or rhomboid with diagonal lines—will inherently be formed by the combination of chevrons connected vertically and horizontally. In the X-Y coordinate system, diagonal lines, such as Case1 in FIG. 26B, can be implemented using chevrons that are peeled off consecutively upwards or to the right, forming continuous connections in all directions. The number of chevrons composing the vertical direction and those shifted horizontally must ideally follow a regular pattern to effectively avoid moiré patterns. However, there may be situations where it is impossible to allocate chevrons consistently.

Thus, in this invention, when chevrons peeled off within or outside a single Secondary Shape CDA maintain uniform intervals or exhibit uniform dimensions and regularity, the external shape of the Secondary Shape CDA adheres to the arrangement pattern of these peeled chevrons, consisting of their continuous connections.

Referring again to FIG. 25D, the CDA signal line bundle that constitutes a CDA column is located on the right side of the column and is connected to the unillustrated lower TDI 400. The horizontal length of the CDA column includes the CDA signal line bundle. The number of CDA signal lines in the bundle decreases as they move upwards within the CDA column, so the area of the Primary Shape CDA located at the upper part of the CDA column is larger than that at the lower part of the column.

Therefore, the total area of the Secondary Shape CDAs constituting a single Primary Shape CDA is larger when located at the upper part of the CDA column compared to the lower part.

The area of the multiple Secondary Shape CDAs constituting a single Primary Shape CDA can be determined in two ways. The first method for configuring the area of Secondary Shape CDAs involves designing the area of identical Secondary Shape CDAs in the shared region proportionally based on whether the boundary is a full or partial shape. Additionally, the total area of heterogeneous Secondary Shape CDAs in the shared region is designed to be equal.

The second method involves making the area of the Secondary Shape CDAs located at the outer edge of the CDA column (through which CDA signal lines pass) variable, while the area of the Secondary Shape CDAs located inside the column remains consistent with the areas of the neighboring heterogeneous Secondary Shape CDAs above and below.

In the embodiment of FIG. 25D, a single Primary Shape CDA is composed of two Secondary Shape CDAs. The Secondary Shape CDAs, including the outer ones, consist of a combination of 0.5 (left side, half-body)+1 (center, full-body)+0.5 (right side, half-body). According to the first method for configuring the area of Secondary Shape CDAs, the ratio of 0.5+1+0.5 must remain consistent for every Secondary Shape CDA constituting a shared region.

However, according to the second method, 0.5 (left)+1 (center) is applied consistently to all Secondary Shape CDAs in the CDA column, while only the 0.5 on the right is adjusted variably, such as to 0.2 or 1.2, depending on the position within the CDA column.

In the embodiment of FIG. 27, where the odd-numbered CDA signal line bundles are placed on the right side of the CDA column and the even-numbered bundles are placed on the left, applying the second method for configuring the area of Secondary Shape CDAs results in variable areas for the outer Secondary Shape CDAs located on the left or right side of the CDA column. At the same time, all Secondary Shape CDAs located inside the CDA column have identical areas.

Figure 30:
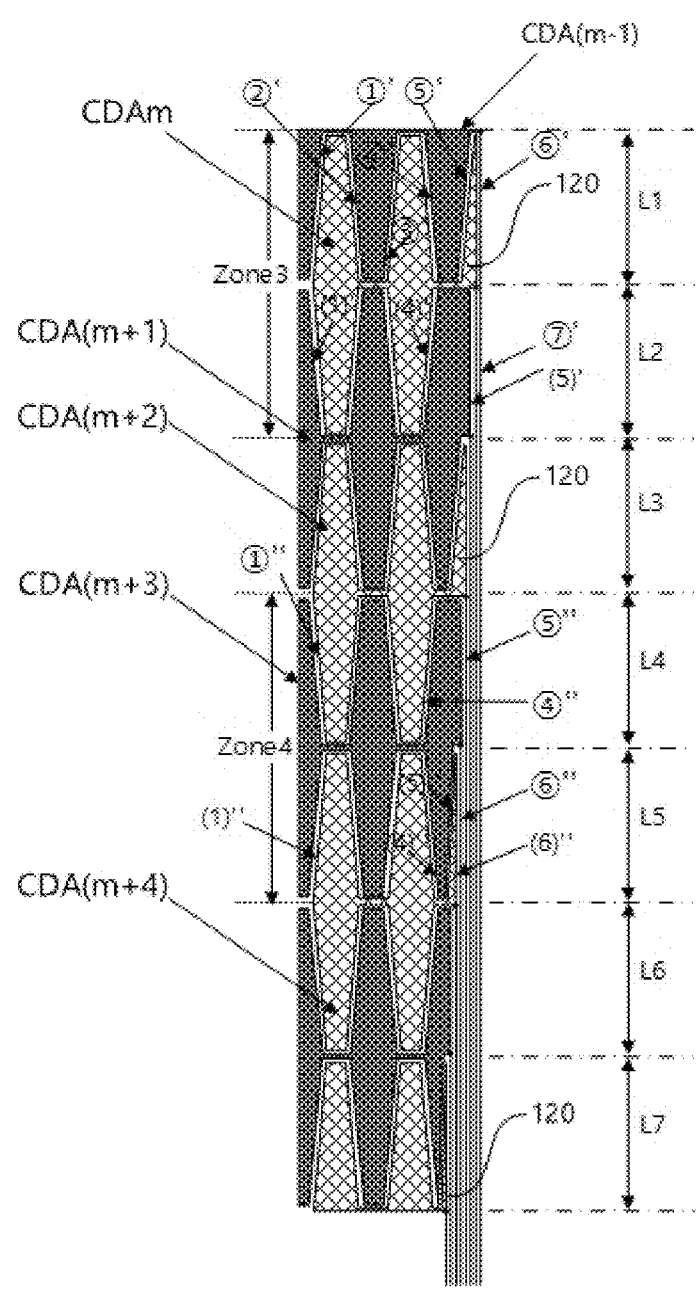
FIG. 30 is an embodiment of the present invention illustrating an improved arrangement where the positions forming coplanar capacitance are equalized for all Primary Shape CDAs in a CDA column with the CDA signal bundle arranged on one side.

When the Secondary Shape CDA's area configuration follows the first method, as shown in FIG. 30 described later, the CDA signal lines are extracted at the center of the vertical boundary of the Primary Shape CDA, i.e., the bridge 500. Consequently, when an object moves vertically across the bridge 500, an area variation occurs in the vertical direction due to differences in areas caused by the CDA signal lines.

In contrast, for the second method of Secondary Shape CDA area configuration, area changes occur only when the object passes through the center or edge of the variable-sized outer Secondary Shape CDAs. No area change occurs when the object crosses the boundaries between vertically opposing inner CDAs, as there is no area variation at the inner bridge.

In the Secondary Shape CDA configured by the first method, the area variation caused by vertical movement across the bridge is uniformly distributed across all bridges, effectively dispersing the impact proportional to the number of Secondary Shape CDAs. On the other hand, in the Secondary Shape CDA configured by the second method, area variations are concentrated only at the center and edge of the outer CDAs. Thus, significant touch coordinate detection errors may occur during vertical movements in the outer regions, making the first method more favorable for reducing errors.

Therefore, to minimize area variations due to the pen's vertical movement, it is preferable to use the first method for configuring the Secondary Shape CDA area.

Referring again to FIG. 25D and FIG. 30 described later, it can be observed that the variation in CDA signal line quantities causing area changes does not occur in the shared region. Hence, if the total area of heterogeneous Secondary Shape CDAs forming the shared region is kept identical, there will be no area variation due to the vertical movement of the object in the shared region. This approach prevents touch coordinate detection errors.

Next, an explanation is provided regarding the vertical arrangement of Secondary Shape CDAs. Referring to FIG. 25D, CDAs such as CDAm or CDA(m+2) consist of Secondary Shape CDAs fully enclosed by adjacent CDAs such as CDA(m−1), CDA(m+1), or CDA(m+3). These Secondary Shape CDAs are located only inside the CDA column. In contrast, at the outer edge of the CDA column near the CDA signal lines, Secondary Shape CDAs are partially formed, with areas amounting to 50% of a complete CDA or appearing as incomplete shapes that surround the inner Secondary Shape CDAs.

In the embodiments of FIG. 25B and FIG. 25D, all Secondary Shape CDAs located inside the CDA column are formed as complete shapes, such as triangles or trapezoids, stacked vertically. On the other hand, the outer Secondary Shape CDAs consist of combinations of complete and half shapes, such as 0.5 (left half)+1 (center full shape)+0.5 (right half). The full shapes are located inside the CDA column, while the half shapes are positioned at the outer edges.

Although FIG. 25B and FIG. 25D show distinctions between Primary Shape CDAs consisting only of Secondary Shape CDAs located inside and Primary Shape CDAs consisting of both inner and outer Secondary Shape CDAs, it is also possible, depending on the design, to configure all Primary Shape CDAs to share both inner and outer regions, as seen in the embodiment of FIG. 27.

In this document, a "half shape" does not necessarily indicate an area equal to 50% of a full shape but rather refers to a geometric shape that is half of the complete structure. However, depending on the Secondary Shape CDA area configuration method, the area of the half shape may be defined as 50% of the full shape.

The following describes the imbalance in the detection voltage generated in the SSL due to the coplanar capacitance formed in the secondary shape CDA located on the outer side of the CDA column, as well as a device designed to address this issue.

Referring again to FIG. 25D, in implementations such as CDAm or CDA(m+2), the CDA signal lines in the outer region of the CDA column are extracted at the shortest path from the bottom TDI 400 and join the CDA signal line bundle.

Referring to circle "A" in FIG. 25D, the CDA signal lines for the inner Secondary Shape CDAs, such as CDA(m+2), are extracted from the vertical axis center of the Secondary Shape CDA and join the CDA signal line bundle on the right side of the CDA column. In contrast, for outer Secondary Shape CDAs, such as CDA(m+1), the signal lines are extracted from the bottom edge nearest the TDI 400 and join the bundle.

When Secondary Shape CDAs in odd-numbered or even-numbered positions are located only inside the CDA column, the CDA signal lines are extracted from the vertical axis center of the Secondary Shape CDAs. However, when Secondary Shape CDAs are present both inside and outside, the CDA signal lines are extracted adjacent to one another, resulting in signal lines being extracted every double length of the vertical boundary of the Primary Shape CDA.

FIG. 27 illustrates an embodiment of the present invention in which all Primary Shape CDAs are equipped with outer Secondary Shape CDAs. Referring to FIG. 27, the number of Secondary Shape CDAs constituting one Primary Shape CDA is 2.5. The number of Secondary Shape CDAs in a Primary Shape CDA can either be an integer, such as 2 or 3, or include an additional 0.5, such as 2.5 or 3.5. In the embodiments shown in FIGS. 25B and 25D, the number of Secondary Shape CDAs is 2, while FIG. 27 depicts a case where the number is 2.5.

Referring to FIG. 27, when the number of Secondary Shape CDAs per Primary Shape CDA is 2.5, the odd-numbered and even-numbered Primary Shape CDAs in the CDA column are equipped with half-sized Secondary Shape CDAs on the outer side. These outer Secondary Shape CDAs are installed alternately on the left and right sides of the CDA column. For example, in FIG. 27, CDAs such as CDAm or CDA(m+2) feature outer Secondary Shape CDAs on the left side of the CDA column, while CDAs like CDA(m+1) or CDA(m+3) have outer Secondary Shape CDAs on the right side. Consequently, CDA signal lines extracted from these outer Secondary Shape CDAs also alternate in a zigzag pattern between the left and right sides. For instance, the signal line connecting CDAm to the bottom TDI 400 (not shown) is extracted on the left side of the CDA column, while the signal line from CDA(m+1) is extracted on the right side, continuing this alternating zigzag pattern sequentially. In contrast to the embodiment of Circle "A" in FIG. 25D, a single CDA signal line is drawn out for each vertical length of the same secondary shape CDA.

In cases where the number of Secondary Shape CDAs per Primary Shape CDA ends with 0.5, as shown in this embodiment, every Primary Shape CDA in the CDA column is equipped with an outer Secondary Shape CDA. Furthermore, when CDA signal line bundles are positioned on both the left and right sides of the CDA column, it is possible to ensure that the points at which coplanar capacitances are formed in the odd- and even-numbered Primary Shape CDAs are equal in number, even without incorporating Segmented-Trapezoidal CDA described later.

Although FIG. 27 demonstrates Secondary Shape CDAs formed using composite trapezoidal shapes, all the theories described for this embodiment are equally applicable when Secondary Shape CDAs are composed of triangular shapes.

Figure 28:
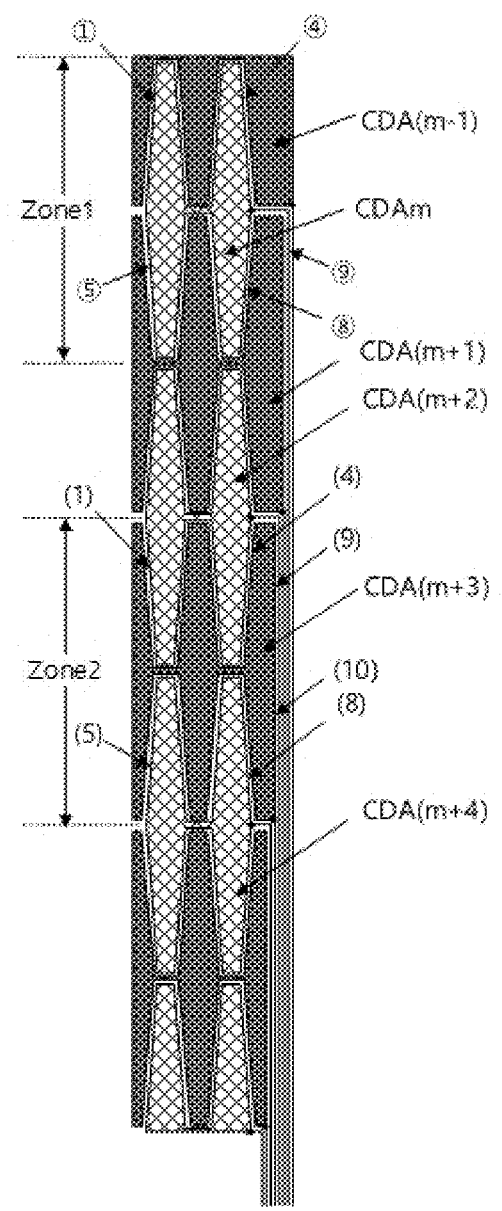
FIG. 28 is an embodiment of the present invention illustrating the coplanar capacitance formed in Secondary Shape CDAs located on the inner or outer sides of a CDA column.

FIG. 28 illustrates an embodiment of the present invention regarding the coplanar capacitances formed in Secondary Shape CDAs located inside or outside a CDA column. Referring to FIG. 28, CDA signal lines are arranged solely on the right side of the CDA column. Coplanar capacitances are formed as follows, depending on whether the Primary Shape CDAs are composed solely of inner Secondary Shape CDAs or include both inner and outer Secondary Shape CDAs:

Locations of coplanar capacitance formed on the Primary Shape CDA with multiple internal Secondary Shape CDAs operating as a Sensing CDA In FIG. 28, when the Secondary Shape CDA (CDAm), positioned solely on the inner side, operates as a Sensing CDA, alternating voltage is applied to CDA(m−1) and CDA(m+1).

In this example, where the Secondary Shape CDA is located exclusively on the inner side, in Zone 1 where CDAm is located, coplanar capacitances are formed at a total of nine locations as follows:

For CDAm relative to CDA(m−1), where alternating voltage is applied, coplanar capacitances are formed along four boundary lines (Boundary Lines ① through ④). (For convenience, coplanar capacitances formed along horizontal edges are not considered.)

Similarly, for CDAm relative to CDA(m+1), where alternating voltage is also applied, coplanar capacitances are formed along another four boundary lines (Boundary Lines ⑤ through ⑧)

Additionally, a ninth coplanar capacitance is formed between the SSL connected to CDAm and the VFL of CDA(m−1) (Boundary Line ⑨).

Locations of coplanar capacitance formed on the Primary Shape CDA with multiple internal and external Secondary Shape CDAs operating as a Sensing CDA Referring to Zone 2 in FIG. 28, when CDA(m+3), which includes both internal and external Secondary Shape CDAs, functions as a Sensing CDA, alternating voltage is assumed to be applied to CDA(m+2) and CDA(m+4).

In Zone 2, the coplanar capacitors formed for CDA(m+3) are located as follows, totaling ten positions:

Four boundary lines between CDA(m+3) and CDA(m+2) (Boundary Lines (1) through (4)).

Four boundary lines between CDA(m+3) and CDA(m+4) (Boundary Lines (5) through (8)).

Two locations between the VFL of CDA(m+2) and CDA (m+3) ((9) and (10)).

Above (9) and (10) are separated into two locations of coplanar capacitance formation, as each trapezoidal shape generates two instances of coplanar capacitance.

As analyzed above, when the Secondary Shape CDA is absent on the outer side of the CDA column, nine locations of coplanar capacitance are formed. Conversely, when the Secondary Shape CDA is present on the outer side, ten locations of coplanar capacitance are formed, resulting in a difference of one location.

Referring to [Equation 3] related to the formation of coplanar capacitance, the coplanar capacitance is proportional to the length of the two signal lines facing each other. Therefore, the coplanar capacitance of a Primary Shape CDA that includes an outer Secondary Shape CDA is greater than that of a Primary Shape CDA without an outer Secondary Shape CDA.

FIG. 29 illustrates an example based on the CDA arrangement in FIG. 28, where the detected voltage $V_{p\_nt}$, calculated using [Equation 7], is measured at each CDA's SSL and digitized into ADC values. The ADC values in FIG. 29 show the detected voltage differences at the SSL due to a one-point discrepancy in the locations of coplanar capacitance formation, depending on the inclusion of outer Secondary Shape CDAs. ADC_org represents the theoretical ADC values calculated under the assumption that the coplanar capacitance locations are identical for all CDAs, as in the embodiment of FIG. 27. Thus, ADC_org depends solely on the length of the CDA signal lines, causing the values to increase proportionally with CDA position within the CDA column (although in the embodiment of FIG. 29, for convenience, these changes are calculated linearly rather than nonlinearly, as explained in FIG. 22A).

Referring to the ADC values in FIG. 29, it can be observed that the values for CDAs with outer Secondary Shape CDAs, such as CDA(m+1), CDA(m+3), and CDA (m+5), are higher than the standard ADC_org values. This discrepancy disrupts the linearity of the ADC, making it difficult to analyze the trend of ADC variations.

As previously explained based on FIG. 23, nonlinearity exists in the voltage detected at SSLs due to CDA position differences, and hardware (H/W) or software (S/W) compensation methods were introduced to address this issue. However, to apply such compensation methods effectively, the system's behavior must be somewhat predictable. The numerous variables influencing the system, such as CDA position and the presence or absence of inner and outer CDAs, make it challenging to anticipate system behavior. This complexity can create difficulties in understanding the system, potentially leading customers to perceive it as unstable, which could erode trust in the system.

FIG. 30 illustrates an improved embodiment of the present invention where the number of coplanar capacitance formation points is equalized across all Primary Shape CDAs located in odd- and even-numbered positions within a CDA column when CDA signal bundles are placed only on one side of the CDA column.

Referring to FIG. 30, the CDA signal lines are located on the right side of the CDA column. In contrast to the embodiment in FIG. 25D, where CDAs such as CDAm, CDA(m+2), and CDA(m+4) are positioned solely on the inner side, the improved embodiment in FIG. 30 introduces Segmented-Trapezoidal CDA, electrically connected via bridges. A Segmented-Trapezoidal CDA can take the form of half a trapezoid, not implying a halving of area but rather that its geometry resembles half the longitudinal cross-section of a trapezoid.

In FIG. 30, Segmented-Trapezoidal CDAs occupy a designated portion of the existing outer Secondary Shape CDAs, forming a structure that faces the CDA signal lines while being positioned on the outer side.

For instance, in Zone 3 of FIG. 30, CDAm is connected to a Segmented-Trapezoidal CDA 120 that occupies 50% of the longitudinal length of CDA(m−1)'s outer Secondary Shape CDA. This configuration introduces new coplanar capacitance formation points, such as boundaries labeled (⑤') and (⑥ '). Similarly, in Zone 4, CDA(m+2) is connected to a Segmented-Trapezoidal CDA 120, occupying 50% of the longitudinal length of CDA(m+1)'s outer Secondary Shape CDA, resulting in an increase in coplanar capacitance formation points.

If CDAm operates as a sensing CDA and alternating voltages are applied to CDA(m−1) and CDA(m+1), the coplanar capacitance locations in Zone 3 are as follows:

1. Between CDA(m−1) and CDAm: 5 locations (①'∼⑤').
2. Between CDAm- and CDA(m−1)'s VFL: 1 location (⑥').
3. Between CDAm's SSL and CDA(m−1)'s VFL: 1 location (⑦').
4. Between CDAm and CDA(m+1): 4 locations ((1)'∼(4)').
5. Between CDAm's SSL and CDA(m+1): 1 location ((5)').

Meanwhile, in the embodiment of FIG. 30, referring to Zone 4, CDA(m+3), which includes the outer secondary shape CDA, has 50% of its length occupied by the Segmented-Trapezoidal CDA connected to CDA(m+4). If CDA (m+3) operates as a sensing CDA, alternating voltages are applied to CDA(m+2) and CDA(m+4). In Zone 4, the locations where coplanar capacitance is formed on CDA(m+3) are as follows, totaling 12 locations:

A. Between CDA(m+2) and CDA(m+3): 4 locations (①"∼④")
B. Between CDA(m+3) and the VFL of CDA(m+2): 1 location (⑤")
C. Between the SSL of CDA(m+3) and the VFL of CDA(m+2): 1 location (⑥")
D. Between CDA(m+3) and CDA(m+4): 5 locations ((1)"∼(5)")
E. Between the SSL of CDA(m+3) and CDA(m+4): 1 location ((6)')

Referring to locations 1 through 5 and A through E for the formation of coplanar capacitances, it is evident that there are consistent formations between neighboring upper and lower CDAs: four locations (1, 4 and A, D) for adjacent CDAs, one location (2, B) between CDA and VFL, one location (3, C) between SSL and VFL, and one location (5, E) between SSL and CDA. The introduction of the Segmented-Trapezoidal CDA has standardized the number of coplanar capacitance locations, eliminating discrepancies in locations between odd- and even-numbered CDAs that previously arose due to differences in the presence of inner and outer CDAs.

In this invention, among the two Primary Shape CDAs vertically positioned as odd and even numbers within a CDA column, one is equipped with an outer Secondary Shape CDA, while the other contains only inner Secondary Shape CDAs. The Segmented-Trapezoidal CDA extracted from the inner Secondary Shape CDA occupies 50% of the length of the outer Secondary Shape CDA and is positioned to face the CDA signal lines. This configuration eliminates the discrepancy in the number of coplanar capacitance locations between inner and outer CDAs, thereby addressing the nonlinearity that previously existed in SSLs due to inner/outer differentiation.

Referring again to Circle "A" in FIG. 25D, the signal lines of Secondary Shape CDAs located exclusively on the inner side of the CDA column, as well as the signal lines of Secondary Shape CDAs positioned on the upper outer side of the inner CDA, are closely extracted within a narrow region. The length of the extraction point is twice the longitudinal edge of the Primary Shape CDA. However, in the embodiment shown in FIG. 30, regardless of whether a CDA is located at an odd or even position within the column, the presence of outer Secondary Shape CDAs or Segmented-Trapezoidal CDAs increases the flexibility of CDA signal line extraction. Consequently, CDA signal lines can be extracted at equal intervals or at each longitudinal edge of the Primary Shape CDA (as shown in FIG. 30, L1 through L7 represent the longitudinal edges of the Primary Shape CDA, all of which have equal lengths).

Within the shared region that includes Segmented-Trapezoidal CDAs, the areas of Secondary Shape CDAs and the Segmented-Trapezoidal CDAs extracted from them are ideally proportioned as follows: the area of a full Secondary Shape CDA is represented by a ratio of 1, the area of a half Secondary Shape CDA by 0.5, and the area of a Segmented-Trapezoidal CDA, configured as one-fourth the shape of a full Secondary Shape CDA, by 0.25. Additionally, the sum of areas for different types of CDAs within the shared region should be equal. For example, in the shared region L1 of FIG. 30, the sum of areas for the Secondary Shape CDAs in CDA(m−1) should equal the sum of areas for the Secondary Shape CDAs and Segmented-Trapezoidal CDA in CDAm.

The boundary between a Segmented-Trapezoidal CDA occupying part of an outer Secondary Shape CDA and the occupied Secondary Shape CDA should preferably be formed as an inclined line with a specific angle to facilitate area changes due to object movement along the vertical direction. The angle of the inclined line should ideally match the angle of the inclined long side of the trapezoid forming the Secondary Shape CDA. Additionally, the longitudinal edge of the Segmented-Trapezoidal CDA facing the CDA signal lines should be configured vertically, minimizing the routing path of the CDA signal lines.

The distance between a Segmented-Trapezoidal CDA directly facing the signal line bundle and the occupied portion of an outer Secondary Shape CDA should ideally be uniform. This ensures that coplanar capacitances formed at their locations remain consistent, allowing for accurate system behavior predictions and maintaining the regular arrangement of serrated shapes in both the interior and exterior of Secondary and Segmented-Trapezoidal CDAs. Furthermore, the exterior and interior of the Segmented-Trapezoidal CDA can also be configured with serrations, with the principles of shape and peeling determined by the serrations following all previously discussed theories.

The relationships between Secondary and Segmented-Trapezoidal CDAs described in FIGS. 25D and 30, based on trapezoids, are equally applicable to other geometric shapes such as rhombuses (as in FIG. 25B), circles, or rectangles, irrespective of the CDA shape.

As demonstrated, introducing Segmented-Trapezoidal CDAs and standardizing the number of coplanar capacitance locations for Primary Shape CDAs in odd and even positions within a CDA column eliminates nonlinear variables induced by the inner/outer distinction. This simplifies the compensation methods for voltage nonlinearity detected at SSLs based on CDA position and facilitates easier system analysis.

Figure 31:
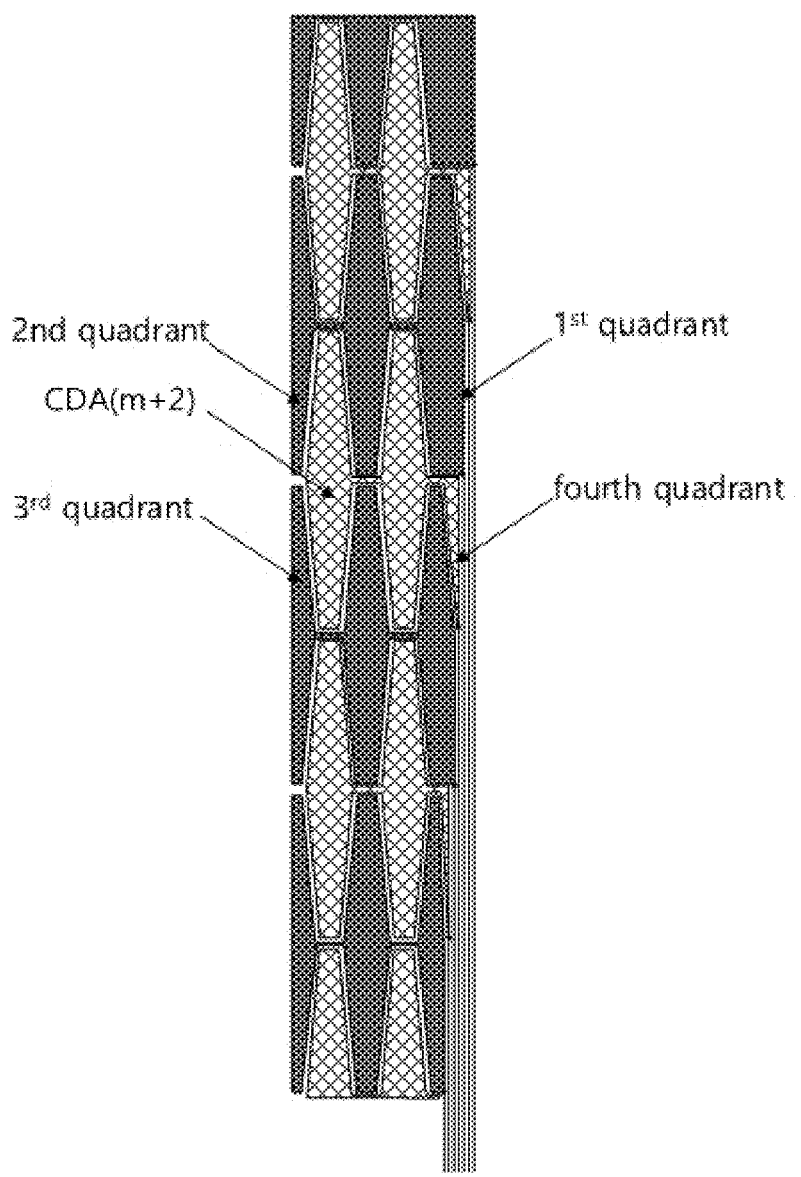
FIG. 31 is an embodiment of the present invention illustrating the installation positions of a Segmented-Trapezoidal CDA.

The following explains the installation locations of the Segmented-Trapezoidal CDA. FIG. 31 illustrates an embodiment of the present invention regarding the installation locations of the Segmented-Trapezoidal CDA. In FIG. 30, the Segmented-Trapezoidal CDA is installed in the first quadrant, but as shown in FIG. 31, it may also be installed in the fourth quadrant. This is because when the Segmented-Trapezoidal CDA is located in the first or fourth quadrant on the right side of the CDA column and the CDA signal line bundle passes through the right side of the CDA column, the number of locations where coplanar capacitances are formed remains the same.

If the CDA signal line bundle is laid out only on the left side of the CDA column, it is preferable to install the Segmented-Trapezoidal CDA in either the second or third quadrant. Thus, the Segmented-Trapezoidal CDA should be installed in the area through which the CDA signal line passes.

If, as in the embodiment shown in FIG. 27, the number of Secondary Shape CDAs includes 0.5, and the CDA signal line bundle is split and arranged on both the left and right sides of the CDA column, then the number of locations where coplanar capacitors are formed at the odd- and even-numbered CDAs in the CDA column becomes equal. In this case, there would be no need to use a Segmented-Trapezoidal CDA.

The above description of the present invention is for illustrative purposes only, and it will be understood by those skilled in the art to which the invention pertains that various modifications can be made without departing from the technical spirit or essential characteristics of the invention.

Therefore, the embodiments described above should be regarded as illustrative rather than restrictive in all respects. The scope of the present invention is indicated by the claims appended hereto, and all modifications or variations derived from the meaning, scope, and equivalent concept of the claims should be interpreted as being included within the scope of the present invention.

DETAILED DESCRIPTION OF MAIN ELEMENTS

3: Common electrode layer
4: Color Layer
5: Display device
6: Color Filter Glass
7: Polarizer or Protective Layer
8: TFT substrate
10: Lower Substrate 11: Upper Substrate
20: Object
100: Capacitive Detection Area (CDA)
101: Sensing CDA
110: Secondary Shape CDA
120: Segmented-Trapezoidal CDA
200: CDA signal line
201: Sensing Signal Line (SSL)
210: Voltage Forcing Line (VFL)
300: Interconnection material
301: Bonding section
302: Connection section
400: Touch Drive IC (TDI)
410: Signal processing unit
420: Drive controller
430: Power supply unit
440: Sensing Signal Line Selection Multiplexer
450: Voltage Forcing Line Selection Multiplexer
500: Bridge

What is claimed is:

1. A capacitive detection device comprising:
a primary shape capacitive detection Area (CDA) configured to form an object capacitance with an object positioned vertically opposite thereto and installed on the upper side of a display device;
a detection sensor comprising a CDA signal line connected to the primary shape capacitive detection area;
a Touch Drive IC (TDI) configured to detect the object capacitance formed in the primary shape capacitive detection area;
a CDA column in a coplanar arrangement, configured such that a plurality of the detection sensors are vertically stacked, wherein the number of CDA signal lines increases in proportion to the number of detection sensors stacked from a far distance to a near distance relative to the position of the TDI, and the area of the detection sensors gradually decreases from the far distance to the near distance; and
a secondary shape capacitive detection area comprising a composite trapezoidal shape formed by combining two trapezoidal shapes,
wherein the primary shape capacitive detection area is formed by interconnecting a plurality of the secondary shape capacitive detection areas, and heterogeneous secondary shape capacitive detection areas are disposed vertically adjacent to each other in the CDA column with a predetermined interval, and
wherein the capacitive detection device further comprises:
a bundle of signal lines formed by the plurality of CDA signal lines constituting the CDA column;
a first voltage forcing line (VFL), located at the (n−1)th position adjacent to one side of a sensing signal line (SSL) and configured to receive an alternating voltage, or a second VFL located at the (n+1)th position adjacent to the other side of the SSL and configured to receive an alternating voltage, when an arbitrary nth CDA signal line in the bundle of signal lines is the sensing signal line;
a coplanar capacitor formed between the SSL and the first VFL or between the SSL and the second VFL, wherein each VFL adjacent to the SSL has the same or different line width, separation distance, and facing length, forming a parallel-plate coplanar structure; and
a plurality of capacitors having one end connected to the SSL,
wherein a charge-sharing phenomenon occurs between the coplanar capacitor and a plurality of capacitors having one end connected to the SSL, driven by charges supplied by the coplanar capacitor, and
wherein based on the charge-sharing phenomenon, the object capacitance is detected as a voltage signal at the SSL, further comprising a signal processing unit.

2. The capacitive detection device of claim 1, wherein:
when the object moves vertically, including across a boundary line between the heterogeneous secondary shape capacitive detection areas that are vertically separated, vertical touch coordinates are detected based on the area occupancy difference between the secondary shape capacitive detection areas positioned above and below.

3. The capacitive detection device of claim 1, wherein:
the coplanar capacitance ccpl(a) formed between the SSL and either the first VFL or the second VFL is determined by the following [Equation 1], $$ccpl(a) = \frac{\epsilon r * l(a)}{377\pi v0} * \ln\left[\frac{-2(k+1)}{k-1}\right](F) \qquad \text{[Equation 1]}$$

where:

$$a)\ k = \left[1 - \left(\frac{d(a)}{d(a) + 2w(a)}\right)^2\right]^{0.25};$$

b) w(a) is the line width of the SSL and either the first VFL or the second VFL;
c) d(a) is the separation distance between the SSL and either the first VFL or the seco nd VFL;
d) l(a) is the facing length between the SSL and either the first VFL or the second VF L at the separation distance d(a);
e) εr is the relative permittivity of the material present between the SSL and either the first VFL or the second VFL;
f) υ0 is the speed of light in a vacuum, 3×10$^8$ m/s;
g) [Equation 1] is valid under the condition that d(a) ≤4.67w(a); and
h) The ln represents the natural logarithm (log) with base of the natural constant e.

4. The capacitive detection device of claim 1, wherein:
when the detection sensor is composed of a conductive transparent material with a predetermined thickness t1, a rectangular parallel-plate capacitance cline1, based on [Equation 2], is formed between one side of the SSL and the side of the first VFL, and a rectangular parallel-plate capacitance cline2, based on [Equation 3], is formed between the opposite side of the SSL and the side of the second VFL, $$cline1 = \epsilon 11 \frac{S11}{d11}(F) \qquad \text{[Equation 2]}$$

$$cline2 = \epsilon 11 \frac{S12}{d12}(F) \qquad \text{[Equation 3]}$$

where:
(a) ε11 is the absolute permittivity of the material between the SSL and the VFL, determined as the product of the absolute permittivity in a vacuum and the relative permittivity;
(b) d11 is the separation distance between the SSL and the first VFL;

(c) l1 is the facing length between the SSL and the first VFL at the separation distance d11;
(d) S11=t1×l1(m$^2$);
(e) d12 is the separation distance between the SSL and the second VFL;
(f) l2 is the facing length between the SSL and the second VFL at the separation distance d12; and
(g) S12=t1×l2(m$^2$).

5. The capacitive detection device of claim 1, wherein:
in a non-touch state, the voltage detected at the SSL is expressed by [Equation 4], and when a touch occurs due to the object, the voltage detected at the SSL is expressed by [Equation 5] and the object capacitance cobj is detected in the form of a voltage by performing the operation [Equation 4]-[Equation 5], $$\Delta Vp1 = \frac{(Vd2 - Vd1)*(ccpl + cline)}{ccpl + cpr + cc + cline}(V) \qquad [\text{Equation 4}]$$

$$\Delta Vp2 = \frac{(Vd2 - Vd1)*(ccpl + cline)}{ccpl + cpr + cc + cline + cobj}(V) \qquad [\text{Equation 5}]$$

where:
(a) Vd1 is the alternating voltage applied prior to Vd2;
(b) ΔVp1 is the difference between the voltage formed on the SSL when Vd1 is applied and the voltage formed on the SSL when Vd2 is applied, as defined in [Equation 4];
(c) ΔVp2 is the difference between the voltage formed on the SSL when Vd1 is applied and the voltage formed on the SSL when Vd2 is applied, as defined in [Equation 5];
(d) ccpl is the coplanar capacitance formed between the SSL and the first VFL or between the SSL and the second VFL;
(e) cpr is the parasitic capacitance formed on the SSL within the TDI, which is one of the plurality of capacitors connected to one side of the SSL, A DC voltage of a predetermined magnitude is connected to the other side of the parasitic capacitor;
(f) cc is the common electrode capacitance formed by the detection sensor and the display device's common electrode layer being vertically opposed, and one of the plurality of capacitors connected to one side of the SSL, The common electrode voltage, which is a DC voltage, is connected to the other side of a common electrode capacitor;
(g) cline is the rectangular parallel-plate capacitance formed between one side of the SSL and the side of the first VFL, or between the other side of the SSL and the side of the second VFL; and
(h) cobj is the object capacitance formed between a sensing CDA connected to the SSL and the object.

6. The capacitive detection device of claim 1, wherein:
the secondary shape CDAs vertically adjacent in the CDA column form shared areas in the regions between their respective centers, and each secondary shape CDA has one shared area in a first direction and another shared area in a second direction opposite to the first direction with respect to its center.

7. The capacitive detection device of claim 6, wherein:
the areas of the homogeneous secondary shape CDAs forming the shared areas are determined to have the same ratio based on their outer shapes.

8. The capacitive detection device of claim 6, wherein:
the sums of the areas of heterogeneous secondary shape CDAs within the shared areas are equal.

9. The capacitive detection device of claim 1, wherein:
one of the secondary shape CDAs vertically adjacent in the CDA column is configured as a half-shape located on the outer side of the CDA column and faces a heterogeneous type of CDA signal line with a predetermined separation distance.

10. A capacitive detection device comprising:
a primary shape capacitive detection Area (CDA) configured to form an object capacitance with an object positioned vertically opposite thereto and installed on the upper side of a display device;
a detection sensor comprising a CDA signal line connected to the primary shape capacitive detection area;
a Touch Drive IC (TDI) configured to detect the object capacitance formed in the primary shape capacitive detection area;
a CDA column in a coplanar arrangement, configured such that a plurality of the detection sensors are vertically stacked, wherein the number of CDA signal lines increases in proportion to the number of detection sensors stacked from a far distance to a near distance relative to the position of the TDI, and the area of the detection sensors gradually decreases from the far distance to the near distance; and
a secondary shape capacitive detection area comprising a composite trapezoidal shape formed by combining two trapezoidal shapes,
wherein the primary shape capacitive detection area is formed by interconnecting a plurality of the secondary shape capacitive detection areas, and heterogeneous secondary shape capacitive detection areas are disposed vertically adjacent to each other in the CDA column with a predetermined interval, and
wherein the secondary shape CDA comprises chevron shapes, which are peeled off into a predetermined area and are regularly arranged in a longitudinal and transverse directions on the inside and outside, and the outer shape of the secondary shape CDA is formed as a continuous connection of the peeled-off chevron shapes, in accordance with the arrangement rules of the peeled-off chevron shapes.

11. The capacitive detection device of claim 10, wherein:
when the outer shape of the peeled-off secondary shape CDA forms a boundary line with an adjacent heterogeneous secondary shape CDA and is separated by a predetermined separation distance, the separation distance is uniform across the entire length of the boundary line composed of a single side.

12. The capacitive detection device of claim 1, wherein:
no voltage is applied to the SSL.

* * * * *